INVENTORS
WILLIAM W. WOODBURY
LEWIS T. WHEELOCK
GREGORY J. TOBEN
BY Harry T. Berriman
AGENT April 28, 1959

W. W. WOODBURY ET AL 2,884,619

INFORMATION STORAGE SYSTEM

Filed Sept. 2, 1953

29 Sheets-Sheet 2

INVENTORS
WILLIAM W. WOODBURY
LEWIS T. WHEELOCK
GREGORY J. TOBEN
BY Harry T. Berriman
AGENT INVENTORS
WILLIAM W. WOODBURY
LEWIS T. WHEELOCK
GREGORY J. TOBEN
BY Harry T. Berriman
AGENT INVENTORS
WILLIAM W. WOODBURY
LEWIS T. WHEELOCK
GREGORY J. TOBEN
BY Harry T. Berriman
AGENT

INVENTORS
WILLIAM W. WOODBURY
LEWIS T. WHEELOCK
GREGORY J. TOBEN

BY Harry T. Berriman
AGENT

INVENTORS
WILLIAM W. WOODBURY
LEWIS T. WHEELOCK
GREGORY J. TOBEN
BY Harry T. Berriman
AGENT INVENTORS
WILLIAM W. WOODBURY
LEWIS T. WHEELOCK
GREGORY J. TOBEN
BY Harry T. Berriman
AGENT April 28, 1959 W. W. WOODBURY ET AL 2,884,619

INFORMATION STORAGE SYSTEM

Filed Sept. 2, 1953

29 Sheets-Sheet 8

INVENTORS
WILLIAM W. WOODBURY
LEWIS T. WHEELOCK
GREGORY J. TOBEN
BY Harry T. Berriman
AGENT INVENTORS
WILLIAM W. WOODBURY
LEWIS T. WHEELOCK
GREGORY J. TOBEN
BY Harry T. Berriman
AGENT INVENTORS
WILLIAM W. WOODBURY
LEWIS T. WHEELOCK
GREGORY J. TOBEN
BY Harry T. Berriman
AGENT INVENTORS
WILLIAM W. WOODBURY
LEWIS T. WHEELOCK
GREGORY J. TOBEN
BY Harry T. Berriman
AGENT INVENTORS
WILLIAM W. WOODBURY
LEWIS T. WHEELOCK
GREGORY J. TOBEN
BY Harry T. Berriman
AGENT INVENTORS
WILLIAM W. WOODBURY
LEWIS T. WHEELOCK
GREGORY J. TOBEN
BY Harry T. Berriman
AGENT

INFORMATION STORAGE SYSTEM

INVENTORS
WILLIAM W. WOODBURY
LEWIS T. WHEELOCK
GREGORY J. TOBEN
BY Harry T. Berriman
AGENT INVENTORS
WILLIAM W. WOODBURY
LEWIS T. WHEELOCK
GREGORY J. TOBEN
BY Harry T. Berriman
AGENT INVENTORS
WILLIAM W. WOODBURY
LEWIS T. WHEELOCK
GREGORY J. TOBEN
BY Harry T. Berriman
AGENT

PRIMARY TIMER

INVENTORS
WILLIAM W. WOODBURY
LEWIS T. WHEELOCK
GREGORY J. TOBEN
BY Harry T. Berriman
AGENT

HORIZONTAL DEFLECTION CONTROL

INVENTORS
WILLIAM W. WOODBURY
LEWIS T. WHEELOCK
GREGORY J. TOBEN
BY Harry T. Berriman
AGENT April 28, 1959 W. W. WOODBURY ET AL 2,884,619

INFORMATION STORAGE SYSTEM

Filed Sept. 2, 1953 29 Sheets-Sheet 19

INVENTORS
WILLIAM W. WOODBURY
LEWIS T. WHEELOCK
GREGORY J. TOBEN
BY Harry T. Berriman
AGENT INVENTORS
WILLIAM W. WOODBURY
LEWIS T. WHEELOCK
GREGORY J. TOBEN
BY Harry T. Berriman
AGENT INVENTORS
WILLIAM W. WOODBURY
LEWIS T. WHEELOCK
GREGORY J. TOBEN
BY Harry T. [signature]
AGENT INVENTORS
WILLIAM W. WOODBURY
LEWIS T. WHEELOCK
GREGORY J. TOBEN
BY Harry T. Berriman
AGENT INVENTORS
WILLIAM W. WOODBURY
LEWIS T. WHEELOCK
GREGORY J. TOBEN
BY Harry T. Berriman
AGENT INVENTORS
WILLIAM W. WOODBURY
LEWIS T. WHEELOCK
GREGORY J. TOBEN
BY Harry T. Berrima
AGENT INVENTORS
WILLIAM W. WOODBURY
LEWIS T. WHEELOCK
GREGORY J. TOBEN
BY Harry T. Berriman
AGENT INVENTORS
WILLIAM W. WOODBURY
LEWIS T. WHEELOCK
GREGORY J. TOBEN
BY Harry T. Bussina
AGENT INVENTORS
WILLIAM W. WOODBURY
LEWIS T. WHEELOCK
GREGORY J. TOBEN
BY Harry T. Berriman
AGENT INVENTORS
WILLIAM W. WOODBURY
LEWIS T. WHEELOCK
GREGORY J. TOBEN
BY Harry T. Berriman
AGENT

PUSH-PULL DIFFERENTIAL AMPLIFIER

INVENTORS
WILLIAM W. WOODBURY
LEWIS T. WHEELOCK
GREGORY J. TOBEN
BY Harry T. Burriman
AGENT United States Patent Office 2,884,619

Patented Apr. 28, 1959

2,884,619

INFORMATION STORAGE SYSTEM

William W. Woodbury, Lewis T. Wheelock, and Gregory J. Toben, Poughkeepsie, N.Y., assignors to International Business Machines Corporation, New York, N.Y., a corporation of New York Application September 2, 1953, Serial No. 378,068

32 Claims. (Cl. 340—174)

This invention relates to electrical information storage systems of the type wherein electrostatic storage tubes or other low level storage devices are the principal storage medium.

An electrostatic storage tube is essentially a conventional cathode ray tube with a conductive signal pickup plate on the outside wall of the tube adjacent the screen. Charges are built up on the pickup plate by condenser action in accordance with electrostatic charge on the inside surface of the screen of the tube. The manner in which data in an electrical form is converted into a charge pattern on the screen of the cathode ray tube, with the original data being reconstituated into signals appearing on the pickup plate by a reading operation which involves exploring the screen charge pattern by a process similar to that by which the record was made, may be summarized as follows: the charge distribution left behind it on the screen by a cathode ray beam which impinges transiently on one discrete elementary area of the screen, is dependent on whether the beam is also permitted to impinge subsequently on adjacent areas (or a portion of the original elementary area). Thus, the charge distribution due to irradiating a discrete elementary area may be modified by allowing the beam to proceed to irradiate either an adjacent area or a portion of the original elementary area. The nature of any part of a charge pattern formed on the screen may be subsequently determined by re-exploring the area in question with the cathode ray beam.

If the area in question was previously modified during the recording operation by irradiating not only that area, but also reirradiating either an adjacent area or a portion of the elemental area, exploration of the elemental area during a "reading" operation produces an electrical signal on the pickup plate of a particular polarity and magnitude. Conversely, if the area in question was not "modified" during the recording operation, exploration of the elemental area during a "reading" operation produces an electrical signal on the pickup plate of a different magnitude and/or polarity. The two types of "read-out" signals obtained from an elemental area, dependent upon whether that area was modified or unmodified during the recording operation, lends itself to the recording of data in binary form. Thus, a first type signal from a modified area might be representative of a binary one, while the readout signal from an unmodified area might be representative of binary zero.

The recordation of numeral or other data in binary form on the cathode ray tube screen may be effected by a number of different charge patterns, one of the best known being referred to as the dot-line or dot-dash pattern. In this system, a binary one is represented by allowing the cathode ray tube to impinge on a point of the screen, thus generating a dot charge pattern. A binary zero is represented by allowing the beam to generate a dot as before, whereafter, the beam is shifted to trace a dash pattern. The tracing of the dash pattern modifies the original dot area, so that during a later interrogation of the dot area by the beam, a signal representative of a binary zero is obtained. In interrogating the dot portion of an elemental area to determine if it was or was not previously modified, the interrogation or reading operation itself destroys the original charge pattern if that area contained a modified dot or binary zero representation. However, the binary zero readout signal generated on the pickup plate may itself be utilized to initiate a tracing of a dash pattern to restore or regenerate the charge pattern to its original "modified" form. The interrogation of an "unmodified" dot area (binary one representation) does not destroy that charge pattern. In this manner, the information stored in an elemental area, whether representative of a binary 1 or a binary zero, may be a readout repeatedly until it is desired to readin other information to that area.

Since each elemental storage area of the cathode ray tube is relatively small in size, a tube has a capacity of a multitude of such areas. By the proper application of voltage increments to the deflection plates of the tube, it is possible to record or read out any desired elemental area of the tube. During a multitude of readin and readout operations, in a particular area or area of the tube, leakage currents between the differently charged portions of the screen, and secondary electrons emitted from the screen, tend to eventually erase or destroy the charge pattern on other elemental areas. This requires that the information stored in the tube be systemmatically regenerated.

Regeneration consists, first, of examining each elementary area, to learn which charge pattern has been stored therein, and second, of restoring the area to its original charge pattern. Regeneration is thus the same as a readout operation except that it is effected in a systematic and cyclic manner. Regeneration is usually effected during all times that normal readin and readout operations are not being effected.

The readout signals appearing on the pickup plate, as a result of reading out a binary one or zero, are low order signals and must be amplified greatly before they can be of any use in controlling associated circuits. The difference in polarity between the two types of readout signals, generated on the pickup plate, is of such small magnitude that random tube noise or random signal pickup, by the storage tube and its allied circuitry during the period of a specific readout operation, may be of sufficient magnitude, so as to "override" or cancel the readout signal and thus produce a spurious readout signal. For this reason, electrostatic storage systems tend to be critical in operation and subject to readout errors, a readout error being defined as the generation of a binary one read-out signal when a binary zero signal should have been generated, and vice versa. The improved electrostatic storage system of the subject application has eliminated such critical operation so that the improved system, instead of being the most error prone component, of a group of components forming a computer or other device, is actually one of the most reliable units. The subject system achieves this improved operation by storing each binary unit or "bit" of information as a combination of patterns on a pair of cathode ray tubes. Thus, a binary one may be represented on a pair of tubes, referred to as "upper" and "lower" tubes, by a "bar" charge pattern on the upper tube and a "bar-spot" charge pattern, in a corresponding position, on the lower tube. Conversely, a binary zero may be represented by a "bar-spot" pattern on the upper tube and a bar pattern on the lower tube. In either the binary one or binary zero representation, the "spot" charge area, on the appropriate tube, is "written" over the bar charge pattern.

To effect readout of the charge pattern, the beams of both tubes retrace the respective bar patterns of their respective tubes. The resultant signal on each pickup plate of each tube is fed to a separate input of a multi-stage push-pull, difference or differential amplifier. Since both storage tubes are subject to the same extraneous random signal sources and tube noise factors, these factors are cancelled out in the differential amplifier. On the other hand, any degree of difference in the readout signals, obtained from the two tubes, no matter how small, is greatly magnified in the difference amplifier, to give a very definite output indication. Appropriate circuits, linked to the output of the amplifier, are so designed that they will react only to a positive signal, which positive signal results from reading out a binary one pattern. This signal (binary one) is routed to other circuits, and further, may be utilized to cause the beam of the lower tube to be turned on to rewrite the spot on the "bar" of the lower tube, thus restoring the binary one charge pattern. The circuits are so arranged, that normally after a readout operation, the beam of the upper tube is turned on to automatically rewrite a spot on the "bar" of the upper tube (binary zero) unless the amplifier output is of such a sign (positive) as to indicate that a binary one was readout and that therefore the spot should be rewritten on the lower tube.

It is therefore an object of the present invention to provide an improved and reliable electrical information storage system.

Another object of the invention is to provide an improved and reliable electrical information storage system, wherein low-level storage devices are utilized.

Another object of the invention is to provide an improved and reliable electrical information storage apparatus wherein a first element of information is represented in a pair of low level storage devices, by two dissimilar signals, each recorded in one of the devices, and a second element of information is represented by the same dissimilar signals recorded conversely in the same pair of storage devices, and wherein individual signal readout devices are respectively associated with each of the storage devices and feed a common difference signal amplifier, so as to generate difference signals.

Another object of the invention is to provide an improved electrical information storage system, as described immediately above, wherein the amplifier output may be utilized to appropriately reoperate the storage apparatus so as to restore the corresponding element of information in the storage devices.

Another object of the invention is to provide an improved and reliable information storage system wherein either of two binary representations are stored by corresponding distinctive charge patterns on the screens of a pair of electrostatic storage tubes.

Another object of the invention is to provide an electrostatic storage system, wherein a binary one representation is stored by a combination of charge patterns, in corresponding positions of a pair of electrostatic storage tubes, said charge patterns differing from each other in a predetermined way, and wherein a binary zero representation is stored by a combination of said previous charge patterns arranged conversely from the binary one storage arrangement.

Another object of the invention is to provide electrical storage apparatus wherein information of one kind (e.g. the binary digit one) is stored by recording a first charge pattern in a first electrostatic storage tube and a second charge pattern in a corresponding area of a second electrostatic storage tube, and wherein information of another kind (e.g. the binary digit zero) is stored by recording said second charge pattern in said first electrostatic storage tube and said first charge pattern in a corresponding area of said second electrostatic storage tube, and to provide a dual-input difference amplifier for said pair of storage tubes, one input of the amplifier being connected to a signal pickup plate adjacent the screen of one of said tubes and the other input being connected to a signal pick-up plate of said second tube, wherein during a subsequent tracing of said charge patterns in the selected areas of both tubes wherein a binary one or zero was previously recorded, a signal of a first polarity or an opposed polarity is generated at an output of said amplifier dependent upon which of the two possible kinds of binary information were previously represented in said area.

Another object of the invention is to provide an improved electrical information storage system as described immediately above wherein the amplifier output may be utilized to selectively reoperate only one appropriate storage tube in accordance with the polarity of said particular output charge pattern therein, thus restoring the same element of information in the storage tubes.

Other objects of the invention will be pointed out in the following description and claims and illustrated in the accompanying drawings, which disclose, by way of example, the principal of the invention and the best mode, which has been contemplated, of applying that principal.

In the drawings:

Figs. 1A and 1B comprise a block diagram of the improved electrostatic storage system.

Figs. 2A and 2B comprise a timing diagram of the signals utilized in the improved electrostatic storage system.

Figs. 41 to 43, 43A, and 44 to 50 are detail circuit diagrams and corresponding block symbols of the various electronic inverter units utilized in the storage system.

Figure 51:
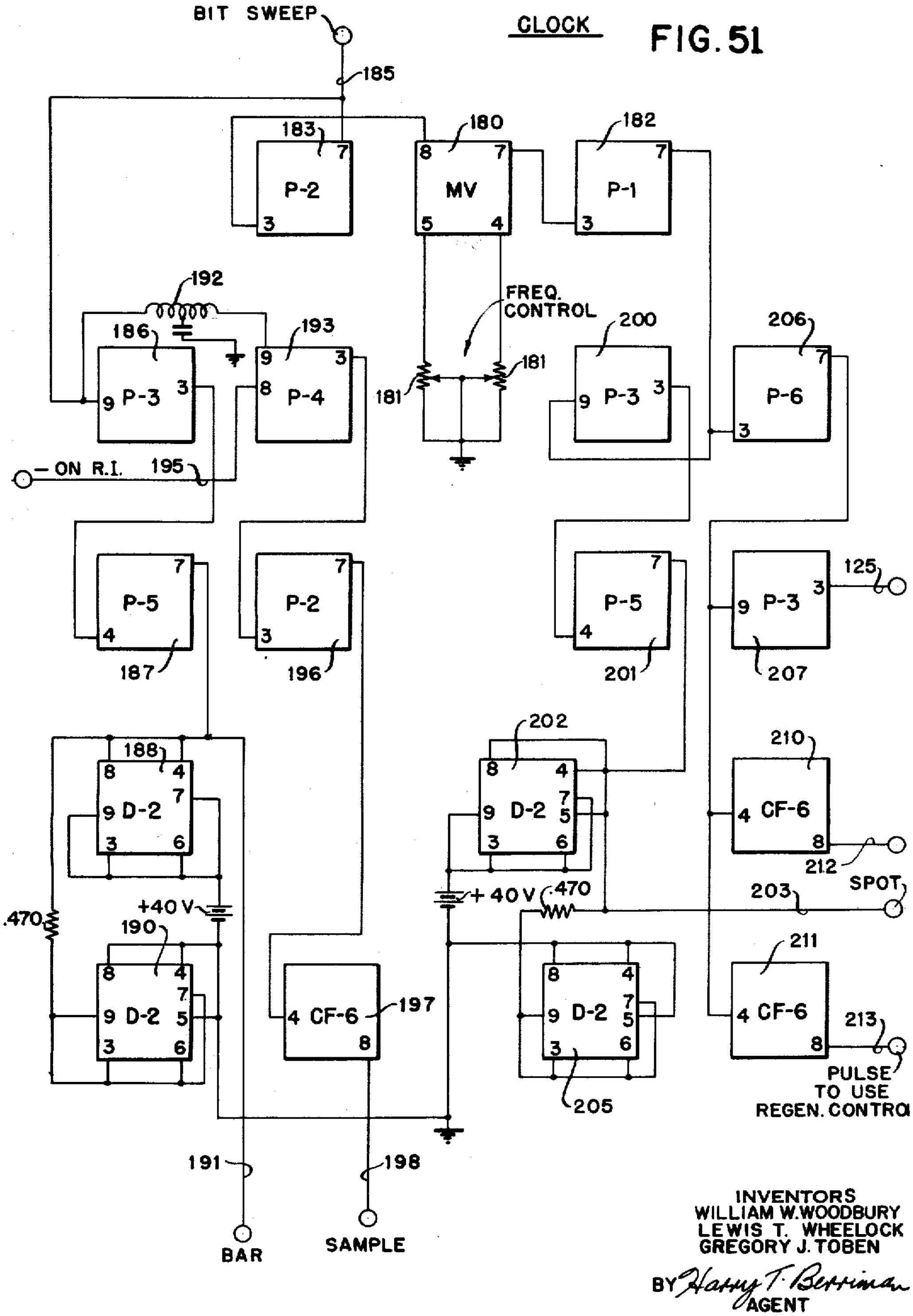

Fig. 51 is a block diagram of the Clock circuit.

Figure 52:
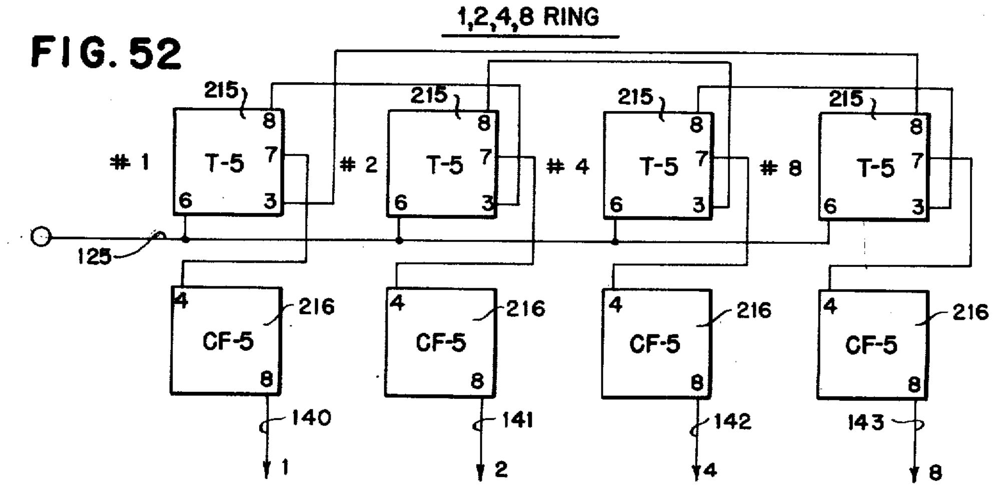

Fig. 52 is a block diagram of the 1, 2, 4, 8-Ring circuit.

Figure 53:
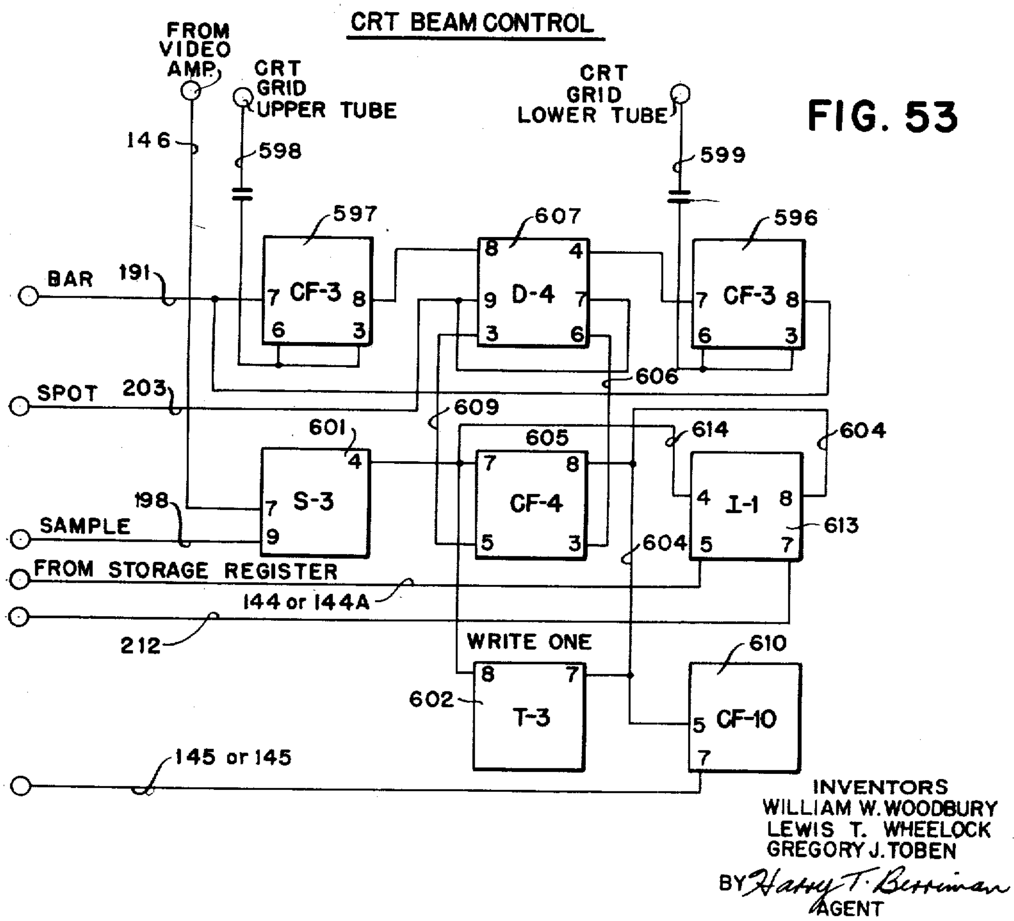

Fig. 53 is a block diagram of the cathode ray tube (CRT) Beam Control circuit.

Figure 54A:
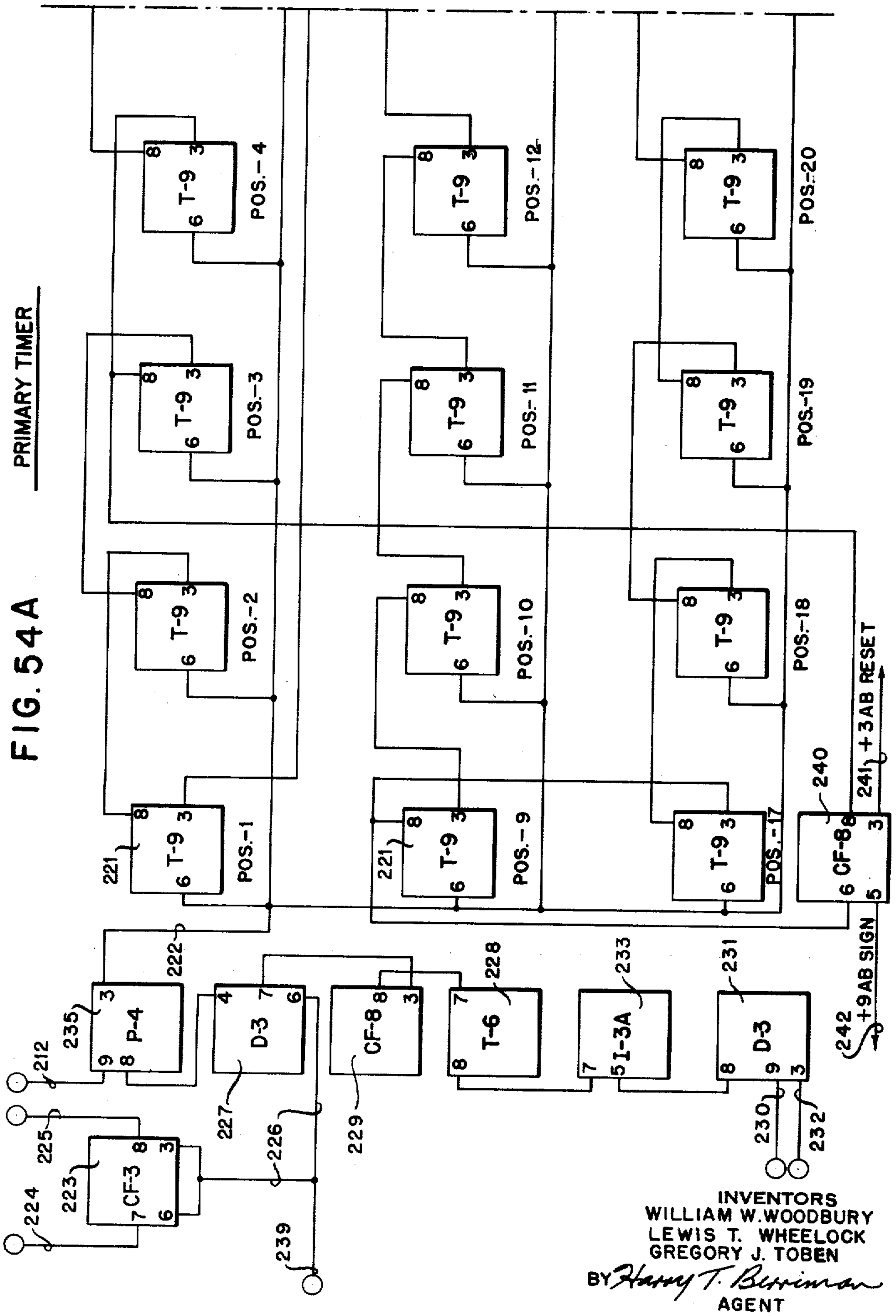
Figure 54B:
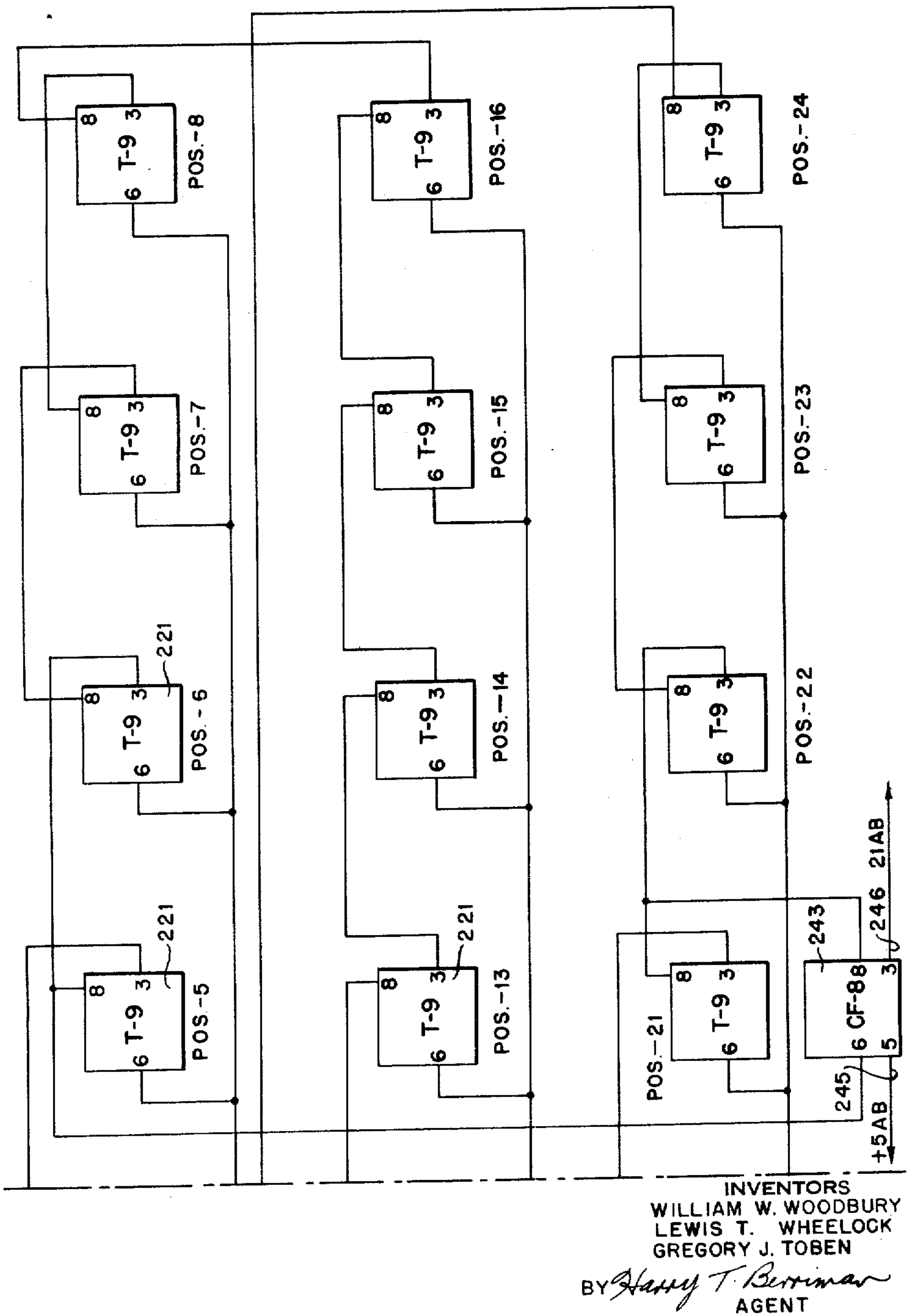

Fig. 54A and Fig. 54B comprise a block diagram of the Primary Timer.

Figure 55A:
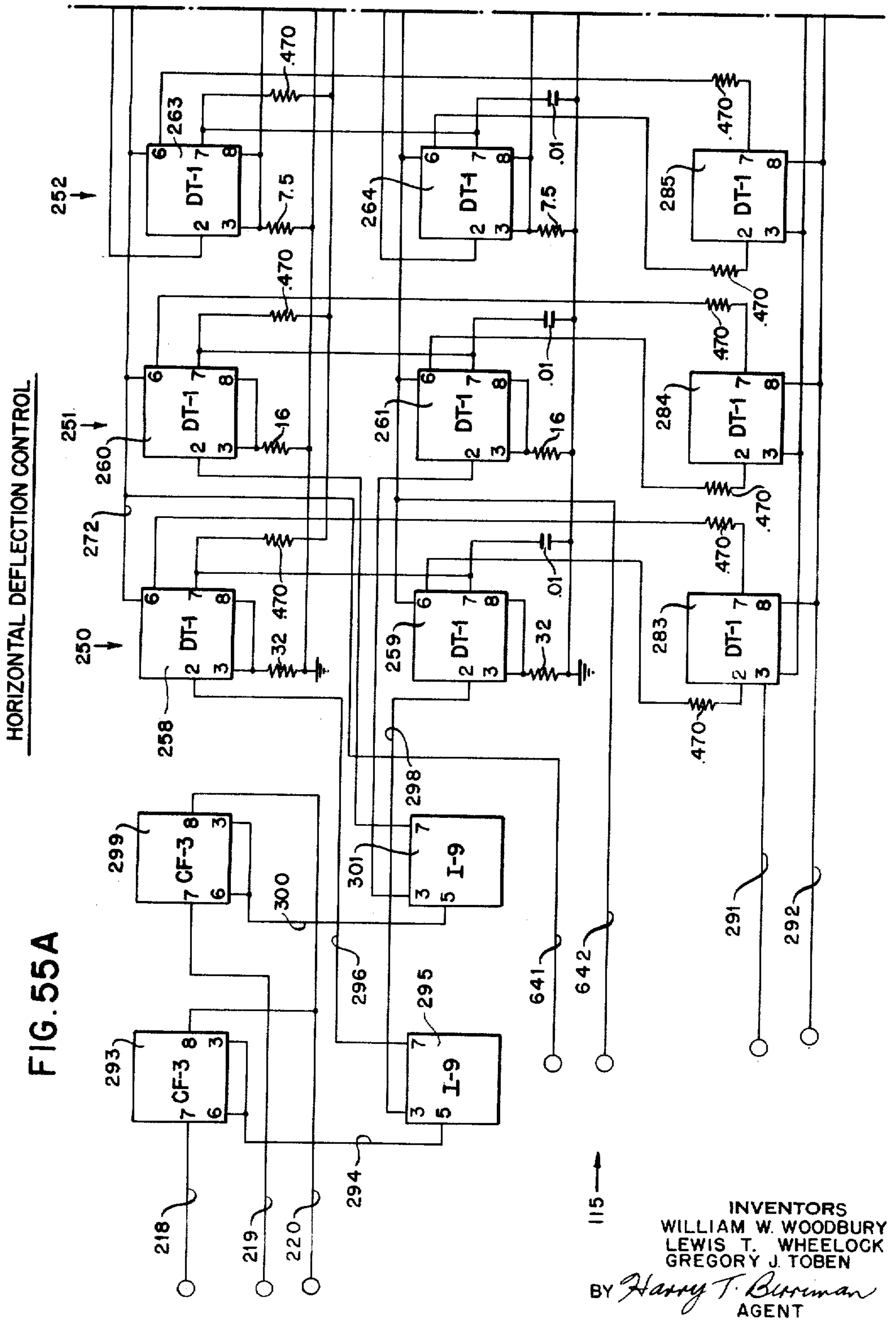
Figure 55B:
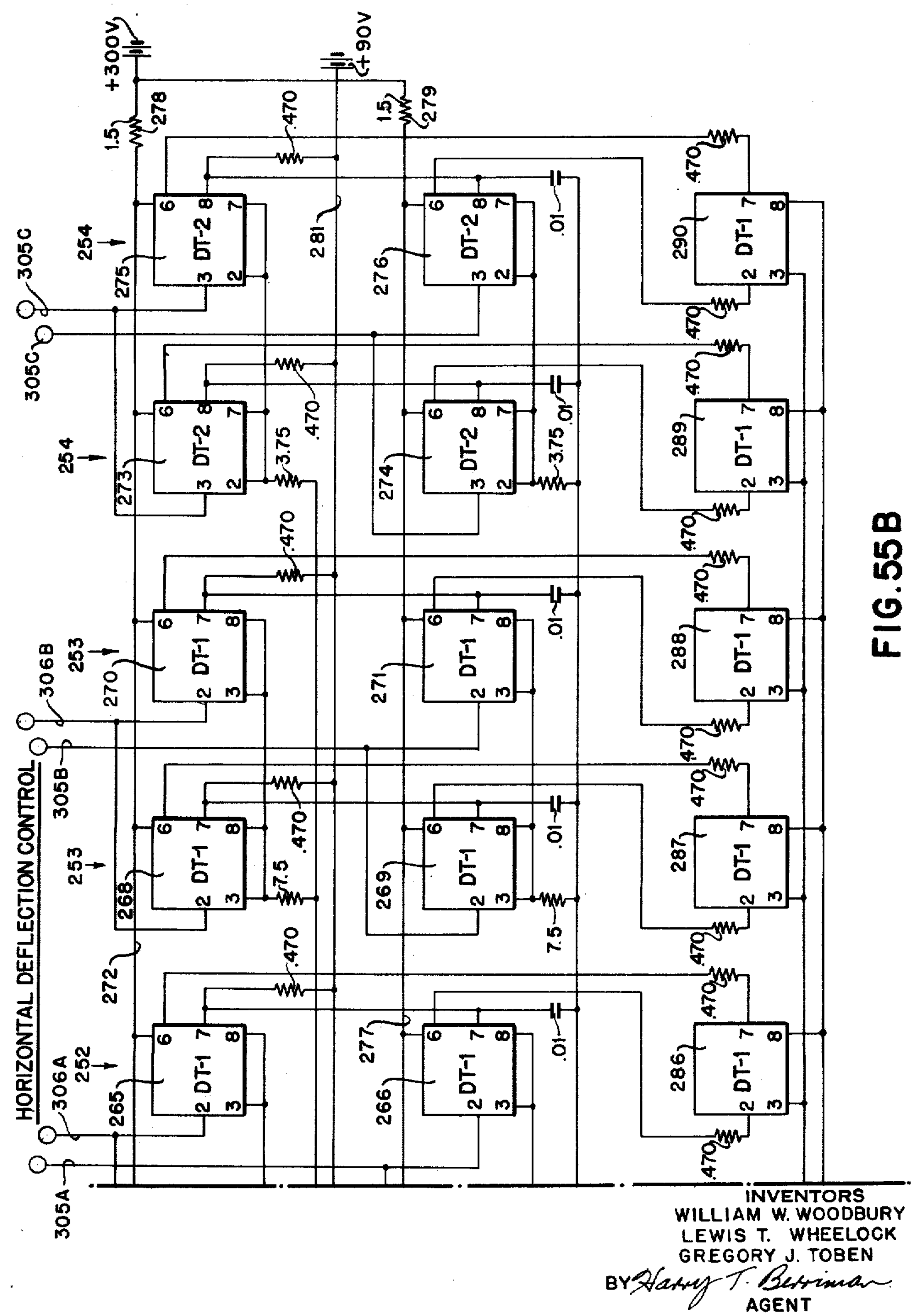

Figs. 55A and 55B comprise a block diagram of the Horizontal Deflection Control circuit.

Figure 56A:
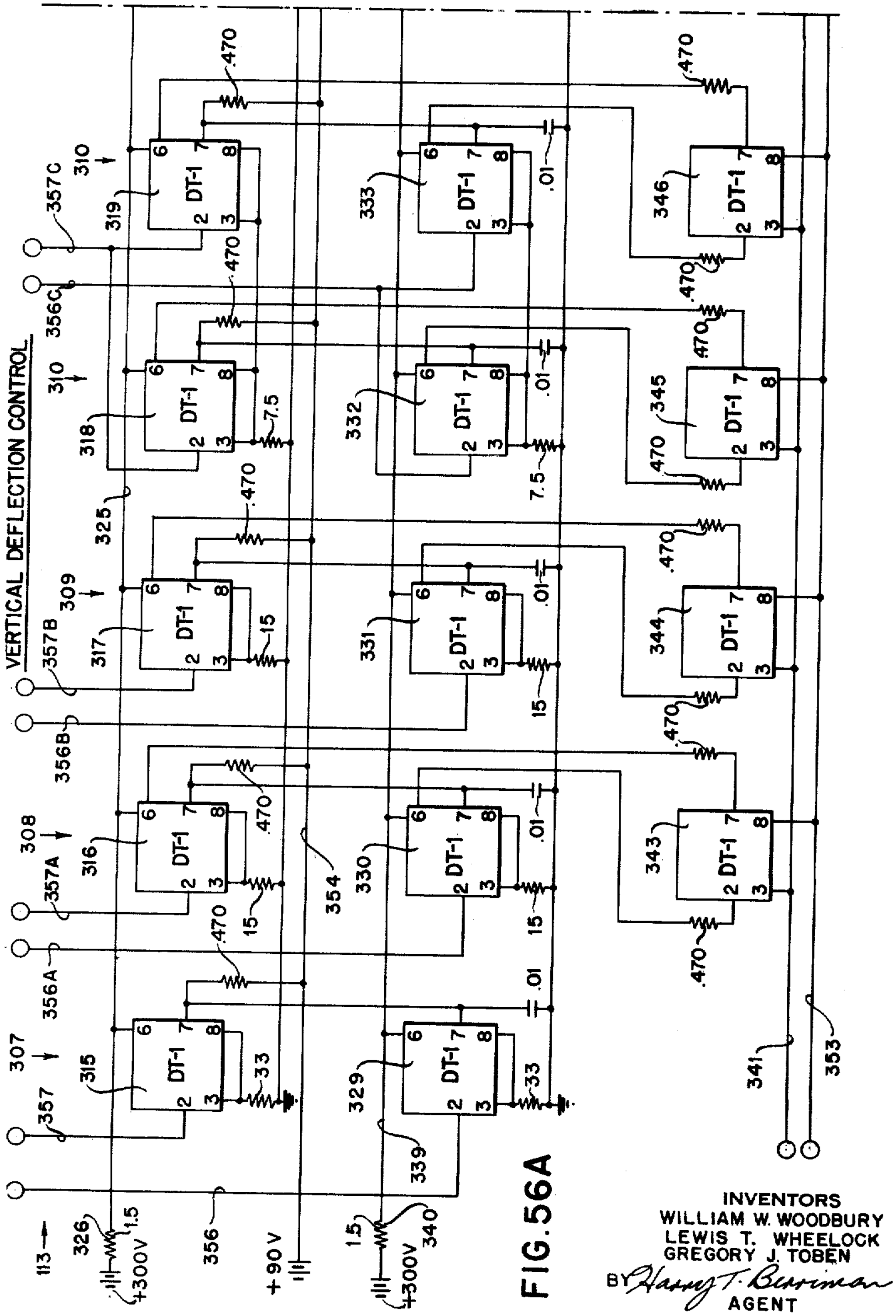
Figure 56B:
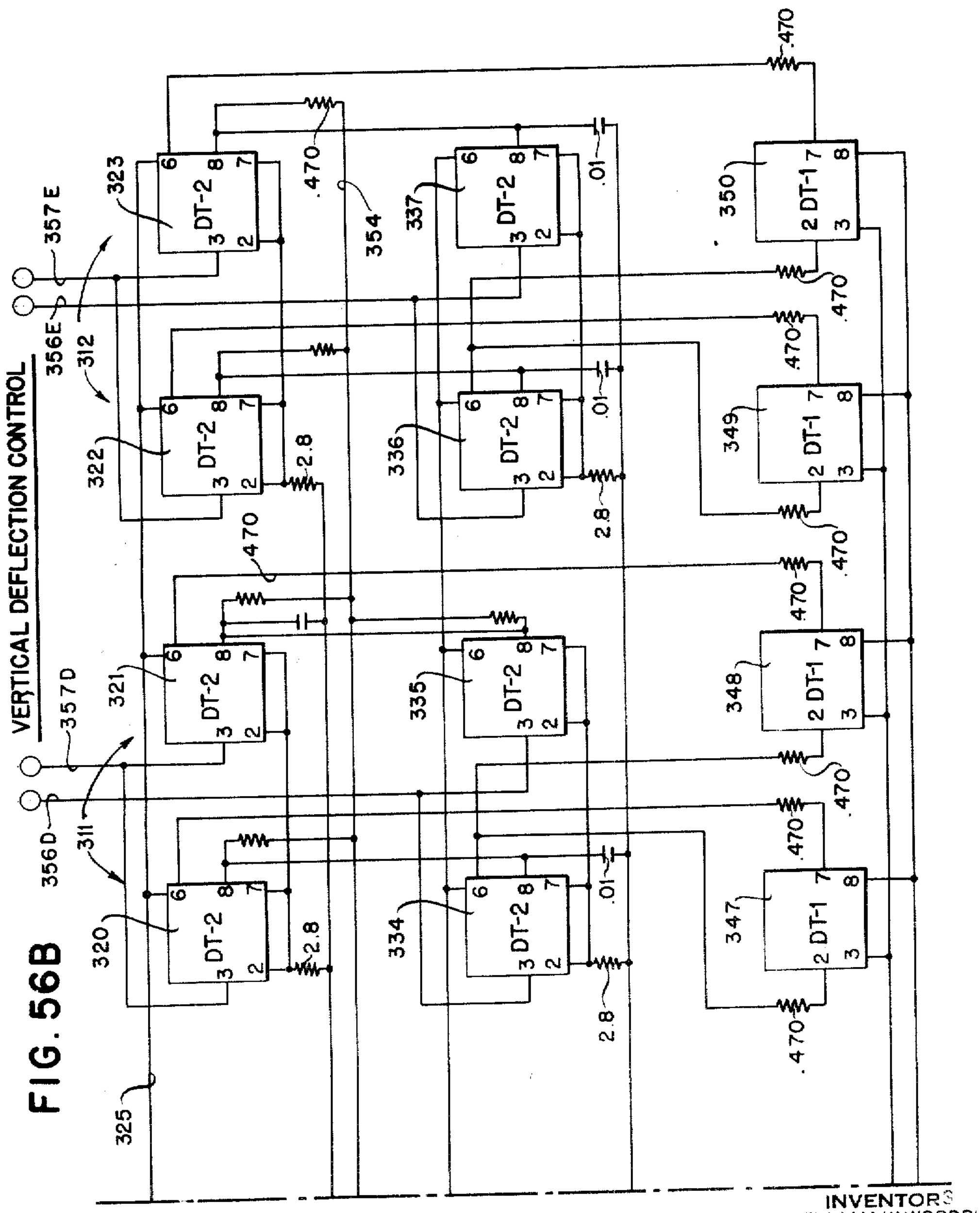

Figs. 56A and 56B comprise a block diagram of the Vertical Deflection Control circuit.

Figures 57A, 57B:
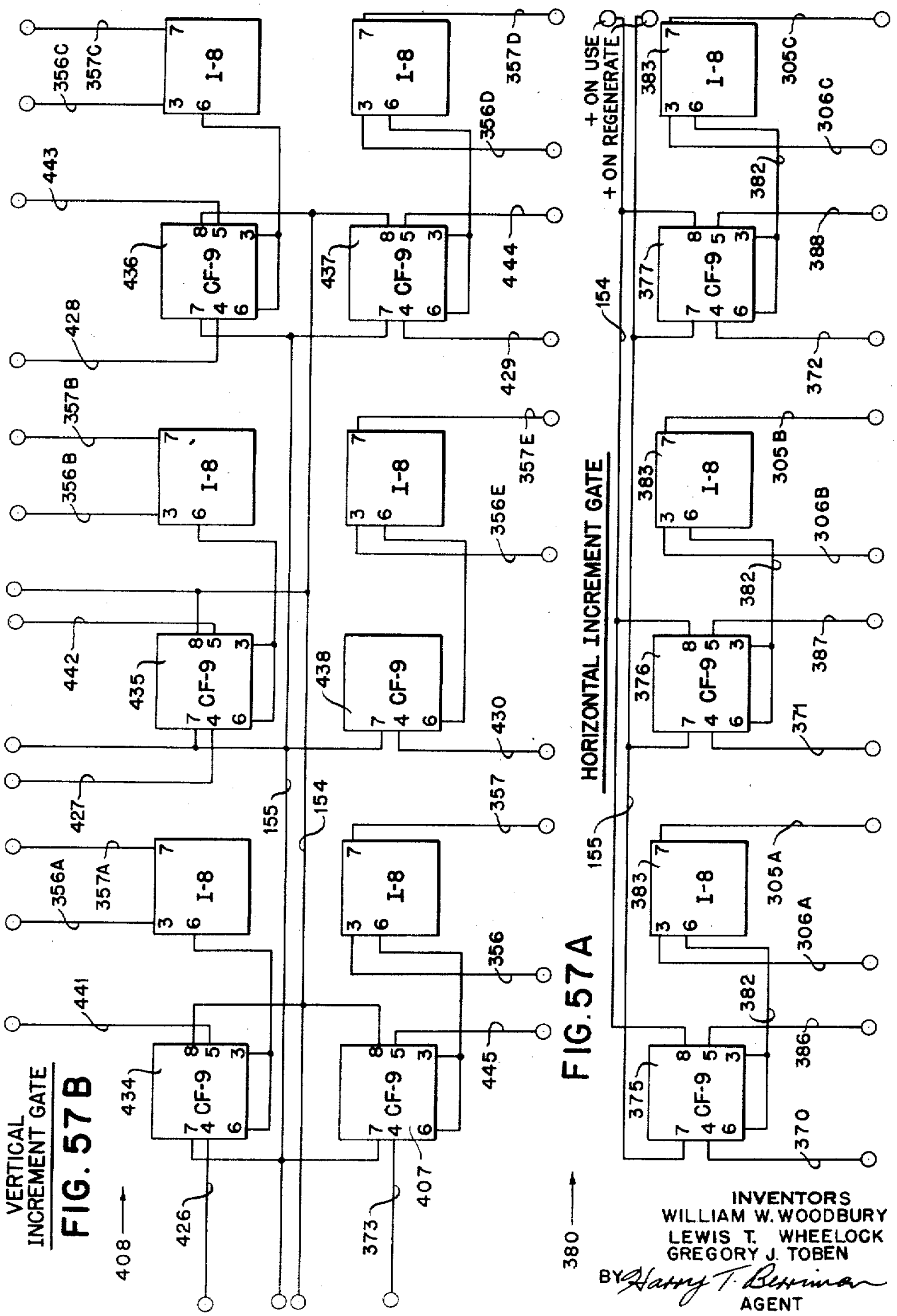

Figs. 57A and 57B comprise a block diagram of the Gate circuit.

Figures 58A, 59:
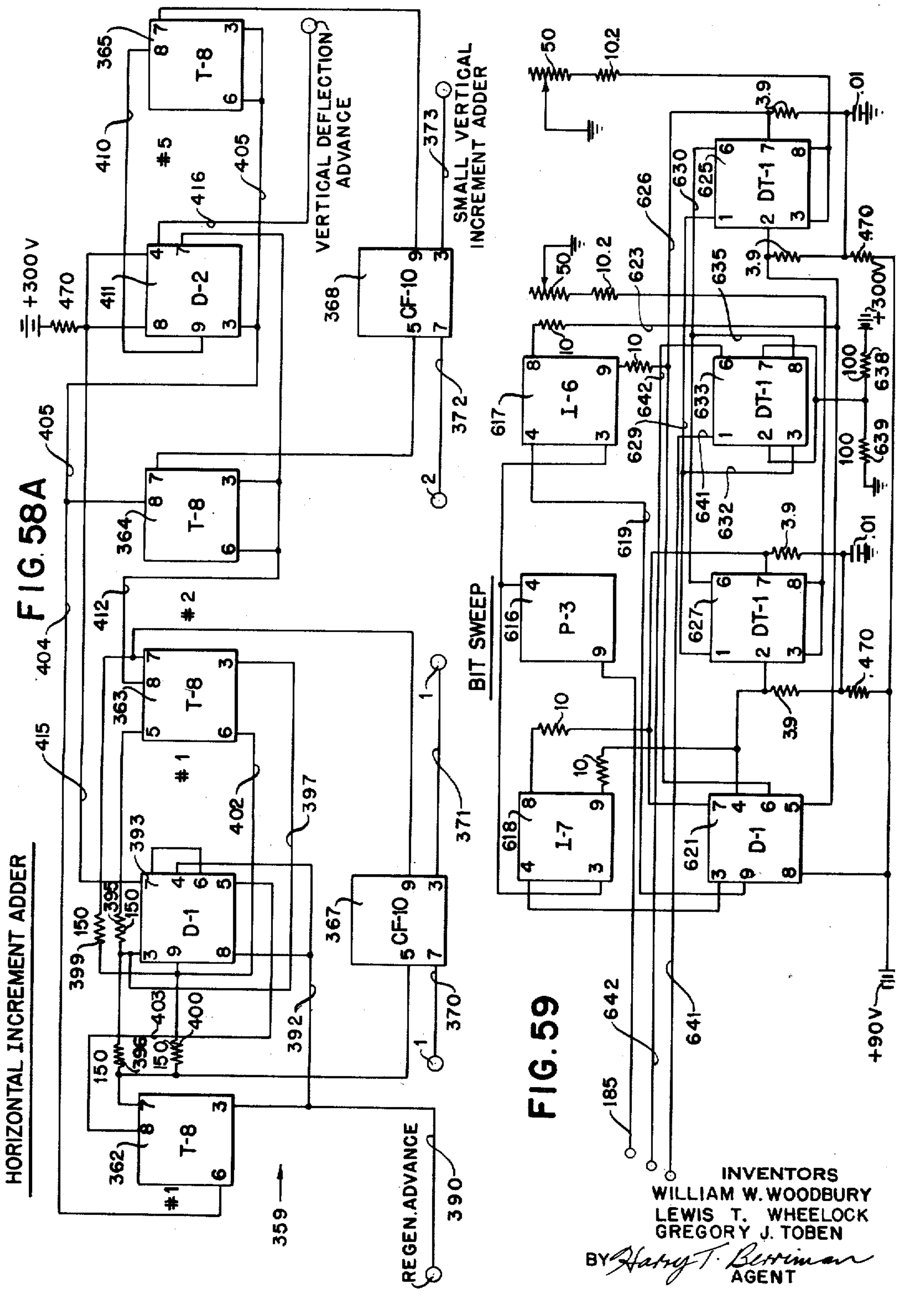
Figure 58B:
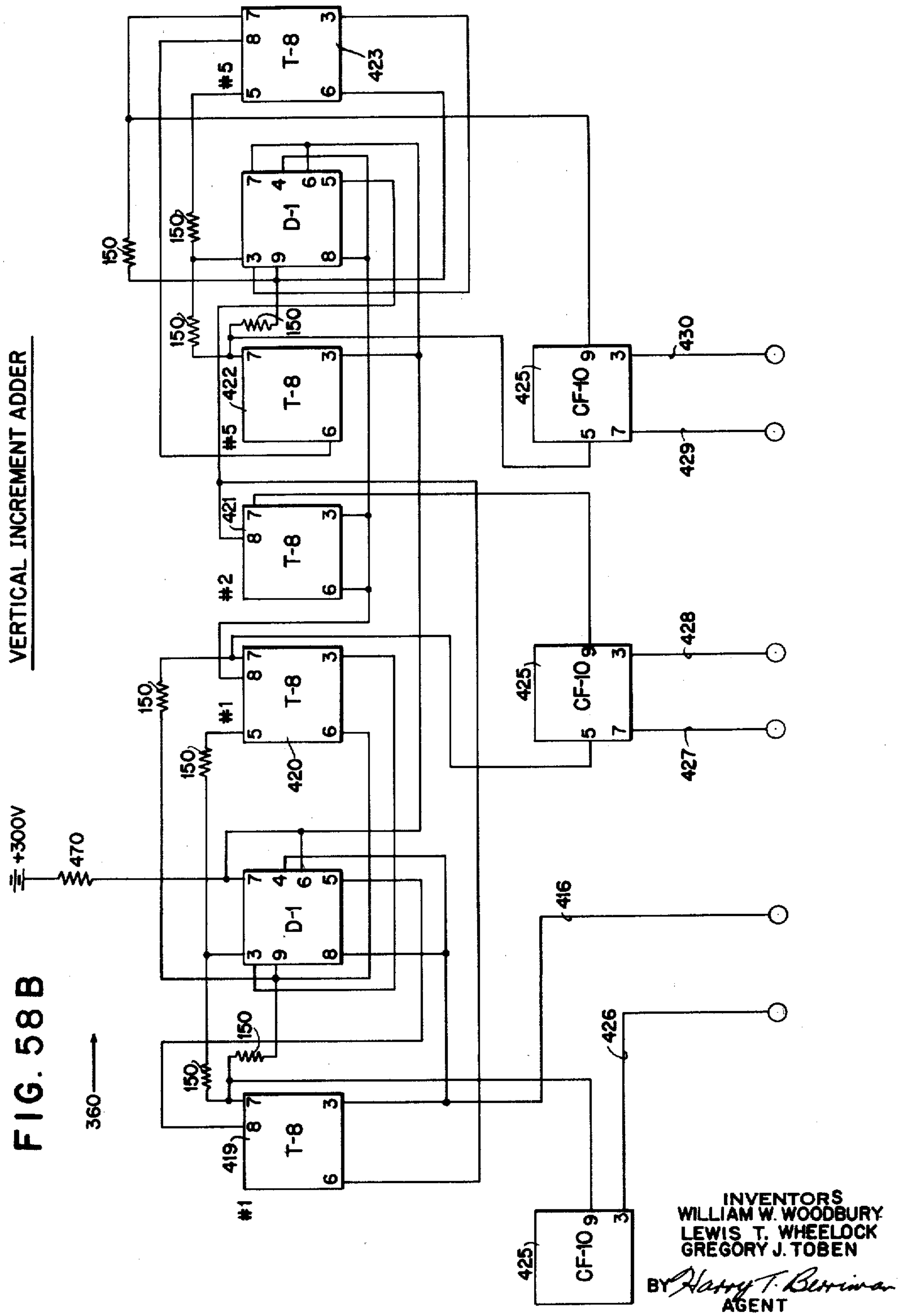

Figs. 58A and 58B comprise a block diagram of the Regenerate Counter.

Fig. 59 comprises a block diagram of the Bit Sweep circuit.

Figs. 60A to 60D illustrate diagrammatically the manner in which the bit sweep waveforms are generated.

Figure 61:
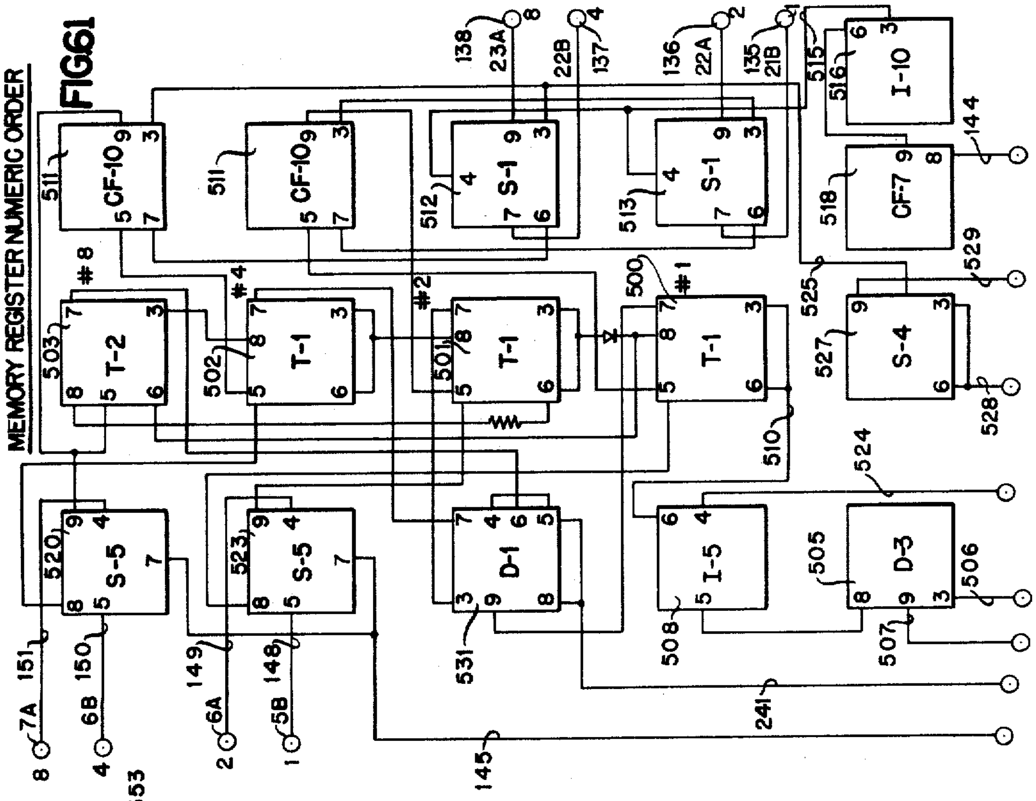

Fig. 61 comprises a block diagram of a numeric order of the Memory Register.

Figure 62:
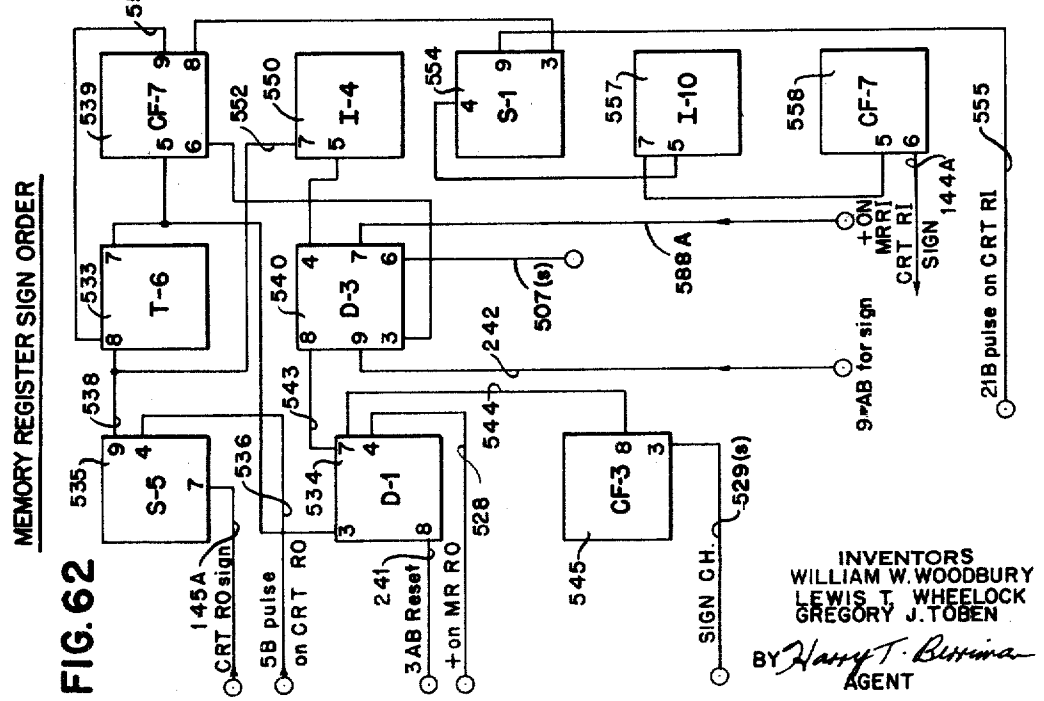

Fig. 62 comprises a block diagram of the sign order of the Memory Register.

Figure 63:
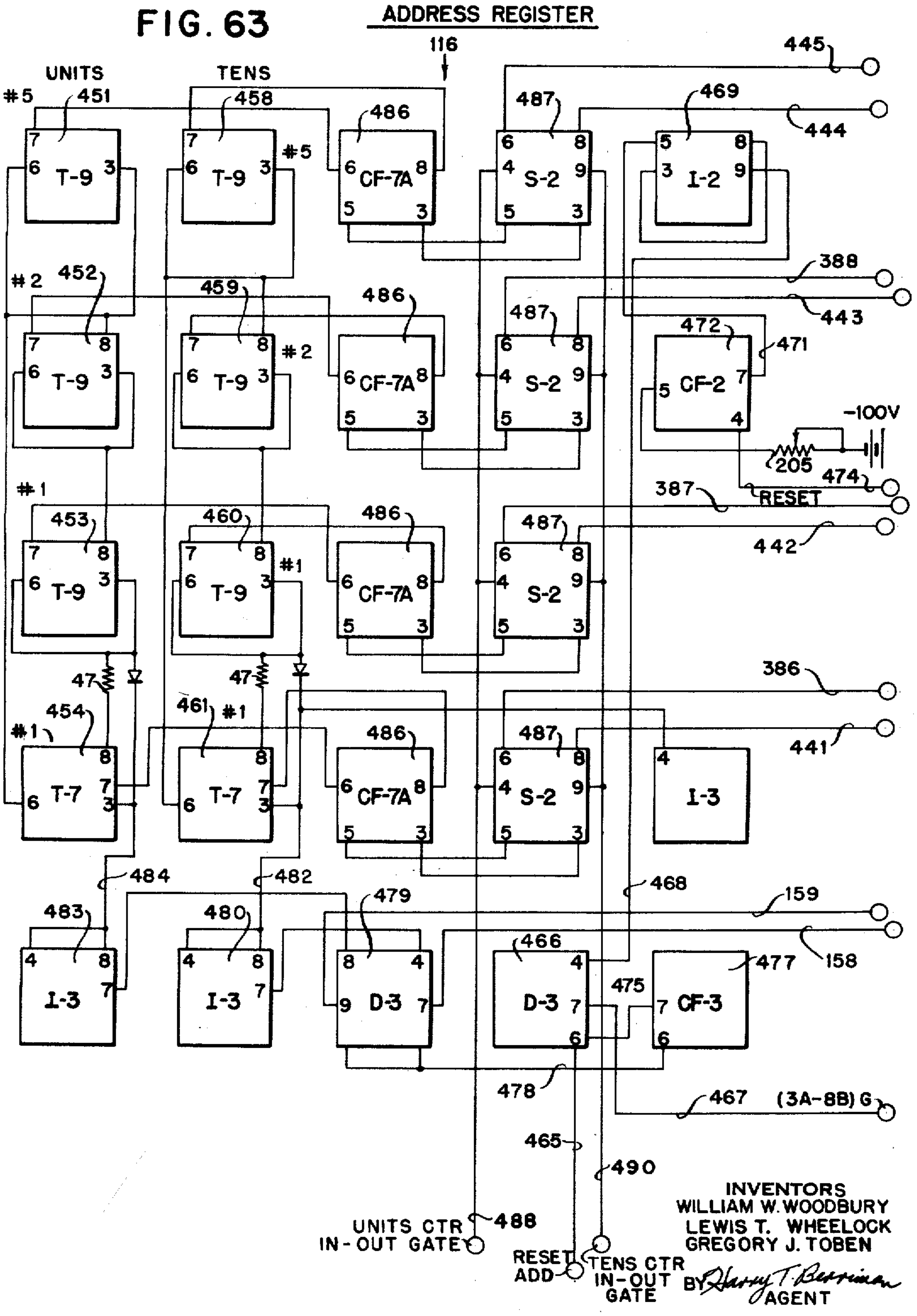

Fig. 63 comprises a block diagram of the Address Register.

Figure 64:
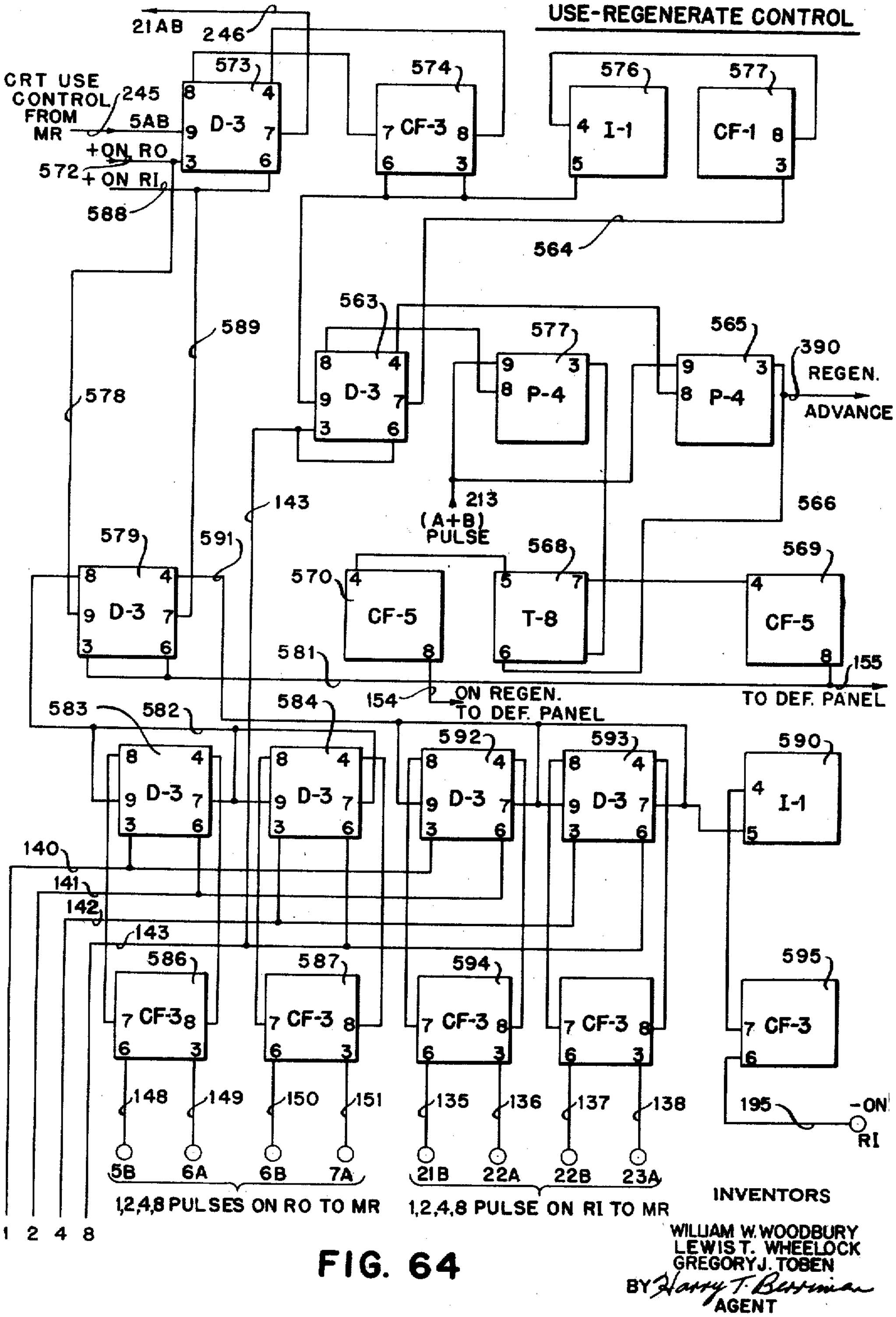

Fig. 64 comprises a block diagram of the Use-Regenerate control.

Figure 65:
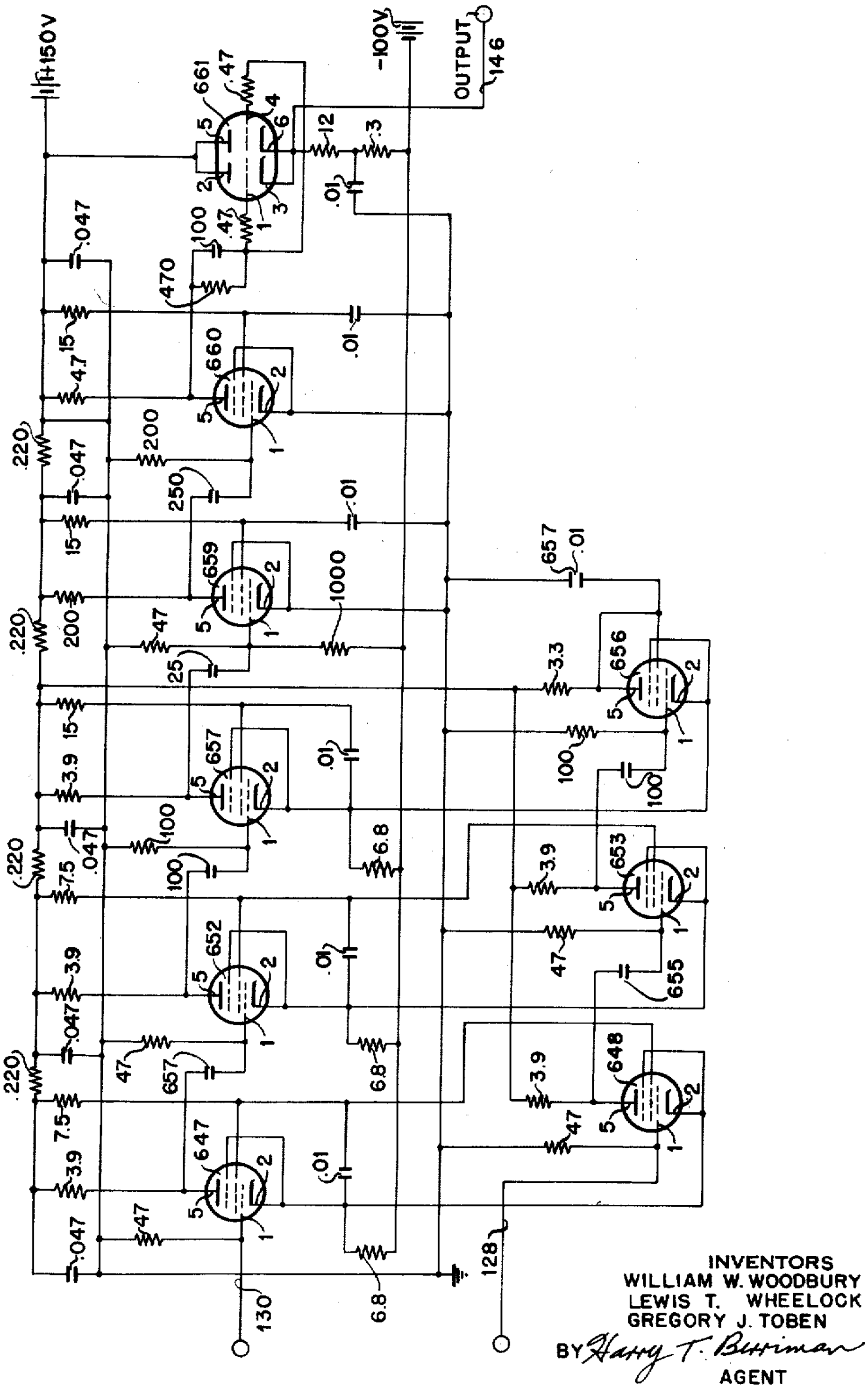

Fig. 65 comprises a detail circuit diagram of one of the 8 push-pull Differential Amplifiers utilized in the storage system.

Figure 66:
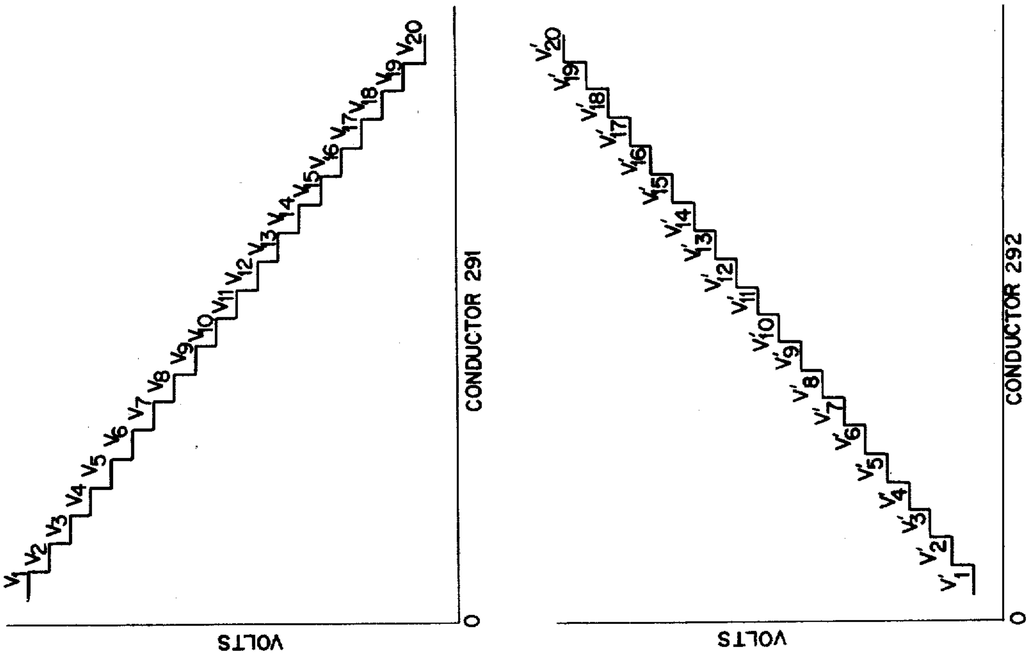

Fig. 66 comprises a graphic representation of the various possible voltage increments which may be produced by the Horizontal Deflection Control Circuit.

Figure 1A:
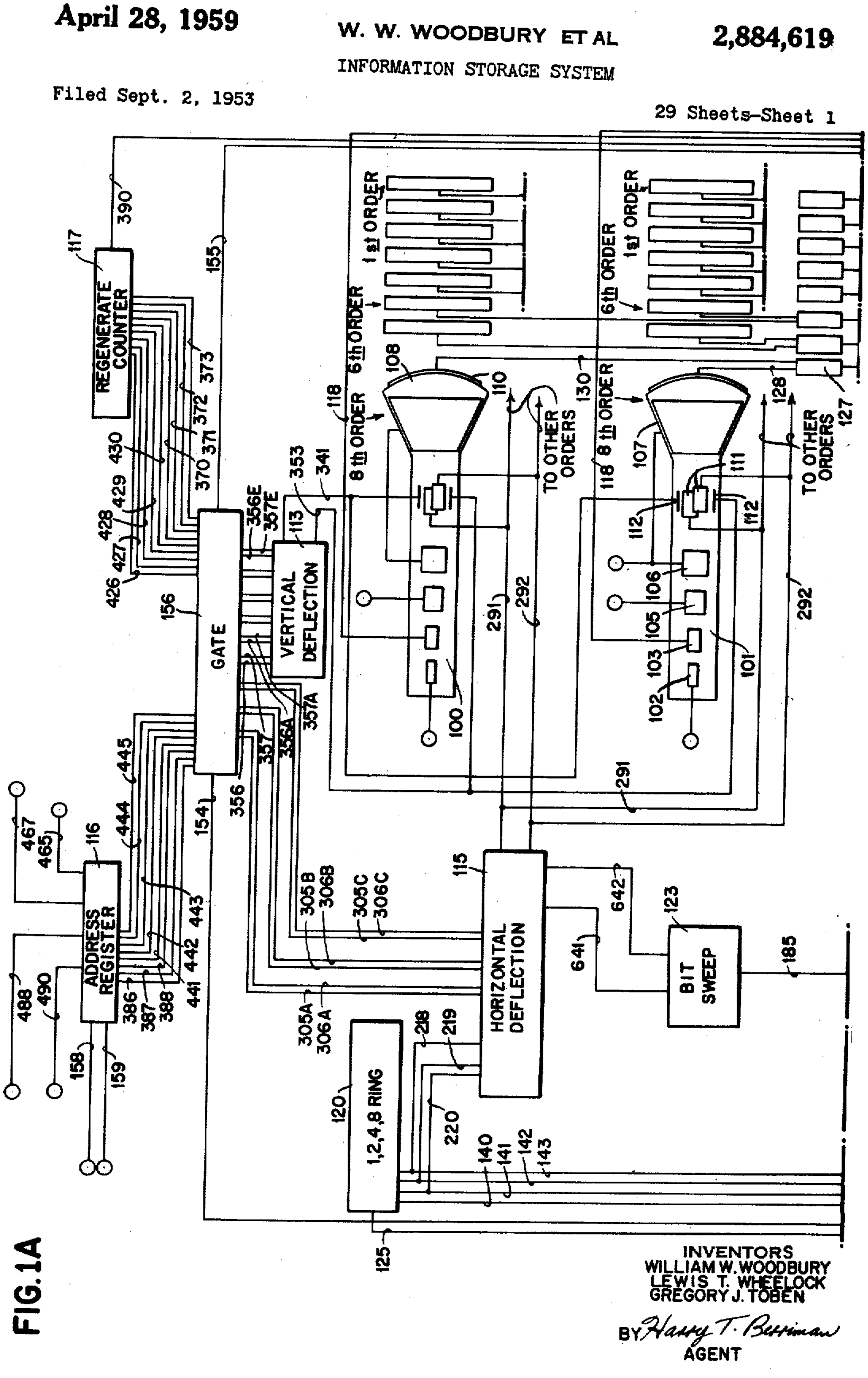
Figure 1B:
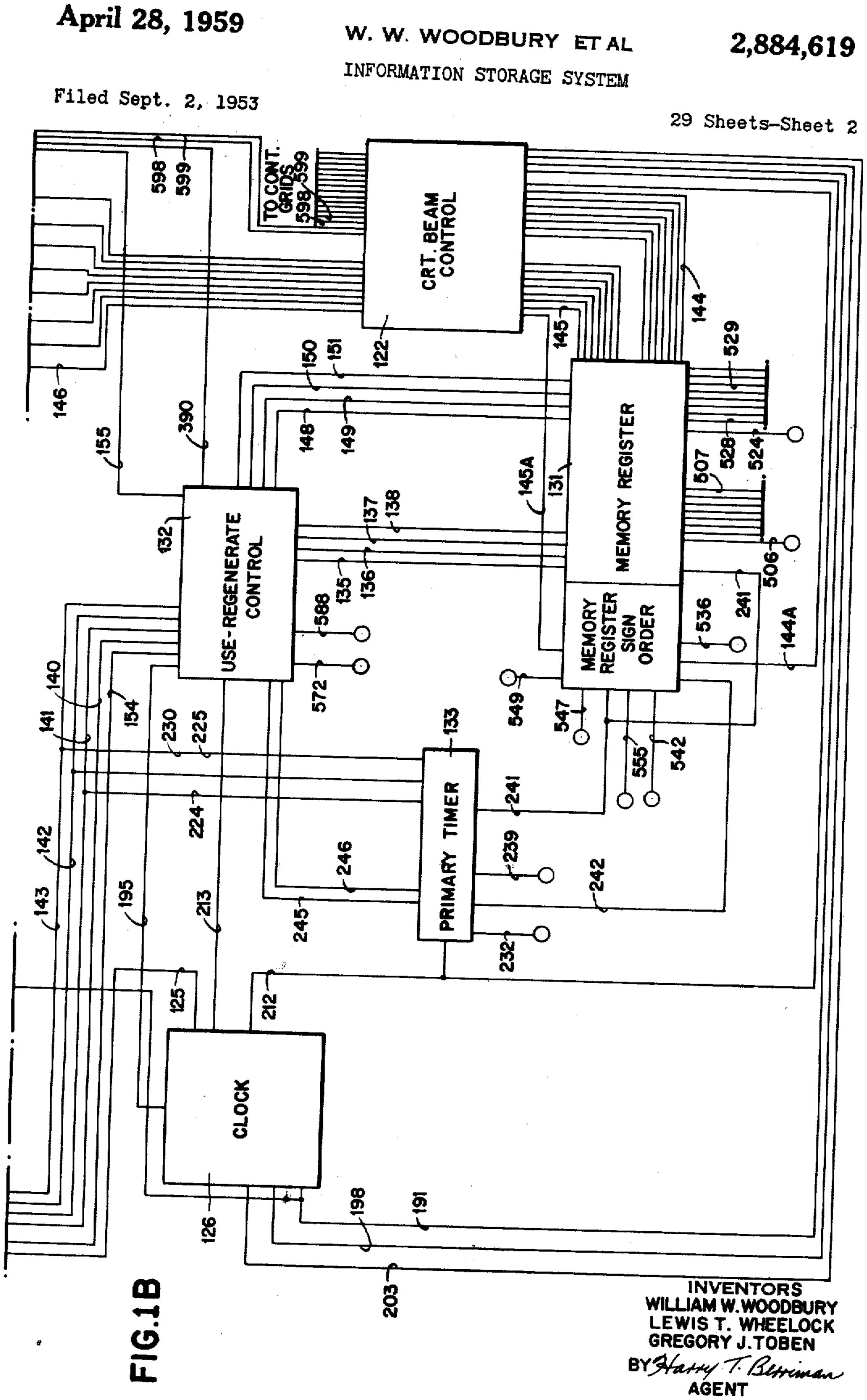
Figure 3:
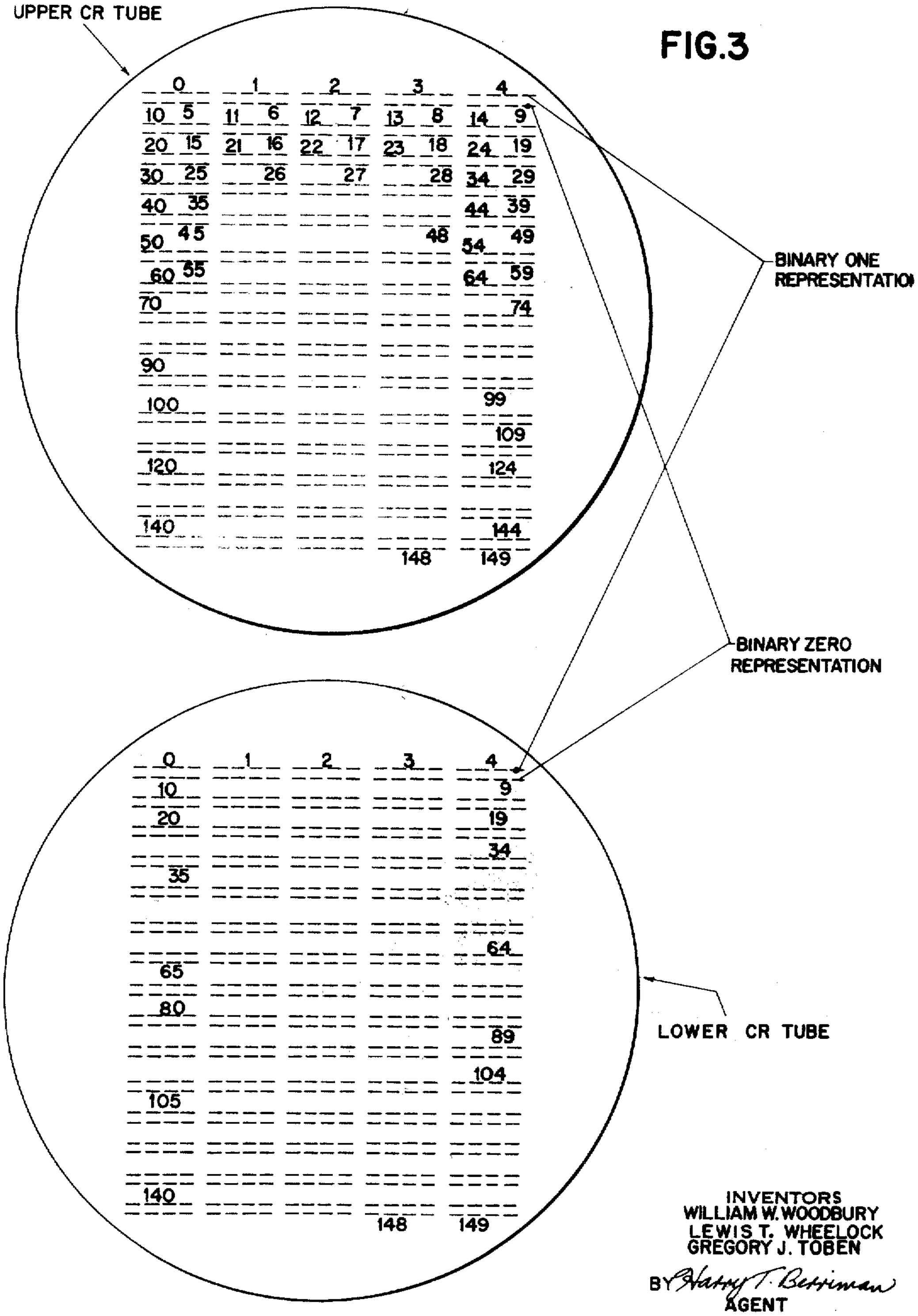
Fig. 3 is a diagrammatic representation of the raster pattern in which 150 address or storage positions are arranged on the screens of a pair of electrostatic storage tubes.
Figure 47:
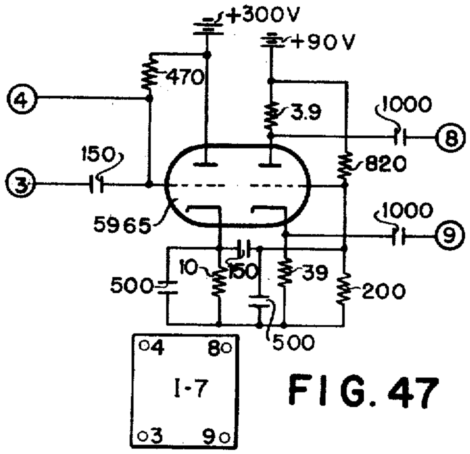
Figure 50:
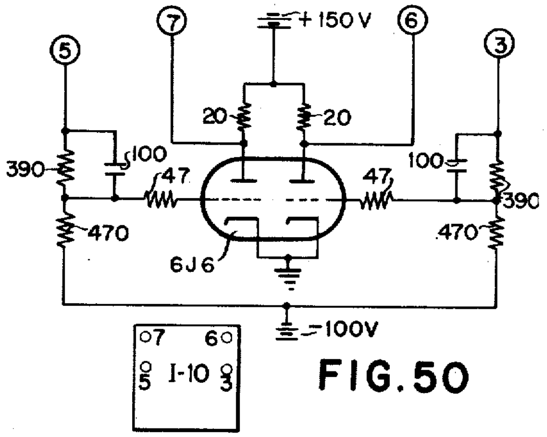

Before describing the general arrangement of the improved electrostatic stortage system, as shown in Figs. 1A and 1B, it is believed that the manner in which the binary one and binary zero charge patterns are formed on the screens of corresponding pairs of electrostatic storage tubes should be briefly explained. The binary one charge pattern is recorded on a pair of storage tubes in the following manner. A voltage waveform of appropriate shape is impressed on the horizontal deflection plates of both upper and lower tubes so that each of the related cathode ray beams, if turned on, would travel from a rest position, then slightly to the left of the rest position (looking at the tube from the screen end), then to the right for a distance equal to the width of the "bar" charge pattern, and then back to the left to the rest position. Means are provided so that only during the time interval when the deflection waveform is such as to shift the beams from the left to the right in their respective tubes, is the beam actually turned on. Consequently, a horizontal bar charge pattern is traced by the CRT (cathode raye tube) beams on the corresponding screens. After the deflection waveform has returned the CRT beams (then Off) to their rest position, the beam of the lower tube is again turned On to generate a spot charge pattern at the beam rest position of the previously traced bar charge pattern. A binary zero charge pattern is effected in the same manner except that the spot charge pattern is impressed on the bar charge pattern of the upper tube. The binary one charge pattern (bar-spot in lower tube and bar at corresponding position of upper tube) and the binary zero charge pattern (bar on lower tube and bar-spot at corresponding position of upper tube) are indicated in Fig. 3.

Referring again to Fig. 3, there is shown the manner in which 600 elementary storage areas are arranged in a 20 x 30 raster on the screen of a storage tube of the improved system. Since it takes corresponding elementary areas of two tubes to store either a binary one or a binary zero, as previously explained, a pair of tubes with such an arrangement has a capacity of 600 binary "bits." It will be noted that the elementary areas of the tube are arranged horizontally in groups of four, there being five such groups per "line" of elementary areas. Each group of four elementary areas and the corresponding areas in its mating tube, are referred to as a storage position or address position. The storage positions are numbered from 0 to 149 as shown, to give 150 storage positions per pair of tubes.

The corresponding 4 elementary storage areas (2 tubes) of a storage position are assigned weighted decimal significance, proceeding from left to right, in accordance with a 1, 2, 4, 8 binary code. Thus, a decimal number is recorded in a storage position in binary coded form by recording or writing a binary one in the required weighted area or group of such areas of the desired storage position, in accordance with the magnitude of the decimal value. For example, the value 7 is recorded in storage position 0 of a pair of storage tubes, by "writing" a binary one in weighted areas "1," "2," and "4" (total 7), and a binary zero in the weighted area "8" of that position. It will be remembered that a binary one consists of a bar-spot in the desired elementary area of a storage tube (lower) and bar in the corresponding area of the mating (upper) tube, while a binary zero indication is the converse of the binary one indication.

Referring again to Fig. 3, it is noted that the storage positions are also arranged in groups of 50, storage positions 0 to 49 comprising an upper group, storage positions 50 to 99 comprising a mid group, and storage positions 100 to 149 comprising a lower group in the respective tubes. It is also noted that of the ten "lines" forming each group of 50 storage positions, lines 1 and 2 are grouped together, lines 3 and 4 are grouped together and so forth. These latter groups have no function significance and are utilized only to facilitate visual inspection of the storage positions.

*General block diagram*

Referring now to Figs. 1A and 1B, there is shown in block diagram form, the circuit arrangement of an eight order electrostatic storage system. A separate pair of electrostatic storage tubes, such as the diagrammatically represented pair 100 and 101, are provided for each order. Each cathode ray tube comprises a cathode 102, a control grid 103, first and second anodes 105 and 106, a third anode 107 constituted by a conductive coating on the inside wall of the tube, a fluorescent screen 108 on the inside surface of the tube, and a conductive signal pickup plate 110 on the outside wall of the tube adjacent the screen. A pair of so-called horizontal deflection plates 111 and vertical deflection plates 112 are provided to deflect the electron beam in two ordinate directions. The anodes 105, 106, and 107 are maintained at high positive potentials, the remaining electrodes having suitable negative potentials to cause the tube to operate at a beam velocity such that the ratio of secondary emissive electrons, struck from the screen, to primary electrons arriving, is greater than unity. The combined fluorescent screens of each pair of storage tubes is adapted to provide 150 storage positions or addresses as previously described, and as shown in Fig. 3.

The vertical deflection plates 112 of all eight pairs of storage tubes are connected in a parallel manner, and in turn, are connected to a Vertical Deflection Control circuit 113. Similarly, the horizontal deflection plates 111 of all eight pairs of storge tubes are connected in parallel, and in turn, to a Horizontal Deflection Control circuit 115. As a result of this parallel arrangement, deflection voltage generated by circuit 113 and circuit 115, in a manner to be explained, and applied to the associated horizontal and vertical deflection plates of one tube, are also simultaneously applied to all the remaining tubes. This means that the cathode ray beams of all tubes, when turned on, are directed to corresponding areas of the associated screens 108. For example, if the voltage generated by circuits 113 and 115 is such that the beam of the upper tube 100 of the 8th order, if on, would impinge on the beam rest position of the "1" weighted area of the 0 storage position of the associated tube, the beams of all 15 remaining storage tubes, if on, would also impinge on the "1" area of the 0 storage position of their associated tubes.

The Horizontal Deflection Control circuit 115 is adapted to generate 20 distinct voltage steps or increments. Each of these voltage increments is capable of deflecting the CRT beams to the beam rest position of a corresponding one of the 20 elemental storage areas in a horizontal "line" of such areas (Fig. 3). Similarly, the Vertical Deflection Control circuit 113 is adapted to generate 30 distinct voltage steps or increments, each of these increments being capable of deflecting the CRT beams to a particular one of the 30 "lines" of storage positions in the tube. Consequently, by the proper combination of voltage increments from the Horizontal Deflection Control circuit 115 and the Vertical Deflection Control circuit 113, it is possible to deflect the CRT beams to the beam rest position of any one of the 600 elemental or "bit" areas in a tube. The selection of the various possible combinations of vertical and horizontal increment voltages, supplied by the circuit 113 and 115 is effected through either of two control units 116 or 117 in conjunction with a so-called 1248-Ring 120. Control unit 116 is referred to as the Address Register, while control unit 117 is referred to as the Regenerate Counter. The Address Register is adapted to control the circuits 113 and 115 so as to direct the CRT beams to the beam rest position of the "1" weighted area (extreme left hand area) of any one of the storage positions 0 to 99, while the Regenerate Counter is adapted to control the circuits 113 and 115 so as to direct the CRT beams to the beam rest position of the "1" weighted area of any one of the storage positions or addresses 0 to 149.

The control grid 103 of each of the CRT storage units is connected through a corresponding conductor 118 and either conductor 598 or 599 to a Cathode Ray Beam Control circuit 122. As its name implies, this circuit is adapted to selectively turn on the cathode ray beam of any one of the storage tubes by applying a voltage of proper form to the associated control grid 103.

Associated with the Horizontal Deflection Control circuit 115 is a so-called Bit Sweep circuit 123. This circuit, when actuated, impresses a voltage waveform of the horizontal deflection plates of all storage tubes which causes the associated beams to trace the bar charge pattern. For example, assume that the circuits 113 and 115, under control of either the Address Register 116 or the Regenerate Counter 117, are generating voltages such that the beam of each storage tube, if on, would be directed slightly to the right (beam rest position) of the left hand end of the "1" area of the 0 storage position of that tube. Thereafter, the bit sweep voltage is also impressed on the horizontal plates. This voltage has a waveform such that the beams if on, would move from the so-called rest position, to the left for a slight distance, then from left to right for a distance equal to the bar pattern, and then from the right back to the to the rest position. To write a bare in the "1" area of the 0 storage position of any tube, the control grid of that tube is activated so the associated beam is turned on during the application of that portion of the bit sweep waveform which moves the beam from the left to the right. If a spot is to be recorded on a particular bar pattern, the beam of that tube is again turned on after the bit sweep voltage has been removed from the horizontal deflection plates. Thus, the spot charge pattern will be recorded on the bar charge pattern at the so-called beam rest position.

The 1, 2, 4, 8-ring 120 mentioned previously in conjunction with the circuits 113 and 115, is a R stage closed ring circuit. This ring circuit is driven through conductor 125 from a 100 kc. pulse source in a Clock circuit 126, the latter being the source of all timing and activating pulses for the entire memory system. Every 10 microseconds (100 kc.) a pulse appears on conductor 125 and advances the ring 122 one stage. This is indicated on the timing diagram, Figs. 2A and 2B. The ring 120 is adapted to control the Horizontal Deflection Control circuit 115 so that the CRT beams are sequentially advanced at 10 microsecond intervals (100 kc.) from the rest position of the "1" area, of the particular storage area to which the beams are directed under control of either curcuit 116 or 117, to the rest position of the "2" area of the same storage area, to the rest position of the "4" area, and finally to the rest position of the "8" area of that storage position. When the beam is in the "2," "4," and "8" areas of the storage position or address, the bit sweep voltage is applied in the same manner as previously explained for the "1" area. The writing of a spot pattern on any one of these areas is also effected in the same manner as previously described. Thus, the interrogation of one full storage position or the recording of information in that position is effected during a 40 microsecond interval, as indicated graphically in Figs. 2A and B.

The previously mentioned Clock circuit 125 comprises a free running multivibrator (100 kc.) which is the master source of all pulses. This multivibrator, through circuits in this Clock circuit, produces four separate trains of 100 kc. pulses, each train of pulses being shifted in time from the other pulses. These pulse trains, which are shown graphically in Figs. 2A and B, are defined as "advance" pulses, "sample" pulses, "inspect" pulses, and "write" pulses.

The advance pulses are utilized to drive the previously mentioned 1, 2, 4, 8 Ring 120 and are also used for other purposes to be later explained.

The inspect pulses are used to drive the Bit Sweep circuit 123 and also to control the CRT Beam Control circuit 122 to turn on the beams of the tubes so that a bar charge pattern is formed. The tracing of a bar pattern is referred to as an "inspect" operation since during this operation, the particular elementary area (1, 2, 4 or 8) of the storage position in question, is inspected by the beam to determine if a spot was previously written on the bar of that particular area.

The sample pulses are used as "gate" pulses to gate the output of separate push pull amplifiers 127, one being associated with each CRT storage order (pair of tubes), during a time in which an output indication may be present thereon as a result of an inspect operation in a selected address of that order. Each amplifier 127 has two input terminals each of which is connected by a conductor 128 or 130 to the previously mentioned pickup plate 110 of a corresponding CRT tube of the related storage order. It will be noted in Figs. 2A and B, that a sample pulse appears slightly after an inspect pulse. This delay is necessary since an output pulse generated on the pickup plate of a storage tube as a result of an inspect operation has a finite transit time through the amplifier and associated circuits.

The write pulses are used to turn on the cathode ray beams of selected tubes to write the "spot" on the bar charge pattern as desired. It will be noted that a write pulse appears slightly before an advance pulse. At this time (Write), the cathode ray beam is in a rest position of the particular 1, 2, 4 or 8 area of the storage address in question. Turning the beam on at this time writes a spot charge pattern at that rest position. Immediately after write time, an "advance" pulse advances the 1, 2, 4, 8-Ring 120 one stage, which in turn, controls circuit 115 so as to "advance" the beam (not on) to the rest position of the next elementary area of that particular storage address.

Figure 2A:
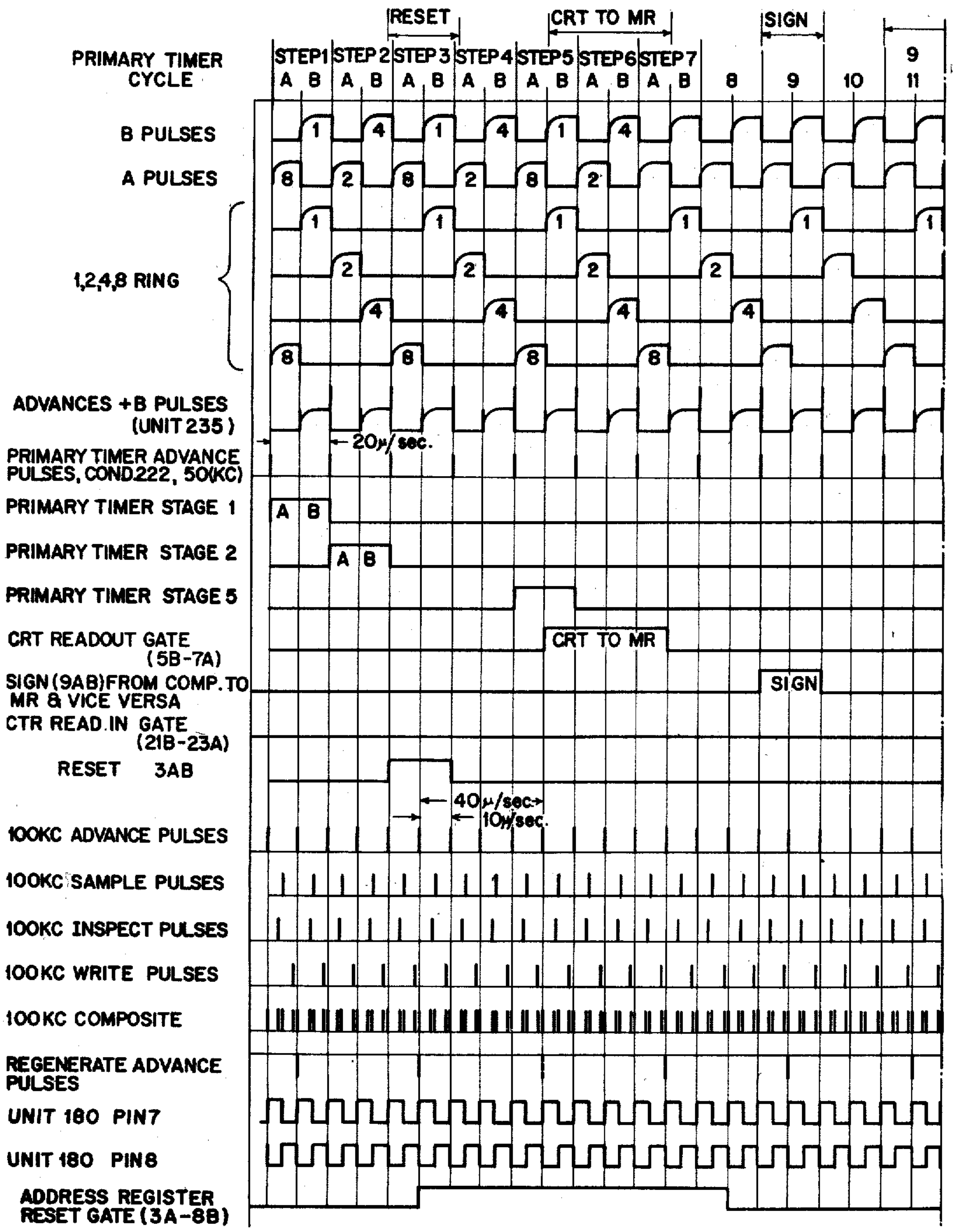

The composite operation resulting from these 4 types of pulses generated by the clock 126 is shown in Figs. 2A and B and may be summarized as the following sequenced events. First, advance the beam to the desired position; second, inspect this position by tracing a bar charge pattern; third, sample the output of an amplifier 127 to determine the result of inspection; fourth, write a "spot" on that elementary area in a selected tube; and fifth, advance to the next area whereafter the above sequence may be repeated.

Since this novel storage system is intended to be used as a component part of a digital computer, it must be possible to transfer information from the computer (not shown) to storage, and from storage to the computer as desired. This transfer is effected through a buffer storage register which forms part of the storage system, this unit being known as the Memory Register 131.

This Memory Register is a nine order, trigger storage device adapted to store one 8 order number, plus a sign indication. The first order of the register is utilized to store the sign representation while the remaining 8 orders are utilized to store the numeric information. During a memory readout operation, the information in any desired storage position is readout of the electrostatic storage tubes (CRT) and transferred to the Memory Register (MR), the number from the 8th order pair of tubes going to the 8th order of the Memory Register and so forth. Conversely, during a memory readin operation, the number (and its sign) in the Memory Register (MR) may be read into any storage position in the electrostatic storage tubes (CRT). At a time distinct from memory readin or memory readout time, a number may be read from the Register 131 to the computer, or from the computer to the Register. The transferring of numerical data from the computer via the Memory Register (MR) to the electrostatic storage tubes (CRT) and from the storage tubes via the Memory Register to the computer is controlled on a sequenced and timed basis by a so-called Use-Regenerate Control circuit 132, which in turn, is controlled by a Primary Timer 133. These last mentioned circuits will be explained later.

Each of the seven numeric orders of the Memory Register 131 comprises a 4 stage trigger storage device, the stages of the device being assigned weighted decimal significance of 1, 2, 4 and 8. Thus, a number is stored in each order of the Memory Register in the same binary coded form as a number is stored in the CRT storage tubes. For example, to store the 7 order number 9657347 in the Memory Register, the "1," "2,", and "4" (total 7) triggers of the 2nd order of the register, are turned on, the "4" (total 4) trigger of the third order register is turned on, etc. The sign order (1st order) of the Memory Register consists of a single trigger which is normally reset to a position representative of a plus sign. If the number in the Memory Register is negative, this is indicated by flipping the sign trigger to its other side. A negative sign is represented in the CRT storage by inserting the decimal value 1 in the desired address of the 1st order of cathode ray tube (CRT) storage.

Associated with each trigger (1, 2, 4 and 8) of a numeric Memory Register order is a separate readout gate circuit (readout to CRT storage from Memory Register), and a readin gate circuit (readin to Memory Register from CRT storage). Each gate is of the dual coincidence type in that two control elements must be activated before the gate is rendered operative.

One control element of each readout gate is connected to the associated trigger and is rendered operative when that trigger is in an "On" condition (indicating a binary one), while the other control element of each readout gate is connected to a corresponding conductor 135, 136, 137 or 138, through the Use-Regenerate Control circuit 132, to a particular output conductor 140, 141, 142 or 143 of the 1, 2, 4, 8 Ring 120, this latter conductor corresponding to the weighted value of the trigger associated with that gate. For example, one of the control elements of the individual readout gate associated with each "2" trigger of the Memory Register (MR), is connected through conductor 136 to the "2" output conductor 141 of the 1, 2, 4, 8 Ring 120. This arrangement permits all the 1, 2, 4 and 8 triggers of each Memory Register to be interrogated sequentially by the 1, 2, 4, 8 Ring in synchronism with the indexing of the associated CRT beams to the 1, 2, 4 and 8 elemental areas of the storage address to which the Memory Register (MR) information is to be transferred. For example, assume that the decimal value seven (1, 2, 4 triggers on) is registered in the 3rd order of the Memory Register. During a reading out of the register to CRT storage, the cathode ray beams of the corresponding 3rd order pair of beams are directed first to the "1" elemental area of the desired storage address as previously explained. At this time, the 1, 2, 4, 8 Ring 120 has its "1" stage On so that through the conductor 140, the circuit 132 and the conductor 135, one control element of the readout gate of the "1" storage trigger of each Memory Register order is rendered operative. Since the other remaining control element of the "1" trigger readout gate of this 3rd MR order is already operative, since the corresponding trigger is On, the "1" readout gate of the 3rd order will be actuated. This results in a corresponding 3rd order control conductor 144 being activated and, as a result, the CRT Beam Control circuit causes a binary 1 to be recorded in the "1" elemental area of the desired storage address. Thereafter, the 1, 2, 4, 8 Ring 120 advances to its 2 position and the "2" readout gate is rendered operative to transfer the binary one from the "2" trigger of the third order to the "2" elementary area of the chosen storage address. Thereafter, the 1, 2, 4, 8 Ring advances to the "4" position and the binary one in the "4" trigger is transferred from the Memory Register to the "4" elemental area. With the advance of the 1, 2, 4, 8 Ring to the 8 position, however, the "8" readout gate of the 3rd order register remains inoperative since the associated "8" trigger is off. Thus, a binary zero is recorded in the "8" elemental area of the chosen storage address.

Readin of information to the Memory Register from a particular CRT storage position is effected in a similar manner. One control element of each readin gate circuit associated with each 1, 2, 4 and 8 trigger of an order of the Memory Register is connected through an associated conductor 145 through the CRT Beam Control circuit 122 to the output conductor 146 of the push-pull amplifier 127 corresponding to that Memory Register order. The other control element of each readin gate is connected by a corresponding conductor 148, 149, 150 or 151, through the control circuit 132 to the particular output conductor 140 to 143, which corresponds to the weighted value of the trigger associated with that readin gate. When both control elements of a readin gate are simultaneously actuated, that readin gate operates to flip the associated MR trigger from Off to On. Thus, during the reading in of a number seven to the 3rd order of the Memory Register, from a particular storage address of the 3rd order storage tubes, the binary one signals, generated on the related amplifier output conductor 146, as a result of the serial reading out of the 1, 2 and 4 elementary areas of that storage address, are applied through related conductor 145 to the four readin gates associated with the four triggers of the 3rd order of the Memory Register.

These serial readout signals from the CRT storage are coincident with the activation of the conductors 148, 149 and 150 by the 1248-Ring 120. As a result of this coincidence, the 1, 2 and 4 readin gates only of the 3rd Memory Register order are actuated to flip the associated 1, 2 and 4 triggers On. Thus, the number seven has been transferred from the 3rd order storage tubes to the third order of the Memory Register.

The peviously mentioned Primary Timer 133 comprises a closed, 24 stage, trigger ring circuit. The timer is driven indirectly, in a manner to be later explained, by every other 100 kc. advance pulse, as shown graphically in Figs. 2A and B. Thus, each step of the Primary Timer is 20 microseconds long with the total Primary Timer cycle being 20 x 24 or 480 microseconds long. When the timer is in its 24th step position, the next timer advance pulse advances it to the 1st step position so that its operation is continuous. It will be noted that in Figs. 2A and B, each Primary Timer step is divided into two equal 10 microsecond intervals, the first half being known as the A portion and the second half being defined as the B portion. The Primary Timer controls the operation of the entire storage system and of the associated computer (not shown) on a 24 step cyclic basis, which is indicated at the top of Figs. 2A and B, with each of the various possible operations being effected during a predetermined step or series of steps of the timer.

The time in each cycle during which the principal storage system operations are effected is also indicated in Figs. 2A and B and are as follows: from 5B time (middle of timer step 5) through 7A time (middle of timer step 7) information may be read from the CRT storage to the Memory Register (CRT to MR) during 9AB time (entire timer step 9) the sign of a number in the computer may be transferred from the computer to the sign order (1st) of the Memory Register, or the sign of a number in the Memory Register may be transferred to the computer; from 11A through 19B (digit time), a number in the computer may be transferred from the computer to the Memory Register or vice versa; from 21B through 23A time, information may be read from the Memory Register to the CRT storage (MR to CRT), and during 3AB time the various circuits are reset.

It will be noted in Figs. 2A and B, that the 1, 2, 4 and 8 Ring 120 operates continuously and is synchronized with the Timer cycle. This synchronism of the two units, which will be later explained, results from the fact that they are driven indirectly from the same pulse circuit. The timed relationship between the 1, 2, 4, 8 Ring and the Timer is utilized through the Use-Regenerate Control circuit 132, in a manner previously explained, to effect CRT to MR transfer or MR to CRT transfer by sequentially connecting the 1, 2, 4, 8 Ring output conductors 140 to 143 through conductors 148 to 151, respectively to the associated 1, 2, 4, 8 read-in gates of the Memory Register from 5B through 7A time; and by sequentially connectng the 1, 2, 4, 8 Ring output conductor 140 to 143, through conductors 135 to 138, respectively, to the corresponding 1, 2, 4, 8 readout gates of the Memory Register during 21B through 23A time. This connecting action in the Use-Regenerate Control between the 1, 2, 4, 8 Ring and the readin gates of the Memory Register from 5B through 7A time, is effected by a 5B–7A gate pulse (see Figs. 2A and 2B), which in turn, is initiated by the coincidence of the "1" output pulse of the 1, 2, 4, 8 Ring, and the B portion of a 5AB pulse from the Timer 133. This action will also be later explained in detail. Similarly, a 21B through 23A gate pulse initiated by a "1" output pulse of the 1, 2, 4, 8-Ring and the B portion of a 21AB pulse from the Timer, effects the required switching action from 21B through 23A.

The Use-Regenerate Control circuit 132, as its name implies, controls the periods during the Primary Timer cycle when the CRT may be used (5B through 7A and 21B through 23A), as previously explained, and also, causes the patterns in the CRT to be systematically regenerated during the remaining portions of the Primary Timer cycle (23A through 5A time, and 7B through 21A time). This action is effected as follows: Referring to Figs. 1A and B, it will be noted that two conductors 154 and 155 extend between the Use-Regenerate Control circuit 132 and a Gate circuit 156. During Use time (5B–7A and 21B–23A), conductor 154 is positive, which actuates the Gate circuit 156, so as to put the Vertical and Horizontal Deflection Control circuits 113 and 115 under control of the previously mentioned Address Register 116. During Regenerate time (23A–5B, 7B–21A), the conductor 155 is positive, which actuates the Gate circuit 156, so as to put the Vertical and Horizontal Deflection Control Circuits under control of the previously mentioned Regenerate Counter 117.

The Address Register 116 comprises a 2 order trigger counter, each order having 4 triggers, connected so as to accumulate in accordance with a 1, 1, 2, 5 binary code. Any number between 0 and 99 may be represented in the counter by applying a correct number of pulses to the units and tens orders thereof, through a tens entry conductor 158 and a units entry conductor 159. Dependent upon the number represented in the counter (0 to 99), the Vertical and Horizontal Deflection Control circuits 113 and 115 are actuated during Use time so as to apply the appropriate horizontal and vertical deflection voltages to the storage tubes (CRT) to direct their beams to the address (storage position) corresponding to the address register value. For example, assume that it is desired to read out the information at storage position 37 to the Memory Register. During so-called digit time (11A through 20A) of the cycle preceding the actual readout cycle (see Fig. 2A), a train of seven pulses are applied to the units entry channel 159 and a train of three pulses are applied to the tens entry channel 158. These pulses are emitted from the computer (not shown) as a result of a programmed action. The three pulses applied to the tens order of the register turn on the "1" and "2" triggers of that order, thus indicating the desired value 3, while the 7 pulses applied to the units order of the register, turn On the "1," "1" and "5" triggers of that order, thus indicating the desired value 7. When the Gate 156 is operated at 5B time of the next cycle by the positive shifting of conductor 154, the value 37 in the Address Register actuates the Horizontal and Vertical Deflection Control circuits so as to direct the CRT beams to the beam rest position of the "1" weighted area of storage address 37. Thereafter, from 5B through 7A, storage position 37 is readout and the information transferred to the Memory Register. If information is to be read from the Memory Register to address position 37, for example, the Address Register is advanced to 37, as before, during 11A through 20A time. Thereafter, during the Use portion (21B through 23A), the number in the Memory Register is readout and transferred to address 37 of the CRT.

Since the Address Register is a two order register and has a maximum capacity of 99, it is possible to reach only storage addresses 0 to 99 of the CRT under control of this register. In the computer in which this particular storage system is utilized, it is necessary to have only 99 positions of "addressed" storage available. The remaining storage positions (100 to 149) are reached in a different manner with which we will not be concerned here. However, it is obvious to anyone skilled in the art that by using a 3 order address register, any one of the address or storage positions 0 to 149 could be reached at will. It is believed obvious that the 2 order register adequately demonstrates the principle of addressed storage.

The Regenerate Counter 117 is a counting device adapted to count by ones, from 0 to 149, and then repeat the cycle. During Regenerate time with the conductor 155 being positive, the Gate 156 operatively connects the Regenerate Counter to the Vertical and Horizontal Deflection Control circuits 113 and 115. Also during the Regenerate portions of the cycle, the Use-Regenerate Control supplies 25 kc. advance pulses to the Regenerate Counter through conductor 390, as indicated in Figs. 2A and B. Each advance pulse applied to the counter advances it to its next numeric position. The Regenerate Counter, when in operation, controls the Deflection Control circuits so as to direct the CRT beams to the storage position corresponding to the number represented in the counter. Thereafter that storage position is regenerated on a 40 microsecond cyclic basis as previously explained, and as shown in Figs. 2A and B. The Regenerate Counter then advances one position and the next successive storage position is regenerated in the same manner.

The regeneration of successive storage positions continues until the Use-Regenerate Control 132 disconnects the counter 117 from the deflection circuits by shifting the potential of line 155. This action takes place at the beginning of either of the two Use times (5B–7A or 21B–23A). At the same time, the Use-Regenerate Control stops emitting advance pulses to the counter over conductor 390 and the counter stops. Thus, the counter "remembers" the last position regenerated and when the next Regenerate time arrives, the counter advances to its next numeric position and continues the systematic regeneration of the CRT storage. For example, assume that the counter is advancing 25, 26, 27, 28 so as to regenerate storage positions 25, 26, 27 and 28. After the 28th position is regenerated, the Use-Regenerate Control suspends regeneration for a Use operation. The Regenerate Counter thus stops at 28. During the Use operation, the beams are deflected to any one of the storage positions 0 to 99 as desired, under control of Address Register 116. Thereafter, the Use-Regenerate Control again initiates a Regenerate operation. As a result, the Regenerate Counter 117 advances to 29 and storage position 29 is regenerated whereafter the counter advances to 30 etc., until regeneration is again suspended for a Use operation. In this manner, the 149 storage positions are systematically regenerated approximately 15 complete cycles (primary timer) being required to regenerate all the storage positions.

Figure 15:
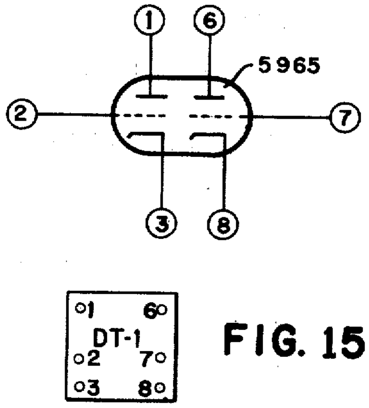
Figs. 15 and 16 are detail circuit diagrams and corresponding block symbols of two of the duo-triode type vacuum tube units utilized in the storage system.
Figure 16:
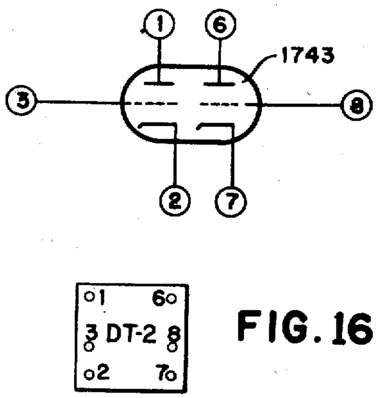
Figure 23:
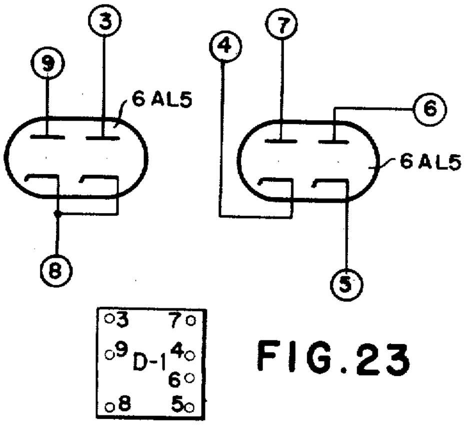
Figs. 23 to 25 are detail circuit diagrams and corresponding block symbols of the various electronic diode units utilized in the storage system.
Figure 24:
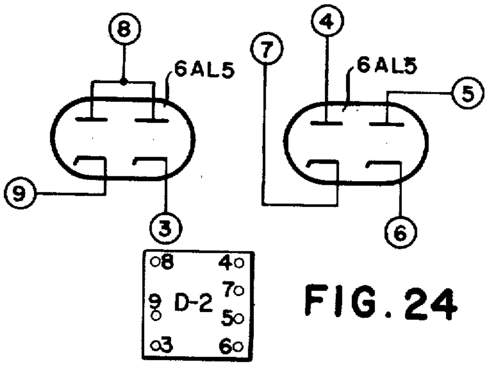
Figure 25:
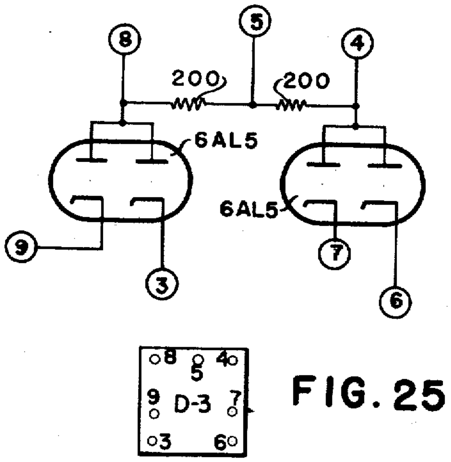
Figure 28:
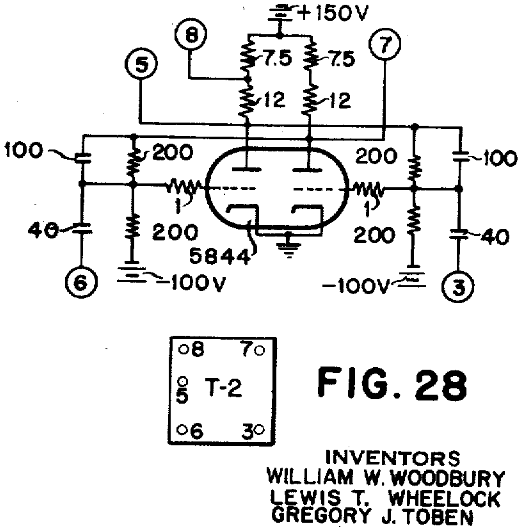
Figure 29:
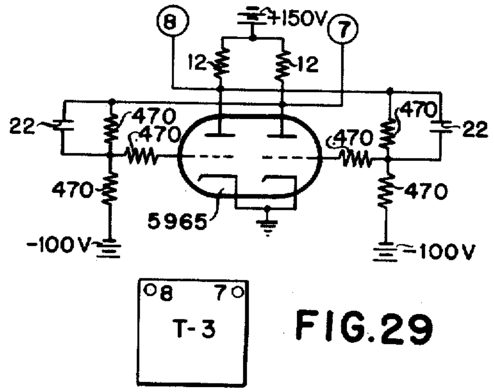
Figure 32:
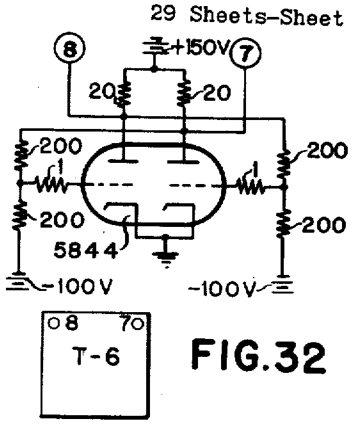
Figure 30:
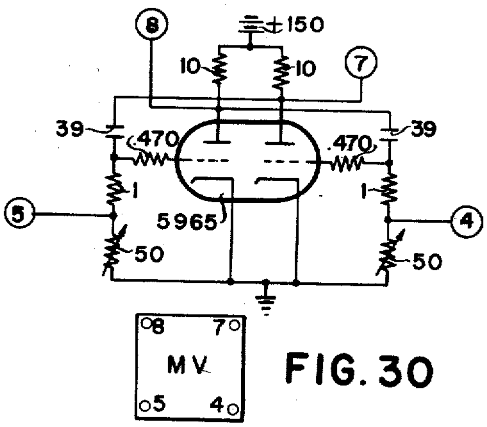
Fig. 30 is a detail circuit diagram and corresponding block symbol of the multivibrator unit utilized in the clock circuit.
Figure 33:
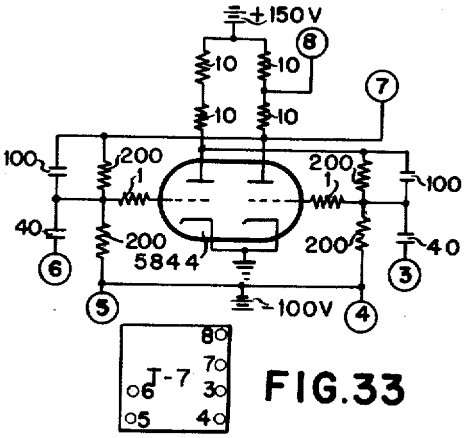

Each of the previously mentioned control circuits will hereinafter be explained in detail. In each of the drawings of the various control circuits, the units making up that circuit are indicated merely as a box or block. The detailed circuitry of each block will also presently be described. For example, refer to Fig. 51 which represents the block diagram of the clock circuit 126. Each of the component blocks or units comprising a particular circuit, is labeled inside the block with a letter or letters in combination with a number. By referring to Figs. 15 to 50, the detailed circuitry of any component block may be determined by matching the letter-number designations. Each of the particular letter combinations in the component block, in addition to acting as a reference designation, also denotes the function of the component. Thus, all the units shown in Figs. 4 to 14, for example, are cathode followers, and are accordingly labeled with the prefix letters CF; all the units shown in Figs. 17 to 22 are power units and are accordingly labeled with the prefix letter P; all the units shown in Figs. 23 to 25 are multiple diode units and are accordingly labeled with the prefix letter D; all the units shown in Figs. 27 to 29 and 31 to 35 are trigger units and are accordingly labeled with the prefix letter T; all the units shown in Figs. 36 to 40 are switch units and are accordingly labeled with the prefix letter S, and all the units shown in Figs. 41 to 50 are inverter units and are accordingly labeled with the prefix letter I. The unit DT–1 shown in Fig. 15 is a dual triode tube—type 5965, while the unit DT–2 shown in Fig. 16 is also a dual triode tube—type 1743. The unit MV shown in Fig. 30 is a multi-vibrator unit.

Before proceeding with a description of the various control circuits of the storage system, as shown in Figs. 51 to 65, a brief description of representative ones of the circuit units or components (Figs. 4 to 50) utilized in these control circuits will be given. In each of the unit diagrams and other circuit diagrams, the values of the various resistors utilized therein are labeled in thousands (K) of ohms, while the values of the various capacitors are indicated in micro-microfarads, if the capacitor value designation is a whole number, or in microfarads if the capacitor value designation is in a fractional (decimal) number. Hereinafter, in this specification wherein a conductor or a circuit terminal, etc. is referred to as being shifted positive or negative in potential, this does not necessarily mean that the point in question is positive or negative in an absolute sense, but only more positive or more negative relative to its previous state. This principle also applies to any description wherein positive and negative pulses are mentioned.

Figure 5:
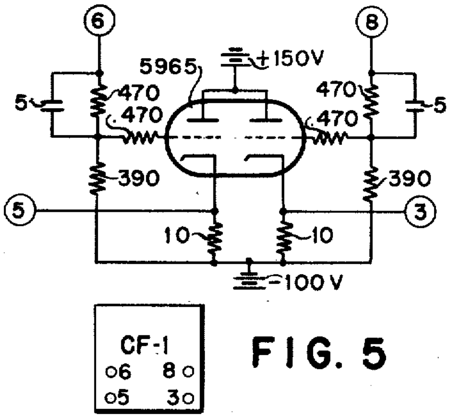
Figure 8:
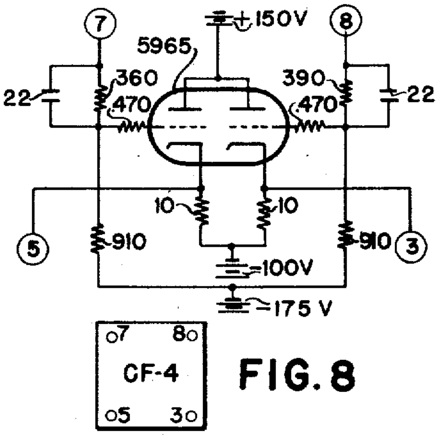

Referring now to Fig. 5, a unit CF–1 comprises a dual triode vacuum tube—type 5965. The grid of each of the triodes is connected through series connected resistors of 470K ohms and 390K ohms to a −100 volt supply. The cathode of each triode is respectively connected through a 10K ohm resistor to the −100 v. supply. The plates of the two triode sections are commoned and connected to a plus 150 volt supply. The juncture of the 470K and 390K resistors of each triode is connected, respectively, via at 470K resistor in parallel with a 5 micro-microfarad condenser, to an input terminal 6 (or 8). The output of each triode is taken from terminal 5 (or 3) connected to the cathode side of the related 10K resistor. The input terminal 6 (or 8) is connected to a switching potential which is either at a potential of plus 150 volts or plus 50 volts. With plus 150 volts on terminal 6 (or 8), the associated grid is maintained at such a potential that the tube current is at a maximum and accordingly the cathode terminal 5 (or 3) is at a maximum potential of plus 20 volts. With plus 50 volts on terminal 6 (or 8), the associated grid is maintained at such a potential that the tube current is at a minimum and accordingly the cathode terminal 5 (or 3) is at a minimum of −25 volts. Thus, a shift of potential on the terminal 6 (or 8) effects a corresponding in phase shift of potential of the related output terminal 5 (or 3). This well-known type of tube action is referred to as cathode follower action. It will be noted that the cathode resistor of each triode is of relatively low value. As a result, the cathode output terminal serves as a low impedance signal source. A low impedance signal source may be "loaded" appreciably without substantially affecting the magnitude of the signals supplied therefrom. This is the main purpose of a cathode follower unit. The capacitor, shunting the 470K input resistor, is to rapidly apply the voltage shift of the input terminal 6 (or 8) to the related grid so that the resultant shift in potential of cathode terminal 5 (or 3) does not appreciably lag the input voltage. Units CF3, 4, 7, 7A, 8 and 10, which are shown in Figs. 7, 8, 11, 4, 12 and 14, respectively, function in essentially the same manner as unit CF1, although the magnitude of the switching voltages may differ from that for unit CF1.

Figure 6:
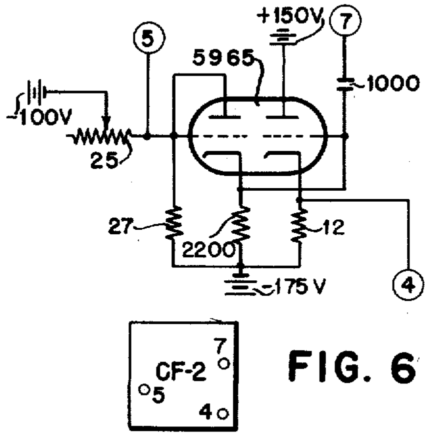

Referring now to Fig. 6, a unit CF2 functions in the following manner: This unit also comprises a dual triode tube—type 5965. The plate terminal 5 of the left hand triode portion is connected through a potentiometer, as shown, to a −100 volt source. This plate terminal 5 is also connected through a 27K resistor to a −175 volt supply. The associated cathode is also connected to this −175 volt supply through a 2200K resistor. By properly adjusting the potentiometer, the conduction of the associated left hand triode may be adjusted so that the potential of its cathode, and in turn the potential of the commoned grid of the right hand triode, is maintained at a required value, so that the conduction of the right hand triode is such as to give a desired quiescent potential at the associated cathode terminal 4. The potential of the cathode terminal 4 of the right hand triode is, therefore, normally "clamped" to a potential, as determined by the left hand triode. Upon the application of a positive pulse to capacity coupled grid input terminal 7 of the right hand triode, the associated grid is momentarily shifted positive, thus rendering the triode more conductive, which results in the cathode terminal 4 shifting momentarily positive from its "clamp" position. Thereafter, with the disappearance of the positive pulse from the grid, the cathode terminal 4 restores to its "clamp" potential.

Figure 9:
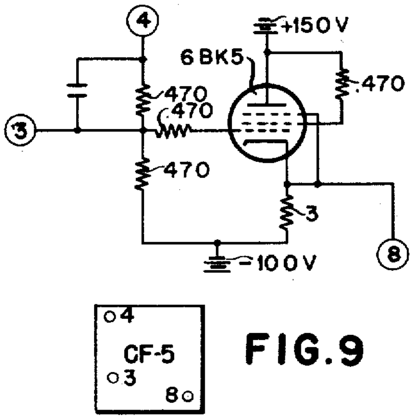
Figure 7:
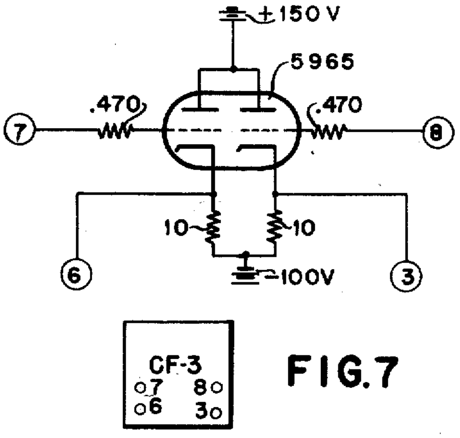
Figure 10:
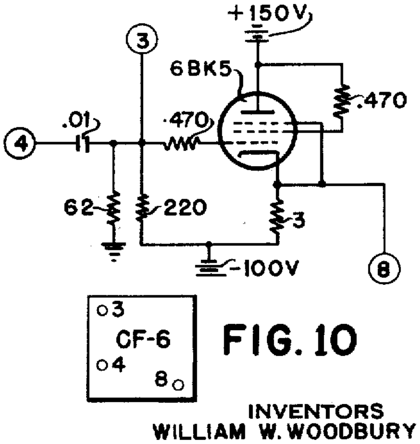
Figure 11:
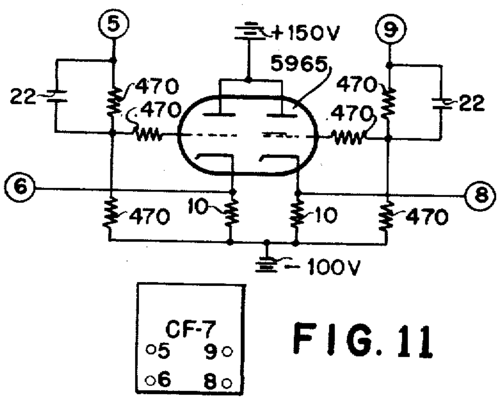
Figure 14:
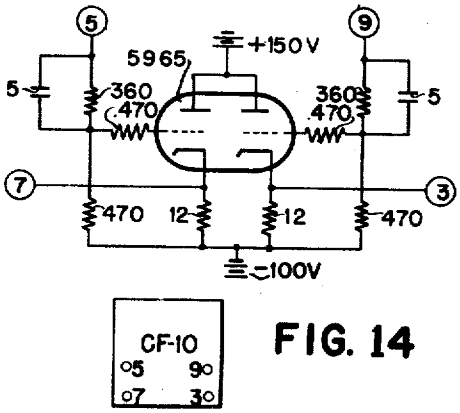

Referring now to Fig. 9, a unit CF–5 functions in the following manner. In this unit, a pentode tube, type 6BK5, rather than a triode, is connected as a cathode follower, but its operation is essentially the same as previously described for the triode units. Positive and negative voltage shifts may be impressed on the number 1 grid of the pentode through either of two input terminals 3 or 4. Terminal 3 is connected directly to the grid through a 470K grid resistor, while terminal 4 is connected to the same grid resistor, via a condenser and a resistor in parallel as shown. As the number 1 grid shifts positive or negative through the application of a suitable waveform to either one of the input terminals 3 or 4, the potential of the cathode terminal 8 "follows" the grid potential. A unit CF–6, as shown in Fig. 10, also uses a pentode tube rather than a triode tube, and is essentially the same as unit CF–5.

Figure 13:
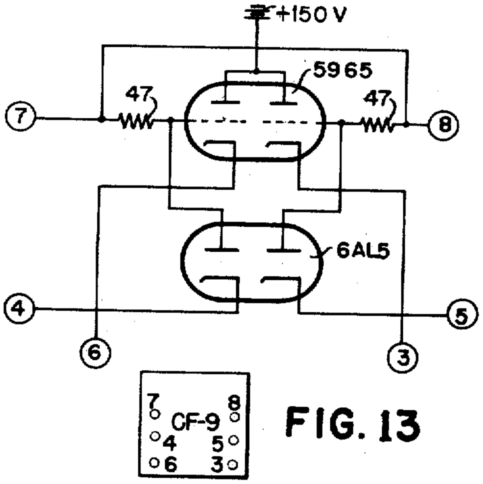

Referring now to Fig. 13, it is noted that a unit CF–9 comprises two triode cathode followers, each of which has been modified by connecting the plate of an associated diode (tube type 6AL5) directly to the grid of the triode. The cathode of the associated diode is connected respectively to an input terminal 4 (or 5). Referring specifically to the left hand follower, if the grid input terminal 7 shifts positive, while the terminal 4 remains negative relative thereto, the related diode conducts so that the grid potential of the triode is essentially that of the cathode (terminal 4) of the diode. Thus, the positive shifting of grid input terminal 7 alone has no effect on the associated triode. However, if the input terminal 4 is shifted positive until it equals the positive potential of terminal 7, the diode is cut off and the grid of the triode rises in potential. This causes the cathode terminal 6 to rise in potential. Thus, a positive output is obtained from cathode terminal 6 only if associated terminals 7 and 4 are simultaneously positive. The right hand follower functions in the same manner.

Figure 27:
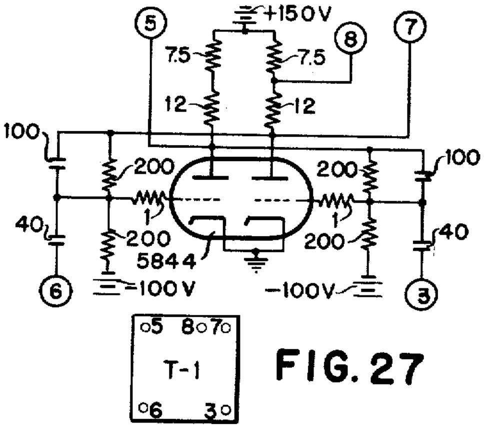
Figs. 27 to 29 and 31 to 35 are detail circuit diagrams and corresponding block symbols of the various electronic trigger units utilized in the storage system.

Referring now to Fig. 27, a trigger unit T–1 is conventional in construction and comprises two retroactively coupled triode sections of a type 5844 vacuum tube. By proper selection of circuit components, the unit T–1 is so arranged that only one of the triode sections is conductive at a time in accordance with well-known trigger operation. With the right hand triode conducting, the trigger is defined as being in an Off position. With the trigger Off, the plate terminals 8 and 7 of the right hand triode are at some potential below the supply potential of plus 150 volts, due to the current being drawn through the right hand triode. As a result, voltage sensitive circuits which may be connected to terminals 8 and 7 are accordingly controlled. With the trigger Off as assumed, the plate terminal 5 of the non-conducting left hand triode is at the supply potential of plus 150 volts and a voltage sensitive circuit connected thereto may be accordingly controlled.

If a negative going waveform is applied to input terminal 3, the grid of the right hand triode starts to shift negative. As a result, the triode is rendered less conductive. The resultant positive shifting of its plate is applied through a 100 micro-microfarad condenser to the grid of the left hand triode and renders this triode conductive. The resultant negative shifting of the plate of the left hand triode is then applied through an associated 100 micro-microfarad condenser to the grid of the right hand triode and renders it less conductive. With the right hand triode less conductive, the left hand triode is rendered more conductive. This retroactive action between the left and right hand triodes continues until the left hand triode is fully conductive and the right hand triode is non-conductive. This retroactive action is very rapid, so that in effect, the application of the negative shift to terminal 3 almost instantaneously initiates the "flipping" of conduction from the right to the left hand triode. With the left hand triode conducting, the trigger is defined as being in an On condition. With the trigger On, the plate terminal 5 of the left hand triode is at a low potential, while the plate terminals 8 and 7 of the right hand triode are at plus 150 volts. With the shift of potential of terminals 5, 8 and 7, associated circuits are accordingly controlled.

The trigger T–1 is flipped from its On to its Off position by applying a negative voltage shift to grid input terminal 6 of the left hand triode. The trigger unit is insensitive to positive voltage shifts applied to the terminals 6 and 3. Thus, if the trigger is On, it cannot be shifted Off by positively pulsing the grid of the right hand or non-conductive triode, but only by negatively pulsing the grid of the left hand or conductive triode. This selective response to only negative pulses is effected by proper choice of bias potential. The trigger units T–2, T–3 and T–5 to T–8, as shown in Figs. 28, 29 and 31 to 34, respectively, function in essentially the same manner as unit T–1. The trigger unit T–9 (Fig. 35) is generally similar to the other trigger units, except that the grids are provided with independent inputs 4 and 5. Hereinafter in this specification wherein a trigger is mentioned, the trigger is defined as being Off if the right side (triode) is conductive, or On if the left side (triode) is conductive.

The unit shown in Fig. 30 is a conventional free running multivibrator comprising capacity coupled triodes.

Figure 36:
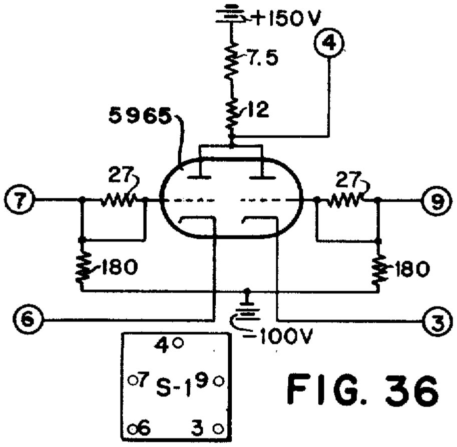

Referring now to Fig. 36, switch unit S–1 comprises a dual triode, type 5965, the plates of which are commoned, as shown and connected to a plus 150 volt supply. The grid of each triode is connected through a suitable resistor to a −100 volt bias supply. The triodes are normally cut off and, as a result, the plate output terminal 4 is at plus 150 volts. If either of the triodes is rendered conductive, the plate terminal 4 drops in potential, since the triode plates are commoned. Referring now to the left hand triode, the grid input terminal 7 is adapted to be switched between approximately −30 volts to plus 20 volts, while the associated cathode terminal 6 is switched between plus 40 volts and −20 volts. With the grid terminal 7 at −30 volts, and the cathode terminal 6 at plus 40 volts, the triode is cut off since the grid is, in effect, 70 volts below the cathode potential. If the grid terminal 7 is then shifted to plus 20 volts, the triode still remains cut off since the potential is still 20 volts below the cathode potential. However, if the grid terminal is at plus 20 volts and the cathode terminal is then shifted to −20 volts, the triode conducts, since the grid potential is then above the cathode potential. The unit S–1, therefore, functions as a coincidence switch or an "and" circuit, in that plate terminal 4 is normally at a high potential, and remains so until grid terminal 7 is at a high potential, at the same time that cathode terminal 6 is at a low potential. The switch unit S–1 may also be actuated by subjecting the grid terminal 9 and the cathode terminal 3 of the right hand triode to corresponding potentials as described above for the left hand triode.

Figure 37:
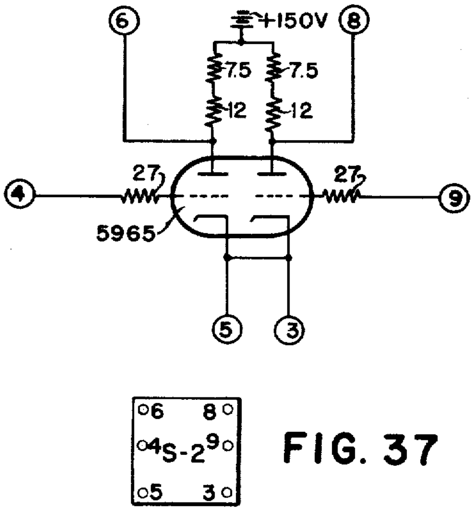

Referring now to Fig. 37, unit S–2 is similar to unit S–1, except that the plates are not commoned. As a result, the two triode portions are independent of each other. Each of the triodes function in the same manner as previously described for unit S–1 in that a triode is non-conductive, except when the grid terminal 4 (or 9) is shifted positive at the same time that the associated cathode terminal 5 (or 3) is shifted negative.

Figure 40:
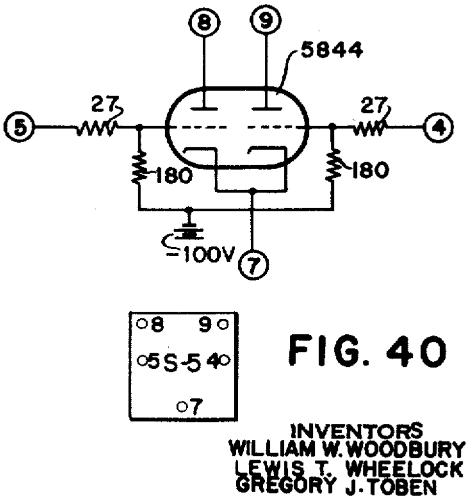

Referring now to Fig. 40, unit S–5 is similar to unit S–2, except that the cathodes of the two triodes are commoned. Thus, if cathode terminal 7 is shifted negative, etiher the right or the left hand units is rendered conductive if the corresponding grid terminal 5 or 4 is simultaneously shifted positive.

Figure 39:
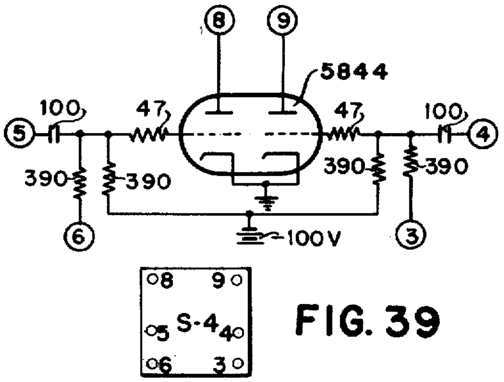

Referring now to Fig. 39, a switch unit S–4 comprises a dual triode tube, type 5844, in which the cathodes have been commoned. The grid of each triode is connected through a 47K resistor to the juncture of a two resistor network extending between terminal 6 (or 3) and a −100 volt supply. With terminal 6 (or 3) at some predetermined potential, the juncture of the associated resistor network and in turn the grid of the associated triode, is maintained at a sufficiently negative bias level below the associated grounded cathode so that the application of a positive pulse via input terminal 5 (or 4) and its associated capacitor cannot drive the grid sufficiently positive to render the triode conductive. However, if terminal 6 (or 3) is shifted positive from the previously mentioned predetermined potential, the bias level of the grid is accordingly shifted positive so that the application of a positive pulse to terminal 5 (or 4)

drives the triode into conduction. A switch unit S–4, therefore, functions as a coincidence switch in that both terminals 5 (or 4) and 6 (or 3) must be simultaneously positive to render the associated triode conductive so that plate output terminal 8 (or 9) shifts negative.

The operation of pentode switch unit S–3 (Fig. 38) is described later in reference to the CRT Beam Control Circuit wherein it is utilized.

Figure 41:
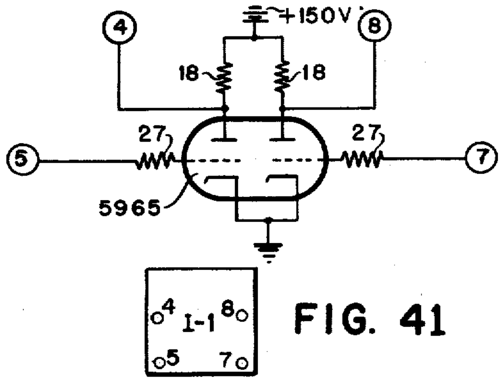
Figure 44:
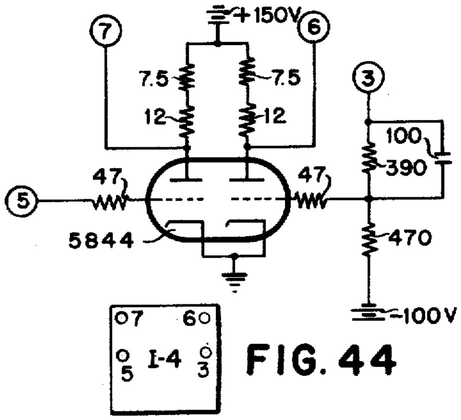
Figure 42:
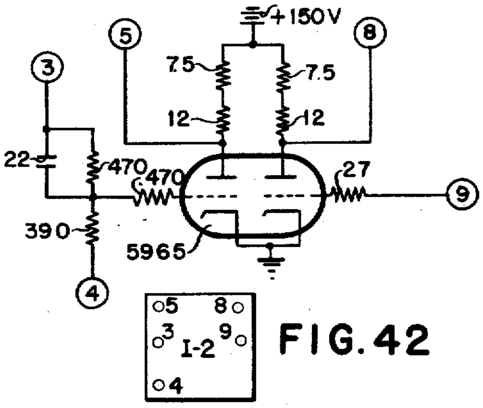
Figure 45:
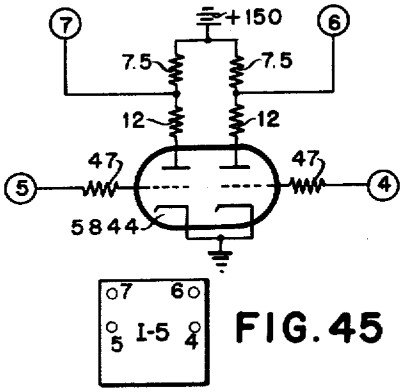
Figure 43:
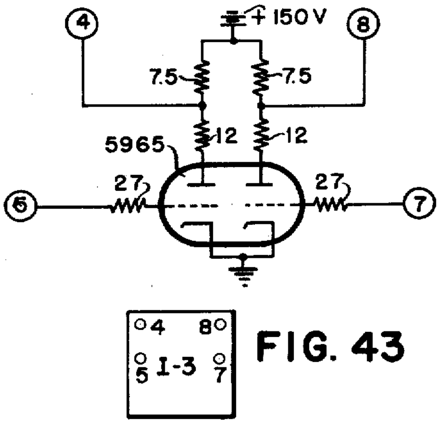
Figure 46:
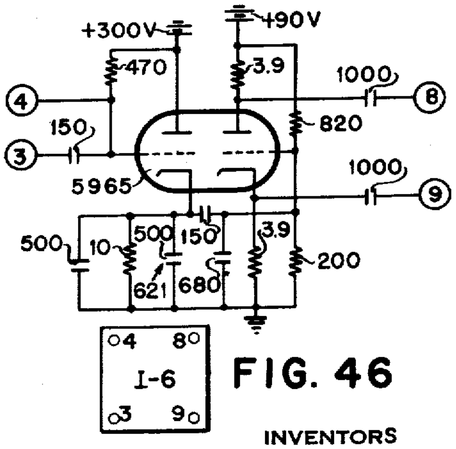

Referring now to Fig. 41, an inverter unit I–1 comprises a dual triode, type 5965, having its cathodes commoned and connected to ground. An inverter, as its name implies, is adapted to simply invert a signal. Thus, if the grid terminal 5 shifts positive, the left hand triode conducts more heavily and the associated plate output terminal 4 shifts negative. Similarly, if the grid terminal 5 shifts negative, the plate terminal 4 shifts positive. The right hand triode of unit I–1 functions in the same manner to also effect 180° phase inversion of a signal applied to the grid terminal 7. Inverter units I–2, I–3, I–3A, I–4, I–5 and I–10 as shown in Figs. 42, 43, 43A, 44, 45 and 50, respectively, operate in essentially the same manner as unit I–1.

Figure 48:
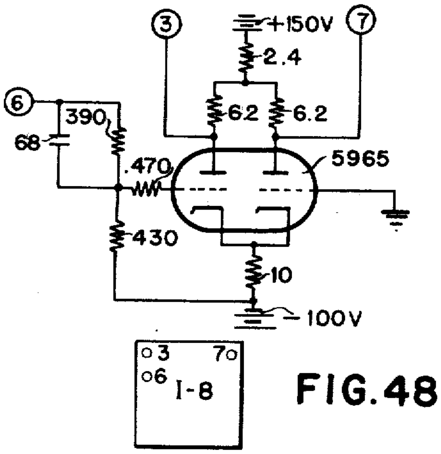
Figure 4:
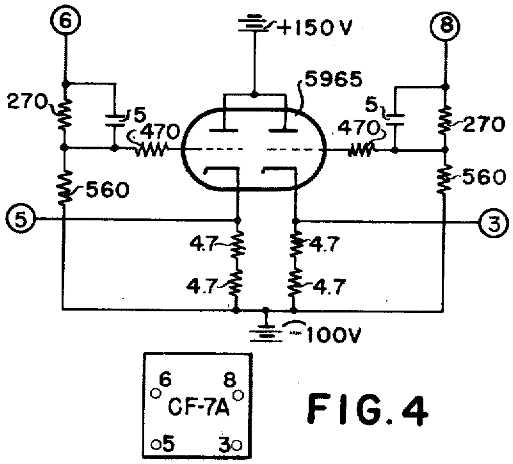
Figs. 4 to 14 are detail circuit diagrams and corresponding block symbols, respectively, of the various other electronic cathode follower units utilized in the storage system.

Referring now to Fig. 48, an inverter unit I–8 comprises a dual triode, type 5965, having its cathodes commoned and connected through a common cathode resistor to a −100 volt supply. In the same manner as previously described for unit I–1, a signal applied to the grid terminal 6 of the left hand triode results in a corresponding inverted signal at the plate output terminal 3. The signal which is applied to the grid of the left hand triode also, through cathode follower action, appears as an in-phase signal on the commoned cathodes of the triodes. With the grid of the right hand triode grounded, as shown, the signal generated on the right hand cathode has the same effect on this triode as a corresponding 180° out of phase signal would have if applied to the grid of an inverter. As a result, in the device of Fig. 48, a signal in phase with the cathode signal is generated on the associated plate terminal 7. This signal is in phase with the original signal applied to the grid terminal 6, and is correspondingly 180° out of phase with the signal generated on the plate terminal 3. Thus, the application of a negative voltage shift on grid terminal 5, 6 achieves a positive going or inverted voltage shift on plate terminal 3, and a negative or in-phase voltage shift on plate terminal 7.

Figure 49:
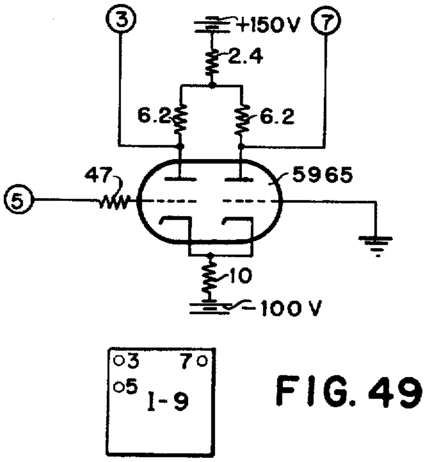
Figure 43A:
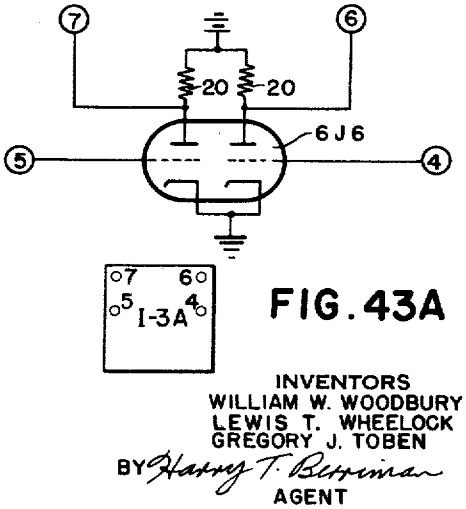

A unit I–9, as shown in Fig. 49, functions in essentially the same manner as unit I–8. The operation of units I–6 (Fig. 46) and I–7 (Fig. 47) is later explained in conjunction with the detailed description of the Bit Sweep Circuit.

Figure 17:
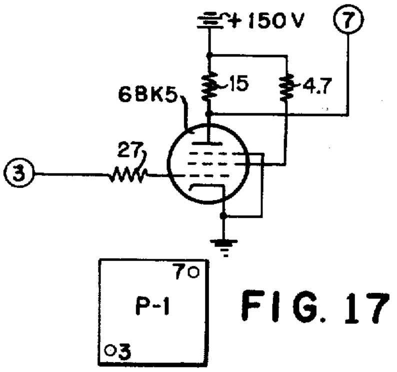
Figs. 17 to 22 are detail circuit diagrams and corresponding block symbols of the various electronic power units utilized in the storage system.

The power units P–1 to P–6 (Figs. 17 to 22) effect 180° signal inversion of an applied signal so that they may also be classified as inverters. However, they differ from the inverter units, which are primarily voltage devices, in that they can supply considerable power to the circuits to which they are connected. Referring now to Fig. 17, a unit P–1 comprises a pentode tube, type 6BK5, wherein the application of a signal to the grid input terminal 3 results in an inverted output signal on the plate terminal 7.

Figure 18:
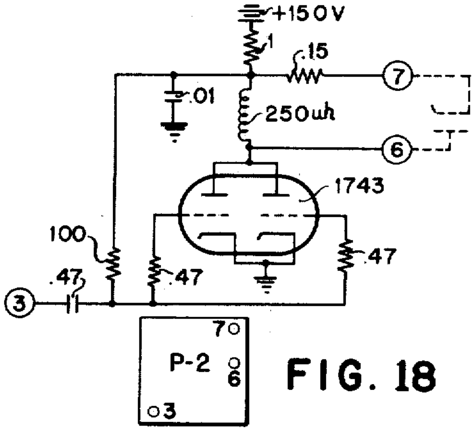

Referring to Fig. 18, a unit P–2 comprises a dual triode, type 1743, in which the triode portions have been connected in parallel, as indicated. Normally, the triodes are heavily conductive and a maximum current flows through a 250 microhenry inductor in the plate lead. Upon the application of a negative voltage shift of proper magnitude to the grid terminal 3, the triodes are momentarily cut off. As a result, the plate terminal 6 shifts positive and the 250 microhenry coil supplies a current surge to an operatively linked circuit. The diode (indicated in phantom between terminals 7 and 6) serves as a D.C. restorer and prevents ringing (oscillation) in the plate coil.

Figure 21:
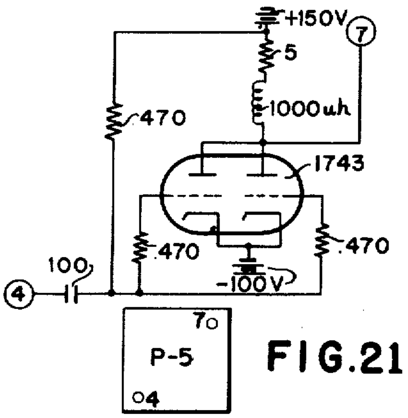

A unit P–5, as shown in Fig. 21, functions in substantially the same manner as unit P–2.

Figure 19:
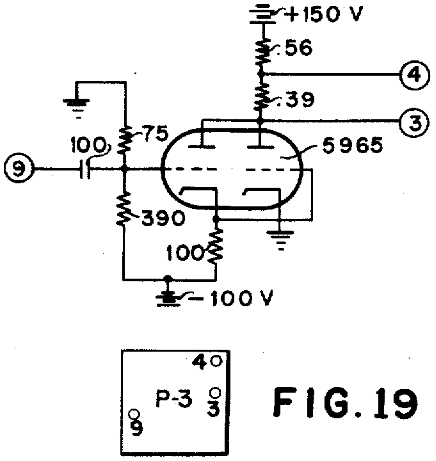

Referring now to Fig. 19, a unit P–3 comprises a dual triode, type 5965, in which the left hand triode portion is connected as a cathode follower, and feeds the right hand triode portion which is connected as an inverter. The application of a positive pulse to grid input terminal 9 results in the generation through cathode follower action of a similar pulse in the associated cathode circuit. This positive cathode pulse is fed to the grid of the right hand triode and results in an inverted output pulse at the related plate terminal 3. An output pulse of lesser magnitude is also available at the tapped plate terminal 4.

Figure 20:
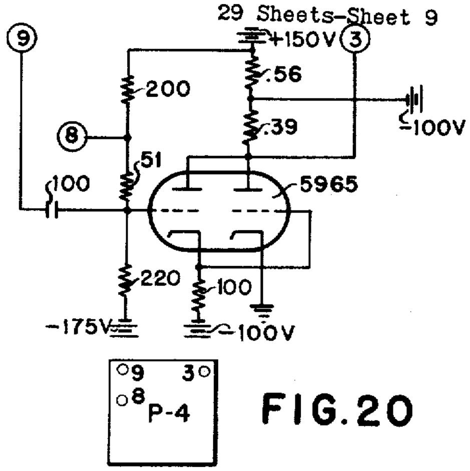

Referring now to Fig. 20, a unit P–4 comprises a dual triode, type 5965, in which the left hand triode portion is connected as a cathode follower, and feeds the right hand portion which is connected as an inverter. It will be noted in Fig. 20 that a resistor network extends between terminal 8 and −175 volt bias supply. The grid of the left hand triode is connected to the juncture of the resistors comprising this network. An auxiliary circuit feeds terminal 8 and is adapted to switch it between plus 20 volts and −30 volts. With terminal 8 at −30 volts, the bias level of the grid is such that even though the capacity coupled, input grid terminal 9 is pulsed positive, the left hand triode remains non-conductive. However, if terminal 8 is at plus 20 volts, when terminal 9 is pulsed positive, the triode conducts momentarily and a positive pulse results on the associated cathode terminal. The positive cathode pulse is applied to the grid of the right hand triode portion and an inverted negative pulse results at the plate output terminal 3.

Figure 22:
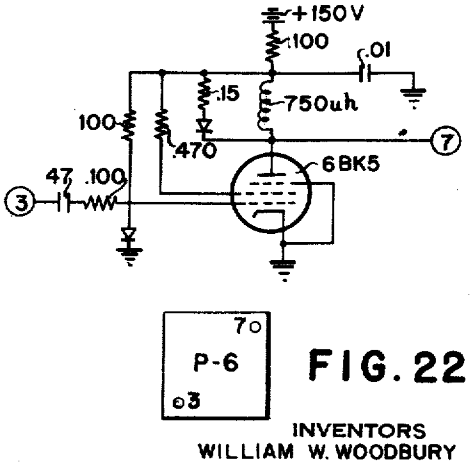

A unit P–6, as shown in Fig. 22, is explained later in the detailed description of the Clock circuit 126 where it is utilized.

Referring now to Fig. 23, a unit D–1 comprises a pair of type 6AL5 tubes, each of which contain 2 diodes. The cathodes of the two diodes of one of the tubes are commoned, as shown. The diodes of unit D–1 are utilized in a manner to be later explained.

Diode unit D–2, as shown in Fig. 24, is identical to unit D–1 except that the two plates of one of the tubes are commoned rather than the cathodes as in unit D–1.

Referring now to Fig. 25, a diode unit D–3 also comprises a pair of 6AL5 duo-diode type tubes. The plates of the two diodes, comprising one of the tubes, are commoned, and connected through a 200K ohm resistor to a plus 150 volt supply. The other tube is similarly connected. Each of the tubes, therefore, functions as a dual coincidence, or "and" circuit. For example, referring now to the left hand tube, if both cathode terminals 9 and 3 are at a potential below plus 150 volts, the associated diodes conduct and plate terminal 8 is at approximately the potential of terminals 9 and 3. If cathode terminal 3 is then shifted above plus 150 volts, the associated diode is cut off, however, plate terminal 8 remains at the potential of terminal 9 since the related diode is still conducting. If terminal 9 is then shifted above plus 150 volts, so the associated diode is also cut off, the plate terminal 8 shifts to the supply potential of plus 150 volts. Thus, if both terminals 9 and 3 are simultaneously above plus 150 volts, terminal 8 is at plus 150 volts, while if either terminal 9 or 3 is below plus 150 volts, the plate terminal 8 is at a corresponding low potential. The right hand dual-diode functions in a similar manner. By directly connecting plate terminals 8 and 4, a 4-way "and" circuit is obtained. As a result, in order for the commoned plate terminals to be at plus 150 volts, all 4 diodes must be simultaneously cut off by shifting the associated cathode terminals 9, 3, 7 and 6 above plus 150 volts.

Figure 26:
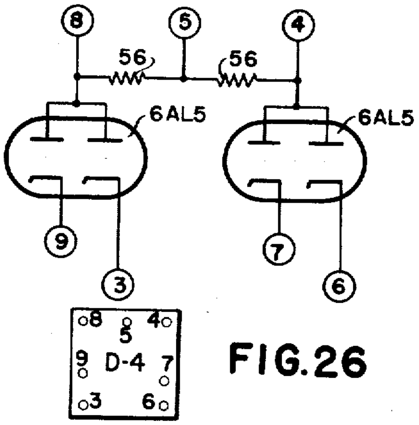

The diode unit D–4 as shown in Fig. 26 is essentially the same as unit D–3.

*Clock*

Referring now to Fig. 51, the detailed circuitry of the clock circuit 126 is shown. The clock comprises a freely running multivibrator 180 (see also Fig. 30) which is the master source of all pulses utilized in the CRT storage system and the associated calculator (not shown). Frequency control potentiometers 181 connected between grid (5 or 4) of the multivibrator and ground, permits the frequency of the multivibrator to be adjusted to a desired 100 kc. repetition rate. As a result, a 100 kc. waveform appears at plate terminal 7 of the multivibrator, while a similar waveform appears at the other plate terminal 8, the two 100 kc. waveforms being 180° out of phase, as indicated in the pulse form diagrams for unit 180, pins 7 and 8, in Figs. 2A and B.

The plate terminal 7 of unit 180 is connected to the grid terminal 3 of a power unit 182, while the other plate terminal 8 is connected to the grid terminal 3 of a power unit 183. Each time the plate terminal 8 of unit 180 shifts negative, the unit 183 is momentarily cut off and a positive voltage spike results at the plate 7 of this latter unit. Similarly, each time the plate 7 shifts negative, the unit 182 is momentarily cut off and a positive voltage spike results at the plate 7 of this latter unit. The 100 kc. positive voltage spikes generated at the plate 7 of unit 183 are the previously mentioned "inspect" pulses (Figs. 2A and B), while the 100 kc. positive voltage spikes generated at the plate 7 of unit 182 are the previously mentioned "write" pulses. The inspect pulses are applied through conductor 185 to the Bit Sweep Control circuit 123 (Fig. 1A), and also are applied (Fig. 51) to the grid 9 of power unit 186.

The inverted inspect pulses, which result at plate 3 of unit 186, are reinverted in power unit 187 and are applied to terminal 4 of diode switch unit 188. Unit 188 comprises 4 diode units (see Fig. 24), the plates of which are commoned, as indicated in Fig. 51, and all the cathodes of which are connected to a plus 40 v. "clamp voltage" as indicated. As the plates of the four diodes are driven to above plus 40 v., by pin 7 of unit 187, all 4 diodes of unit 188 conduct. Even though pin 7 of unit 187 may try to swing the plates of the diodes of unit 188 above plus 40 v., the associated cathodes "clamp" the plates to a maximum of plus 40 volts. When a positive pulse is not present at terminal 4 of unit 188, a unit 190, similar to unit 188, "clamps" the plates of the 4 diodes of unit 188 to ground potential. As a result of this "clamping" action, a conductor 191 applies inspect pulses accurately limited in magnitude (0 to plus 40 v.) to the CRT Beam Control circuit 122. These accurately defined "inspect" pulses are required for proper operation of the CRT Beam Control circuit, while the inspect pulses applied to the Bit Sweep circuit by conductor 185 do not require such accurate control of their magnitude.

The inspect pulses, applied to unit 186, are also applied through a delay line 192 to the grid terminal 9 of a power unit 193. The delay line 192 is of sufficient length to delay the inspect pulses approximately 25 microseconds. A conductor 195 is connected to terminal 8 of unit 193 and is normally maintained at plus 20 volts, except during the read-in operation to the CRT, when it is shifted to −30 volts in a manner to be explained. Referring now to Fig. 20, it is noted that the grid of the left hand tube of unit 193 is connected to a voltage divider extending between terminal 8 and 6. Terminal 6 is maintained at a voltage of −175 volts, as indicated. When conductor 195 (terminal 8) is at a potential of plus 20 volts, the voltage on the grid of the tube is such that the application of the "delayed" inspect pulses to terminal 9 of the unit drives the tube into conduction. As a result, during all times except when conductor 195 is at −30 volts (MR to CRT), delayed and inverted (negative) "inspect" pulses are generated at the plate terminal 3 of the unit 193. These pulses are reinverted by power unit 196, and are fed through a cathode follower 197 to a conductor 198. The positive voltage spikes, which appear on conductor 198, are the previously mentioned "sample" pulses and are applied to the CRT beam control circuit to cause a "sampling" of the output of the push pull amplifiers 127 in the manner previously explained. During MR to CRT transfer time, the conductor 195 is at −30 volts so that unit 193 is unable to conduct, thus removing the "sample" pulses from conductor 198. This is a logical action since, during read-in of information to the CRT, we are not interested in "sampling" the output of the push-pull amplifiers 127. The lag of sample pulses behind its related "inspect" pulse is overemphasized in Figs. 2A and B.

The positive voltage spikes generated at terminal 7 of unit 182 are applied to the grid terminal 9 of power unit 200 which inverts the signals. The inverted signals are reinverted by unit 201 and applied to diode switch unit 202. Diode unit 202, in the same manner as the previously described unit 188, "clamps" the maximum positive magnitude of the positive voltage spikes appearing on conductor 203 at plus 40 volts. A diode switch unit 205, in the same manner as the previously described unit 190, clamps the conductor 203 to ground when positive signals are absent therefrom. The positive voltage spikes which appear on conductor 203 are the previously mentioned "write" pulses (see Figs. 2A and B) and are applied to the CRT Beam Control circuit 122 for controlling the "writing" of "spot" charge patterns when required.

The positive voltage spikes generated by unit 182 are also applied to the grid terminal 3 of unit 206. The unit 206 is normally conducting and is designed so that the leading positive edge of the applied voltage spikes is shunted to ground through a diode (see Fig. 22), and consequently, has no effect on the unit. The trailing or negative shifting edge of the applied voltage spike, however, shuts unit 206 off, momentarily, and a positive voltage spike results at the plate terminal 7 of the unit. It will be appreciated from the above described action that the positive signals generated at the plate terminal 7 are delayed slightly from the signals applied to the grid 3. The unit 206 is so designed that the signals are delayed approximately 3 microseconds. The signals generated by unit 206 are the previously mentioned "Advance" pulses. It will be noted, in Figs. 2A and B, that the "advance" pulses appear slightly after the "write" pulses, the lag of an advance pulse behind its related "write" pulse being overemphasized in the figures. The positive advance pulses generated by unit 206 are applied to the grid terminal 9 of a power unit 207. The resultant inverted or negative advance pulses generated at the plate terminal 3 of this unit 207 are applied through conductor 125 to the 1, 2, 4, 8-ring 120 (Fig. 1A) for advancing the ring. The output of unit 206 is also applied to the grid terminals 4 of cathode follower units 210 and 211. The positive "advance" pulses resulting at the cathode 8 of unit 210 are applied through conductor 212 to the CRT Beam Control circuit 122 (Fig. 1B) for a purpose to be explained. These pulses are also applied via conductor 212 to the Primary Timer to thus synchronize the Clock and Timer. The positive "advance" pulses resulting at the cathode 8 of unit 211 are applied through conductor 213 to the Use-Regenerate Control circuit 132 (Fig. 1B) and are also applied to the computer (not shown).

*1, 2, 4, 8-Ring*

Figure 31:
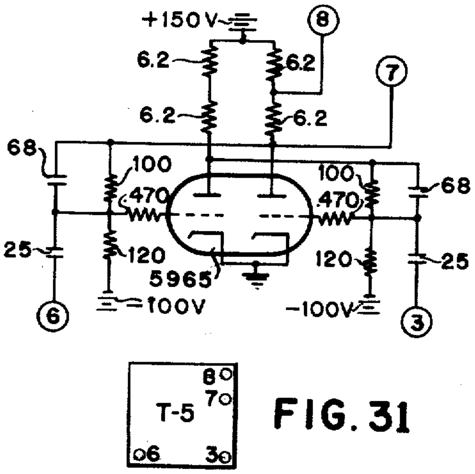
Figure 34:
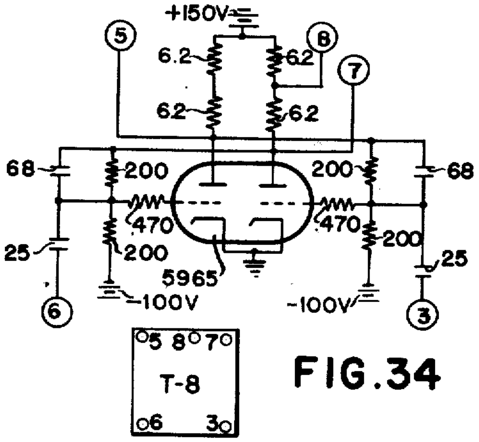
Figure 35:
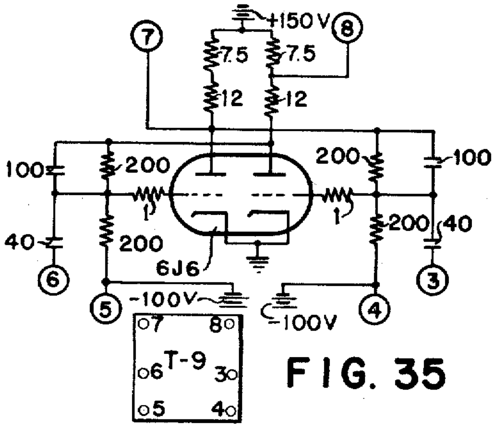
Figure 38:
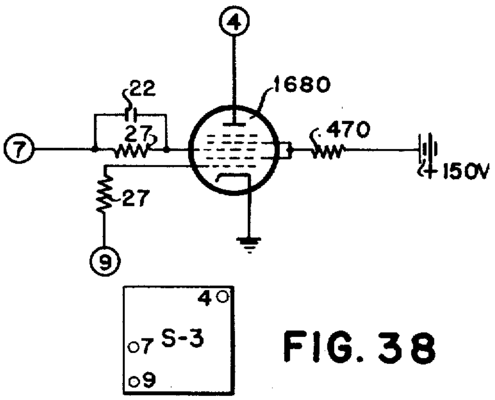
Figs. 36 to 40 are detail circuit diagrams and corresponding block symbols of the various electronic switch units utilized in the storage system.

Referring now to Fig. 52, the 1, 2, 4, 8 Ring comprises 4 conventional trigger components 215 (see also Fig. 31) connected so as to form a closed ring circuit. Referring to Fig. 31, it will be remembered that each trigger 215 comprises 2 triodes (one tube, type 5965) retroactively interconnected, in a well-known way, so that when one triode is conducting. the other is not conducting and vice versa. In the following description and in all other places where trigger action is described, a trigger, when conducting on its right hand side (triode)

is referred to as Off, and when conducting on its left hand side, is referred to as On.

The grid terminal 6 of the left hand triode of each trigger is connected to the previously mentioned conductor 125 on which a negative advance pulse is impressed every 10 microseconds (100 kc.) by the power unit 207 (Fig. 51) of the Clock. A tapped plate terminal 8 of the right hand triode of each trigger is connected to the grid input terminal 3 of the right hand triode of the following trigger. It will be noted, that the plate terminal 8 of the fourth trigger, counting from left to right, in Fig. 52, is connected to the grid terminal 3 of the first trigger. As a result, the first trigger "follows" the fourth trigger so that a closed ring is obtained.

In order to facilitate an explanation of the ring operation, assume that the first trigger is On and the remaining triggers are Off. Thereafter, the first negative advance pulse appearing on conductor 125 is applied to the grid 6 of the left hand triode of the first (extreme left) trigger 215. This negative pulse is of sufficient magnitude to render this triode non-conductive and the first trigger is flipped Off. The negative advance pulse which was applied to the grid terminal 6 of the left hand triode of the first trigger is also, of course, simultaneously applied to the left hand triodes of the remaining triggers. However, since all of these latter triggers are already Off, this pulse has no effect therein.

As the first trigger is turned Off, the resultant negative shifting of the tapped plate terminal 8 of the associated right hand triode momentarily shifts the grid of the right hand triode of the second trigger sufficiently negative so as to turn this trigger On. Thus, the first negative advance pulse on conductor 125 turns the first trigger Off, and the second trigger On, and the ring is advanced 1 stage.

In a similar fashion, the next advance pulse advances the ring another stage by turning Off the second trigger and turning On the third trigger. The next advance pulse, thereafter turns, the third trigger Off and the fourth trigger On. As a result of the connection between the fourth trigger and the first trigger, the turning Off of the fourth trigger by the succeeding advance pulse, causes the first trigger to be turned On again. Consequently, the ring cycle is continuous and repeats itself, over and over, as long as advance pulses are present on the conductor 125.

The plate terminal 7 of the right hand triode of each trigger is connected to the grid terminal 4 of an associated cathode follower 216 (see also Fig. 9) and renders that unit heavily conductive when that trigger is On. When a follower 216 is heavily conductive, its cathode terminal 8 shifts positive. Consequently, output pulses are generated at the cathode terminal 8 of each follower, as determined by the operation of the associated trigger 215. The output pulses from the first, second, third and fourth stage triggers 215 are labeled 1, 2, 4 and 8 pulses, respectively, and are shown graphically in Figs. 2A and B. The output pulses are given this nomenclature since one of their uses is to actuate the Horizontal Deflection Control circuit 115 so as to cause the CRT beams to advance successively over the 1, 2, 4 and 8 areas of a desired storage area or address. The "2," "4" and "8" pulses from the Ring 120 (Fig. 1A) are fed through conductors 218, 219 and 220, respectively, to the Horizontal Deflection Control circuit 115. Further, the "1," "2," "4" and "8" pulses are also fed to the Use Regenerate Control circuit 132, as previously explained, through conductors 140, 141, 142 and 143, respectively.

*The primary timer*

Referring now to Figs. 54A and B, the Primary Timer 133 (Fig. 1B) comprises 24 conventional trigger components 221 (see also Fig. 35) connected so as to form a closed trigger ring. This 24 stage ring is identical in operation to the previously described 1, 2, 4, 8 ring 120, except that there are 24 stages rather than four. Consequently, it is not necessary to describe the operation of the ring itself.

Every 20 microseconds (see Figs. 2A and B) a negative ring advance pulse appears on conductor 222 and is applied to the commoned grid terminals 6 of the left hand triode of each trigger unit 221 to advance the timer ring one stage. It will be noted in Figs. 2A and B that the cycling of the 1, 2, 4, 8 Ring and the Primary Timer 133 are synchronized. This synchronization is effected in the following manner. As soon as the power for the memory system is turned On, the Clock Circuit 126 (Fig. 1B) and in turn the 1, 2, 4, 8 Ring 120 (Fig. 1A) start operating. As a result 1, 2, 4 and 8 pulses appear on the related output conductors 140 to 143 of the 1, 2, 4, 8 Ring. The "1" pulses on conductor 140 are applied through a conductor 224 (Figs. 1B and 54A) to the grid terminal 7 of a cathode follower unit 223 (see also Fig. 7) while the "4" pulses on a conductor 142 are applied through a conductor 225 to the grid of terminal 8 of unit 223. The cathode terminals 6 and 3 of the two cathode followers comprising unit 223, are commoned (Fig. 54A) and as a result, a pulse train representative of combined "1" and "4" pulses is generated thereon. These pulses, generated at the commoned cathodes, are known as B pulses, and are shown graphically in Figs. 2A and B.

The B pulses, which have a magnitude of 50 volts (from −30 volts to plus 20 volts), are fed by conductor 226 (Fig. 54A) to terminal 6 of a unit 227 (Fig. 25). As stated in the description of Fig. 25, when both terminals 7 and 6 of unit 227 are simultaneously positive, the associated "and" circuit is actuated and terminal 4 shifts positive. Thus the B pulses applied to terminal 6 will have no effect on terminal 4 unless terminal 7 is also positive. The potential of terminal 6 of unit 227 is dependent upon the condition (On or Off) of a so called Calculate Start trigger 228. This trigger is normally reset Off by the computer, in a manner not shown. When the trigger 228 is Off, the related plate terminal 7 is at a low potential and through a cathode follower unit 229 (see also Fig. 12) maintains terminal 7 of unit 227 at a low potential so that the B pulses applied to associated terminal 6 cannot "pass through" units 227. To start the cycling of the Primary Timer, terminal 7 of unit 227 must be positive, which requires that trigger 228 be On. Trigger 228 is flipped On, as hereinafter explained.

The "8" pulses on conductor 143 are applied through a conductor 230 (Fig. 54A) to the terminal 9 of a unit 231 (see also Fig. 25). The potential of related terminal 3 of unit 231 is controlled through a conductor 232 by the computer. When the computer desires the Primary Timer 133 to start, the conductor 232 shifts terminal 3 of unit 231 positive. With terminal 3 positive, the first "8" pulse applied to associated terminal 9, thereafter, actuates the related "and" circuit, and terminal 8 shifts positive. The positive shift of terminal 8 of unit 231 is applied to the grid terminal 5 of an inverter unit 233 (see also Fig. 43A). The resultant negative shift of plate terminal 7 of unit 233 is applied to the plate terminal 8 of trigger 228 thus flipping the latter On. With trigger 228 On, its plate terminal 7, through cathode follower 229, shifts terminal 7 of unit 227 positive. Thus, it will be noted that the positive shifting of terminal 7 of unit 227 takes place at approximately "8" time of the 1, 2, 4, 8-Ring cycle.

Figure 2B:
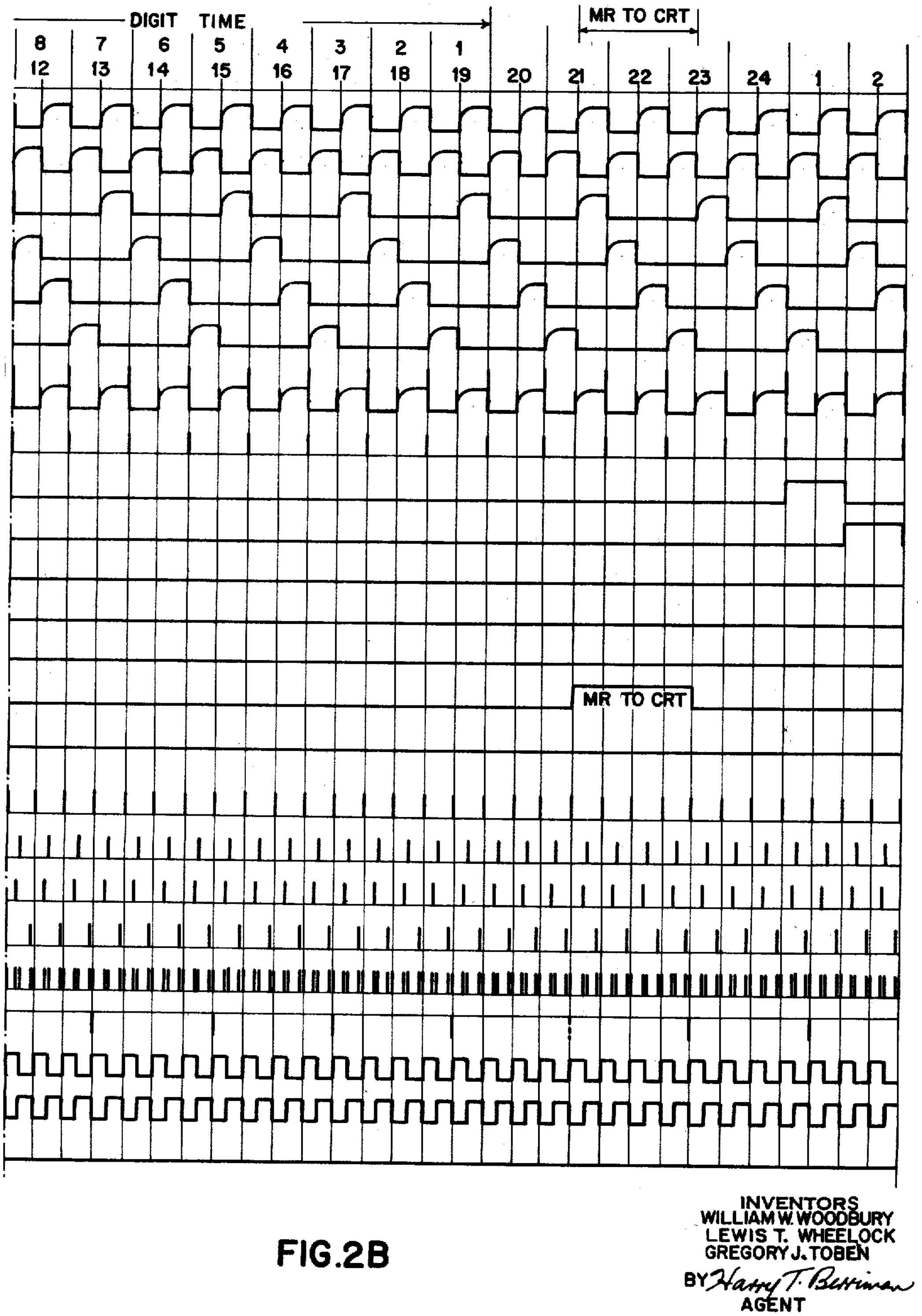

With terminal 7 of unit 227 positive, the first B pulse, thereafter, which is actually a "1" pulse (see Figs. 2A and B) applied to terminal 6, actuates the related "and" circuit, and a B pulse is generated on the plate terminal 4 of this unit 227. This B pulse is applied to terminal 8 of a power unit 235 (Fig. 20). As described in connection with Fig. 20, it will be recalled that unit 235 is rendered conductive, only if its terminal 8 is at plus 20 volts, and a positive pulse is simultaneously applied to its terminal 9. Positive advance pulses (100 kc.) from the clock 126 are applied to the terminal 9 of the unit 235 through conductor 212 (Figs. 1B, 51 and 54A). Referring to Figs. 2A and 2B, it will be noted that the advance pulses on terminal 9 of unit 235 are applied coincident with the leading and trailing edge of the B pulse applied to terminal 8 by unit 227. Since the leading edge of each B pulse has a slow rise time, as shown, the coincidence of an advance pulse (100 kc.) and the leading edge of the B pulse on terminals 9 and 8 of unit 235, does not drive the associated grid sufficiently positive to effect conduction. Upon the application of the next 100 kc. advance pulse to terminal 9, however, terminal 8 will have reached its maximum potential of plus or minus 20 volts. As a result, the grid of the tube is driven sufficiently positive to effect momentary conduction of the unit 235 and a negative advance pulse is generated on the associated plate terminal 3. This pulse is applied to the 24 stage ring through the conductor 222 and advances the ring one stage. As long as trigger 228 remains On, this action continues with one Primary Timer advance pulse being generated, for every two 100 kc. advance pulses. The manner in which the grid potential of unit 235 is controlled by the 100 kc. advance pulse and the B pulses is shown graphically in Figs. 2A and B. It will be appreciated, that by flipping the trigger 228 On at "8" time, the timer cycling is properly synchronized with the cycling of 1, 2, 4, 8 Ring 120, as shown in Figs. 2A and 2B. Once the Timer is started, it remains in synchronism with the Ring 120 since it is then driven partially by that Ring. To stop the cycling of the Timer, the trigger 228 is reset Off, by the computer.

The B pulses generated by unit 223, in addition to controlling the Primary Timer 133 are also applied through a conductor 239 to the computer for purposes to be later explained.

In the same manner that the "1" and "4" output pulses of the 1, 2, 4, 8-Ring are combined in unit 223 to give B pulses, the "2" and "8" output pulses of the 1, 2, 4, 8 Ring are similarly combined in a CF–3 type unit to give so called A pulses. These A pulses are also utilized in the computer. It will be noted in Figs. 2A and B that the A and B pulse trains are 180° out of phase, as would be expected, since the B pulses are, in effect, the "odd" pulses from the 1, 2, 4, 8-Ring (first stage and third "stages"), while the A pulses are, in effect, the even pulses from the 1, 2, 4, 8-Ring (second "stage" and fourth "stage").

Since the Primary Timer 133 advances at a 50 kc. rate while the 1, 2, 4, 8 Ring 120 advances at a 100 kc. rate, both an A and a B pulse occur, during each step of the Primary Timer. Consequently, the time interval during which the Primary Timer has its first stage trigger On, for example, may be divided into 2 increments, A and B, and in the following description, this time interval would be referred to as 1AB time. Similarly, 2AB time would represent the time interval when the second stage of the Primary Timer was on. A time interval designated as 3B to 7A would represent the Primary Timer interval from the middle of the period, when stage 3 was On, to the middle of the period, when stage 7 was On.

Figure 12:
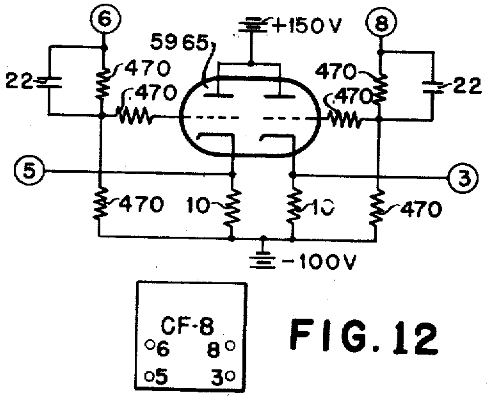

The plate terminal 8 of the third stage trigger of the Primary Timer is connected to the grid terminal 8 of the right hand cathode follower of a dual cathode follower unit 240 (see also Fig. 12). Similarly, the plate terminal 8 of the ninth stage trigger is connected to the grid terminal 6 of the left hand follower of the same unit 240. During the time when the third stage trigger is On (3AB), the cathode terminal 3 of unit 240 is at plus 20 volts. Consequently, a 3AB (see Figs. 2A and B) or reset pulse is applied to the Memory Register 131 through associated conductor 241 (see also Fig. 1B). In a similar fashion, a 9AB sign pulse is applied to the Memory Register through conductor 242 (Figs. 1B and 54A). The plate terminals 8 of the fifth and twenty-first stage triggers feed a similar dual cathode follower unit 243 so that a 5AB and a 21AB pulse are fed to the Use Regenerate control 132, each cycle over associated conductors 245 and 246, respectively (Figs. 1B and 54B).

The various pulses emitted by the Primary Timer 133, in conjunction with pulses from the Clock 126 and 1, 2, 4, 8-Ring 120, control the sequence of the various operations of the storage system, as will be later evident.

*Horizontal deflection control circuit*

The Horizontal Deflection Control circuit 115 (Fig. 1A) is adapted to apply incremental voltages to the parallel connected horizontal deflection plates 111 of the 8 pairs of storage tubes so that the associated beams are deflected simultaneously to the beam rest position of any one of the 20 elemental storage areas in a horizontal "line" of such areas. There are, of course, 30 "lines" of storage areas and the particular "line" chosen from this group depends upon the manner in which the vertical deflection plates are controlled. This latter action will be later explained. For ease of explanation in the following description, it will be assumed that the Vertical Deflection Control circuit 113 is directing the beams to the first or extreme upper "line" of addresses, which includes address positions 0, 1, 2, 3 and 4.

After the CRT beams have been directed to the "1" weighted area of the 0, 1, 2, 3, or 4 address position, as desired, the Bit Sweep Control circuit 123 impresses a waveform on the horizontal deflection plates which permits that elemental area to be read into or read out of, as desired. Thereafter, an incremental voltage of sufficient magnitude to advance the beams to the beam rest position of the "2" weighted area of the chosen address is applied to the horizontal deflection plates by the control circuit 115. The bit sweep voltage then actuates the beams as before. The Horizontal Deflection Control circuit then applies incremental voltages to the deflection plates so as to direct the CRT beams successively to the "4" weighted area, and then to the "8" weighted area of the desired address, the Bit Sweep circuit, of course, being actuated at each of these positions so as to "sweep" or trace a bar pattern in those particular elemental areas. It is therefore evident that to direct the CRT beams to any one of the 20 elemental areas per "line," the circuit 115 must be able to generate 20 distinct incremental deflection voltages. This is effected as hereinafter explained.

Referring now to Figs. 1A, 55A and B, the Horizontal Deflection Control circuit 115 comprises 5 groups of control units, generally designated 250, 251, 252, 253 and 254. Group 250 includes units 258 and 259 (see also Fig. 15). Group 251 includes 260 and 261; group 252, units 263, 264, 265 and 266; group 253, units 268, 269, 270 and 271; and group 254 includes units 273, 274, 275 and 276. It will be noted, in Fig. 15, that each of the individual units DT–1 comprises a right and a left hand triode. Each group of units 250, 251, 252, 253 and 254 represents a particular number of increments 1, 2, 4, 4, and 8, respectively, of horizontal deflection of the beams. Thus, if none of the groups of units is operated, the CRT beams are at the rest position of the "1" weighted area of the 0 address position. This position of the beam is referred to hereinafter as the reference position. If the group 252 is operated, the CRT beams are shifted 4 elemental areas to the right, to the beam rest position of the "1" area of the number 1 address. If both groups 252 and 253 are operated, the beams are shifted 8 elemental areas to the right of the reference position, to the "1" area of address 2. If both groups 252 and 254 are operated, the beams are shifted 12 elemental areas to the right of the reference position, to the "1" area of address 3. Similarly, if all three groups 252, 253 and 254 are operated, the beams are shifted 16 elemental areas to the right of the reference position to the "1" area of address 4. If after the CRT beams are in the "1" area of a chosen one of the addresses 0, 1, 2, 3 or 4, the group 250 is operated, the beams are shifted to the "2" area of that address. Thereafter, if the group 251 is operated, the beams are shifted to the "3" area of that address, and if both groups 250 and 251 are operated, the beams are shifted to the "4" area of that address. Consequently, it is possible to position the CRT beams in any one of the 20 elemental areas in a horizontal "line" by proper operation of the groups 250 to 254, singly or in combination.

Each group of units, when operated, deflects the CRT beams the assigned number of increments in the following manner. The plate terminal 6 of each of the right hand triode portions of units 258, 260, 263, 265, 268, 270, 273 and 275 are commoned by conductor 272 and connected through a common 1.5K plate resistor 278 to a a plus 300 volt supply. Similarly, the plate terminal 6 of the right hand portions of units 259, 261, 264, 266, 269, 271, 274 and 276 are commoned by conductor 277, and connected through a common 1.5K plate resistor 279 to the plus 300 volt supply. The plate terminals 1 of the left hand triode of each of the above units are connected directly to a plus 300 volt supply. The cathode terminals of the two triodes comprising unit 258 are commoned and connected to ground (Fig. 55A) through a 32K ohm resistor. The cathodes of unit 259 are also commoned and connected to ground through a 32K resistor. Similarly, the cathodes of unit 260 are commoned and connected to ground through a 16K resistor and its corresponding unit 261 is similarly connected. In the same manner, the units 263 and 265 have a common cathode resistor of 7.5K, and associated units 264 and 266 are similarly connected. The units 268 and 270 also have a common 7.5K cathode resistor, as do the units 269 and 271; while the units 273 and 275 have a common 3.75K cathode resistor, as do the units 274 and 276. Each of the grid terminals 7 of the right hand triodes of units 258 and 259 of group 250 are electrically commoned and connected through a .470K ohm resistor to a conductor 281 which is connected to a bias voltage of plus 90 volts. The grid terminals 7 of the units of the remaining groups 251 to 254 are similarly connected to the conductor 281. The plate terminals 6 of each of the units 258, 260, 263, 265, 268, 270, 273 and 275 are connected through a .470 resistor to the grid terminal 7 of the right hand triodes of units 283 to 290, respectively. The associated cathode terminals 8 of units 283 to 290 are connected to conductor 292 which, in turn (Fig. 1A), are connected to one horizontal deflection plate of all 9 pairs of CRT. The units 283 to 290 (Figs. 55A and 55B) function as cathode followers and, as a result of the above arrangement, the conductor 292 assumes a voltage potential corresponding to the potential of the commoned plate terminals 6 of units 258, 260, 263, 265, 268, 270, 273 and 275. In a similar fashion, the plate terminals 6 of each of the right hand triodes of units 259, 261, 264, 266, 269, 271, 274 and 276 are connected through a related resistor, .470K ohm, to the grid terminal 2 of the left hand triodes of units 283 to 290, respectively. The corresponding cathode terminals 3 of units 283 to 290 are connected to conductor 291, which, in turn, is connected to the other horizontal deflection plate (Fig. 1A) of all 9 pairs of CRT. By cathode follower action, the conductor 291 assumes a voltage potential corresponding to the potential of the commoned plate terminals 6 of units 259, 261, 264, 266, 269, 271, 274 and 276.

Assume that all of the units 259, etc., having the common plate resistor 279 are non-conductive, while all of the units 258, etc., having the common plate resistor 278 are conducting some maximum amount. With no tube current being drawn through the plate resistor 279, the associated commoned plate terminals 6 of units 259, etc., assume approximately the supply potential of plus 300 volts. As a result, the associated conductor 291 through the previously mentioned cathode follower action of the left hand triodes of units 283 to 290 will be at some maximum corresponding positive voltage $V_1$, as shown in Fig. 66. With all of the units 258, etc., fully conducting, the combined tube currents produce a maximum voltage drop across the common plate resistor 278, and the associated conductor 292 will be at some minimum corresponding voltage $V_1'$, as shown in Fig. 66. With the conductors 292 and 291 at the potentials of $V_1'$ and $V_1$, respectively, the CRT beams of all 9 pairs of CRT are directed to the "1" area beam rest position of address 0. The "1" area of address zero is then operated upon in the usual manner.

To continue the operation in the 0 address position, it is then necessary to shift the beam to the "2" area of that address. This action is initiated by a "2" output pulse from the 1, 2, 4, 8-Ring 120, which appears on conductor 218 (Figs. 1A and 55A) and is applied to the grid terminal 7 of cathode follower unit 293. The positive "2" pulse, resulting on the cathode terminals 6 and 3 of unit 293 is fed through conductor 294 to the grid terminal 5 of the left hand triode portion of unit 295. A plus "2" pulse generated on the plate terminal 7 of unit 295 is fed through conductor 296 to the grid terminal 2 of the left hand triode of unit 258 in group 250. An inverted (negative) "2" pulse generated on the plate terminal 3 of unit 295 is fed through conductor 298 to the grid terminal 2 of the left hand triode of the other unit 259 comprising group 250. The negative "2" pulse thus applied to the grid of the left hand triode of unit 259 results in a negative "2" pulse on the commoned cathode terminals 3 and 8 of that unit With the plus 90 volts bias voltage present on the grid terminal 7 of the right hand triode, the triode of unit 259 causes a definite incremental drop in potential across the common load resistor 279, as determined by the resistance of the cathode resistor associated with unit 259. As a result of the above action, the potential on associated conductor 291 is decreased an incremental amount to a potential of $V_2$.

The positive "2" pulse applied to the left hand triode of unit 258 results in a positive "2" pulse on the commoned cathodes 3 and 8 of that unit. With plus 90 volt bias voltage present on the grid terminal 7 of the right hand triode, this triode is rendered nonconductive. With the triode no longer conducting, the current through the common plate resistor 278 is accordingly decreased. As a result, the voltage drop across the load resistor 278 is decreased an incremental amount as determined by the value of the cathode resistor of that unit. As a result of the above action, the potential on associated conductor 292 is increased an incremental amount to a potential of $V_2'$. With the conductors 292 and 291 at the potentials of $V_2'$ and $V_2$, respectively, the CRT beams of all 8 pairs of CRT are directed to the "2" area beam rest position of address 0. The "2" area is then operated upon in the usual manner. It should be noted that since the resistance of the cathode resistors of units 258 and 259 are identical, and since the circuit is symmetrical in all other respects, the increment of voltage change in shifting conductor 292 from $V_1'$ to $V_2'$ is identical except for sign to the increment of voltage change in shifting conductor 291 from $V_1$ to $V_2$. As a result, the "mean" potential between the horizontal deflection plates of each pair of tubes remains unchanged. This balanced action prevents so-called astigmatism of the CRT beams.

The operation in the 0 address position is then continued by a "4" output pulse from the 1, 2, 4, 8-Ring which appears on conductor 219 and is applied to the grid terminal 7 of cathode follower 299. The positive "4" pulse, resulting on the cathode terminals 6 and 3 of unit 299, is fed through conductor 300 to the grid terminal 5 of the left hand triode portion of unit 301. This results in a plus "4" pulse being fed to the grid terminal 2 of unit 260, and an inverted (negative) "4" pulse being fed to the grid terminal 2 of the unit 261.

As a result of this action, the group 251 is rendered operative in the same manner as previously explained for the group 250. It should be noted in Figs. 2A and B that as a "4" pulse is generated to operate group 251, the preceding "2" pulse will have disappeared so that the previously operated group 250 restores to normal. The cathode resistors of units 260 and 261 of groups 251 are of only one half the value of the corresponding resistor of the units 258 and 259 of groups 250, and, as a result, the conductors 292 and 291 are shifted a double incremental amount to $V_3'$ and $V_3$, respectively. With the conductors 292 and 291 at the potential of $V_3'$ and $V_3$, the CRT beams are directed to the "4" area beam rest position of address 0. The "4" area is then operated upon in the usual manner.

The operation in the 0 address position is then continued by an "8" output pulse from the 1, 2, 4, 8-Ring, the pulse being fed through conductor 220 to the grid terminal 8 of cathode follower unit 299, and also to the grid terminal 8 of unit 293. The resulting "8" pulse on the cathodes 6 and 3 of unit 293, and cathodes 6 and 3 of unit 299, effects an operation of both groups 250 and 251. The combined effect of the simultaneous operation of both these groups is to shift the conductors 292 and 291 an incremental amount representative of both groups or to the potentials of $V_4'$ and $V_4$, respectively. The action deflects the CRT beams to the "8" area of the 0 address.

If input conductors 305A and 306A of group 252 are simultaneously shifted positive and negative, respectively, in a manner to be later explained, this group is operated in the same manner as previously explained for groups 250 and 251. The units 263 and 265 of group 252 are connected in parallel, as will be evident from an examination of the circuit connections. However, the paralleled units 263 and 265 function in the same manner as the single unit 260 of group 251, and the single unit 258 of group 250, except that they are able to carry more current. The paralleled units 264 and 266 are also the equivalent functionally of the unit 261 or the unit 259. With the group 252 rendered operative and the other groups inoperative, the conductors 292 and 291 are shifted to potentials $V_5'$ and $V_5$ and the CRT beams are shifted to the 5 elemental area (from the extreme left) i.e., to the "1" area of the 1 address position. The group 252 is then "held" operative while the groups 250 and 251 are operated in the same sequence as before. This causes the conductors 291 and 292 to assume, respectively and sequentially, the potentials $V_6$ and $V_6'$, $V_7$—$V_7'$, and $V_8$—$V_8'$. As a result, the CRT beams are accordingly directed sequentially to the 6th elemental area, the 7th area, and finally the 8th area, or the "2," "4," and "8" areas, respectively, of address 2 in other words. It should be noted in Figs. 55A and B that the cathode resistors of the group 252 are slightly less than one half of the value of the resistors of group 251. As a result, the increment of deflection between elemental areas 4 and 5 (from the left) is slightly greater than the distance between areas 1—2, 2—3, and 3—4. This slight difference visually separates the 0 and 1 addresses to facilitate visual inspection thereof, as is indicated in Fig. 3.

The group 253, like group 252, effects 4 increments of deflection of the CRT beams, while the group 254 effects 8 increments of deflection. Consequently, by operating the groups 252, 253 and 254, singly or in combination, it is possible to deflect the CRT beams from the "1" area of address 0, to the "1" area of address 1, 2, 3 or 4 as desired. For example, with groups 252 and 253 simultaneously operative, 4 plus 4, or 8 increments of deflection are obtained and the CRT beams are deflected from the 1st to the 9th elemental area from the left which is, of course, the "1" area of address 2. Similarly, with groups 252, 253 and 254 simultaneously operative, 4 plus 4 plus 8, or 16 increments of deflection are obtained and the CRT beams are deflected from the 1 to the 17th elemental area from the left (Fig. 3) which is, of course, the "1" area of address 4. After the CRT beams are in the "1" area of the desired address, the groups 250 and 251 are operated by the 1, 2, 4, 8 Ring, so as to step the beams successively to the "2," "4," and "8" areas of the chosen address. It is therefore evident that by proper operation of the groups 250, 251, 252, 253 and 254, it is possible to select any one of the 20 possible pairs of deflection voltages shown in Fig. 66, and thus direct the CRT beams to any one of the 20 elemental areas in a "line" of such areas. The cathode resistors of groups 253 and 254, like group 252, are of such a value, so that the 5 storage positions or addresses per "line" are visually separated, as indicated in Fig. 3.

*Vertical deflection control*

The Vertical Deflection Control circuit 113, which is shown in Figs. 1A, 56A and B, is adapted to selectively apply suitable incremental voltages to the vertical deflection plates 112 of the 8 pairs of cathode ray tubes (CRT) so that the associated CRT beams may be directed to any one of the 30 "lines" of address positions. The circuit comprises 6 individual groups designated 307, 308, 309, 310, 311 and 312. The plate terminal 6 of the units 315 to 323 of groups 307 to 312 are connected to a conductor 325 which, in turn, is connected to a plus 300 volt supply through a common plate resistor 326. Similarly, the plate terminals 6 of units 329 to 337 are connected to a conductor 339 which is connected to a plus 300 volt supply through a common plate resistor 340. A conductor 341 is connected through cathode follower action of the left hand triodes of units 343 to 350 to the common plate conductor 339 of units 329 to 337, and, as a result, the potential of conductor 341 is determined by the potential of the conductor 339. The conductor 341 (Fig. 1A) is also connected to one vertical deflection plate 112 of all 8 pairs of CRT. A conductor 353 (Figs. 56A and 56B) is connected through cathode follower action of the right hand triodes of units 343 to 350 to the common plate conductor 325 of units 315 to 323, and, as a result, the potential of conductor 353 is determined by the potential of the conductor 325. The conductor 353 (Fig. 1A) is also connected to the other vertical deflection plate 112 of all 8 pairs of CRT. The grid terminals 7 of all the units 315 to 323 and 329 to 337 are connected to a common bias conductor 354 which is connected to a plus 90 volt bias supply.

The groups 307 to 312 function in the same manner as the groups 250 to 254 of the horizontal deflection control circuit, except that it must be possible to generate any one of 30 distinct incremental voltages on conductors 341 and 353, rather than the 20 incremental voltages possible on the conductors 292 and 291 of the horizontal deflection circuit 115. The values of the respective cathode resistors of the units 315 to 319 are so chosen that if group 307 is operated, the potential of conductors 341 and 353 shift an increment of voltage sufficient to displace the CRT beams downward one line. The cathode resistors of the remaining groups 308, 309, 310, 311 and 312 are similarly chosen so that an incremental deflection voltage sufficient to deflect the CRT beams 2, 2, 4, 10 and 10 lines, respectively, is obtained, if that group is operated. In order to operate a particular group, corresponding input conductors 356 and 357 are shifted negative and positive, respectively, in a manner to be later explained. The groups 307 to 312 are in their so-called inoperative state when all of the units 315 to 323 are fully conducting, and all of the units 329 to 337 are non-conducting. Under these conditions, the conductor 353 is at same maximum potential below the plus 300 volt supply. These latter potentials on the conductors 341 and 353 are such as to direct the CRT beams to the extreme upper or first line of addresses (addresses 0 to 4). To shift the beam to any other "line," the proper group 307 to 312, or a combination of such groups is operated. For example, if the groups 307, 308, 309 and 310 are rendered operative, by controlling their respective conductors 356—357, 356A—357A, 356B—357B, and 356C—357C, respectively, 1 plus 2 plus 2 plus 4, or a total of 9 increments of vertical deflection voltage are generated. Consequently, the CRT beams are directed 9 lines downward from the first line to the tenth line (address positions 45 to 49). As a further example, to direct the CRT beams to line 20, groups 307, 308, 309, 310 and 311 are operated, which gives 1 plus 2 plus 2 plus 4 plus 10 or 19 increments of vertical deflection voltage. As in the horizontal deflection control circuit, the values of the cathode resistors of the groups 307 to 312 are "not precisely" proportionate to each other, in correspondence to the "lines" of deflection achieved by a group when operated, but are properly chosen so that the 30 "lines" are arranged in groups so as to facilitate visual inspection. As previously explained, the 30 lines are arranged in 3 groups of ten lines each (see Fig. 3) with the ten lines of each group being arranged in 5 pairs of lines.

It will be appreciated that by simultaneously operating the proper groups 252 to 254 (Figs. 55A and 55B) of the Horizontal Deflection Control circuit 115, and the proper groups 307 to 312 (Figs. 56A and 56B) of the Vertical Deflection Control circuit 113, it is possible to direct the CRT beams to the "1" area of any storage address. Thereafter, the cycling of the 1, 2, 4, 8 Ring properly actuates the groups 250 and 251 of the Horizontal Deflection Control circuit 113 (Figs. 55A and 55B) so as to step the beam successively to the "2," "4" and "8" weighted areas of the chosen address. The groups 252 to 254 of the Horizontal Deflectional Control circuit 115, and all the groups 307 to 311 of the Vertical Deflection Control circuit 113 are operated under control of either the Address Register 116 or the Regenerate Counter 117. During Regenerate time, the counter 117 is the controlling unit while during Use time, the Address Register 116 is the controlling unit. The group 312 of the Vertical Deflection Control circuit is operate only under control of the Regenerate Counter 117. This results from the fact that it is required to reach only storage positions 0 to 99 under Address Register Control. During Regenerate time, the utilization of group 312 in combination with the other groups 307 to 311 permits the CRT beams to be deflected into storage position 100 to 149 as required. During both Regenerate and Use times, the cycling of the 1, 2, 4, 8-Ring 120 controls the groups 250 and 251 of the Horizontal Deflection Control circuit 115 in the manner previously explained.

*The Regenerate Counter*

Referring now to Figs. 1A, 58A and B, the Regenerate Counter 117 comprises two individual trigger adders, a so-called Horizontal Increment Adder 359, as shown in Fig. 58A, and a Vertical Increment Adder 360, as shown in Fig. 58B.

*The Horizontal Increment Adder*

The Horizontal Increment Adder 359 (Fig. 58A) comprises four trigger units 362, 363, 364 and 365 each of which is respectively assigned the particular weighted values 1, 1, 2, and 5 respectively. Each of the triggers when On is representative of its particular weighted value. It will be noted that the grid terminals 6 and 3 of the right and left hand triode sections of triggers 364 and 365 are commoned or binary connected. Each of the triggers 362, 363, 364 and 365 are of the type which may be flipped only by applying a negative going voltage shift to the grid of the conducting side of the trigger. The application of a positive going voltage shift to the grid of the nonconducting side has no effect on the status of the trigger.

It will be noted in Fig. 58A that the plate terminal 7 of the right hand triode of each trigger 362 to 365 is connected through an associated cathode follower 367 or 368 to a corresponding output conductor 370, 371, 372 and 373, respectively. With trigger 362 On (conducting on left hand side), its plate terminal 7 is at a high potential and the associated output conductor 370 is at a corresponding high potential. Each of the output lines 370, 371 and 372 (Figs. 58A and 57A) is connected to the grid terminal 4 of the left hand triode of a related unit 375, 376, and 377, respectively, of a so-called Horizontal Increment Gate portion 380 (Fig. 57A) of the Gate circuit 156 (Fig. 1A).

Referring now to Fig. 57A, it is noted that each unit 375 to 377 comprises two identical right and left hand switch portions (see Fig. 13). Each of these switch portions functions as a dual coincidence or "and" circuit, as previously explained, in that both terminals 7 and 4 of the left hand triode must be simultaneously positive for the related triode to conduct, which results in terminal 6 rising in potential. Similarly, both terminals 8 and 5 of the right hand triode portion must be simultaneously positive for the related triode to conduct, which results in terminal 3 rising in potential. It should be noted in Fig. 57A that the cathode terminals 6 and 3 of the right and left hand triodes of a coincidence unit are commoned. As a result, the commoned cathodes 6 and 3 shift positive, if either the right or left hand triode portions are rendered conductive.

It is also noted in Figs. 1A, 1B and 57A that the terminal 7 of each of the units 375 to 377 are electrically commoned and connected by conductor 155 to the Use Regenerate Control 132. During Regenerate time, the conductor 155 is positive and, as a result, each terminal 7 of units 375 to 377 is positive. If during the time that terminal 7 of one of the units is positive, its terminal 4 shifts positive, as a result of the associated trigger 362 to 364 of the adder 359 (Fig. 58A) going On, the cathode terminal 6 of that unit shifts positive in the manner previously explained. The positive voltage shift of the cathode terminal 6 is fed through a related conductor 382 to the grid terminal 6 of the right hand tube of a unit 383. An inverted (negative) voltage shift results on the plate 3 of a related unit 383 (Fig. 57A) and is fed through related conductors 306A to C, respectively (Figs. 57A, 55A and 55B), to the grid terminal 2 of the corresponding units 263, 265, 268, 270, 273 or 275 of the associated group 252 to 254 of the Horizontal Deflection Control circuit 115 (see also Fig. 1A). A simultaneous positive voltage shift at the associated plate terminal 7 (Fig. 57A) is fed through related conductors 305A to C, respectively (Figs. 37A, 55A and 55B), to the grid terminal 2 of the corresponding units 264, 266, 269, 271, 274 or 276 of the associated group 252 to 254 of the control circuit 115 (see also Fig. 1A). The negative shifting of a conductor 306A to C and the simultaneous positive shifting of its corresponding conductor 305A to C results in the chosen group 252 to 254 being operated, in a manner previously explained, and the CRT beams are accordingly displaced horizontally.

It is evident, therefore, that during Regenerate time, the groups 252 to 254 of the Horizontal Deflection Control circuit 115 (Figs. 1A and 55A) are controlled by the Horizontal Increment Adder 359 (Fig. 58A) of the Regenerate Counter through the left hand triodes of the switch units 375 to 377 of the Horizontal Increment Gate (Fig. 57A). During Use time, the conductor 155 shifts negative, thus disabling the left hand triodes of the switch units 375 to 377 and disconnecting the groups 252 to 254 from control by the Horizontal Increment Adder 359. At the same time, the conductor 154 shifts positive to "condition" the grid terminal 8 of the right hand triode of each of the switch units 375 to 377. The groups 252 to 254 are then controlled through the right hand triodes of the switch units 375 to 377 by the output conductors 386 to 388 (Figs 1A and 57A) of the Address Register 116, in a manner to be explained.

Returning now to the Horizontal Increment Adder 359 (Fig. 58A), every 40 microseconds during Regenerate time, a regenerate advance pulse (see Figs. 2A and B) is fed via line 390 (Figs. 1B and 58A) from the Use-Regenerate Control 132 to the adder 359. Each advance pulse advances the adder one position as indicated in the table below, an X indicating that the trigger is On. Depending upon which of the triggers are in the On condition as the result of a particular advance pulse, the corresponding output conductors 370 to 372 (Figs. 58A, 57A, 55A and 55B) shift positive and actuate the related groups 252 to 254 of the Horizontal Deflection Control circuit 115 (Fig. 1A), and the CRT beams are deflected accordingly.

| Pulse | 1 Trigger | 1 Trigger | 2 Trigger | 5 Trigger |
|---|---|---|---|---|
| 1 | X | | | |
| 2 | X | X | | |
| 3 | X | | X | |
| 4 | X | X | X | |
| 5 | | | | X |
| 6 | X | | | X |
| 7 | X | X | | X |
| 8 | X | | X | X |
| 9 | X | X | X | X |
| 10 | | | | |

The operation of the adder 359 by which the Horizontal Deflection Control circuit 115 is properly actuated during regenerate time so that the address positions are scanned successively, will now be explained in detail. Assume that all four triggers 362, 363, 364 and 365 are Off. As a result, the output conductors 370, 371, 372 and 373, respectively, are at a nonoperative potential and the groups 252 to 254 of the Horizontal Deflection circuit 115 are inoperative. With the groups 252 to 254 inoperative, the CRT beams are directed to the 0 address position. The exact elemental area ("1," "2," "4," or "8"), address 0 to which the CRT beams are directed, is, of course, dependent upon the position of the 1, 2, 4, 8 Ring 120 and the associated groups 250 and 251, as previously explained. For ease of explanation, however, it is assumed that the ring has only its "1" stage On, and, as a result, the groups 250 and 251 are inoperative with the CRT beams being accordingly positioned in the beam rest position of address 0. Thereafter, the cycling of the Ring 120 causes the CRT beams to be successively advanced to the "2," "4" and "8" weighted areas of address 0. The latter action is of course repeated in every address to which the beams may be directed.

After address 0 has been properly operated upon, a negative advance pulse on conductor 390 (Fig. 58A) is applied to grid terminal 3 of trigger 362 and shifts the grid sufficiently negative so that the right side of the trigger stops conducting. This causes the trigger to flip On (left side conducting). The advance pulse is also applied through conductor 392 to the cathode terminal 8 of unit 393. Referring to Fig. 23, it is noted that the unit 393 includes a multitude of diodes. The terminal 8 is connected to the cathodes of two of these diodes, the associated plates being connected to terminals 9 and 3. Terminal 3 is connected through a 150K ohm resistor 395 (Fig. 58A) to the plate terminal 5 of trigger 363 and through another 150K ohm resistor 396 of the plate terminal 7 of trigger 362. With both triggers 362 and 363 initially Off, the junction of the resistors 395 and 396 is at such a potential that the plate terminal 3 of unit 393 is held at a potential below the maximum negative point of the advance pulse which is applied to the cathode of the related diode (terminal 8). Thus, the diode extending between terminals 3 and 8 of unit 393 remains non-conductive. By the time that the advance pulse has flipped trigger 362 On, which, of course, raises the potential of the terminal 7 (of trigger 362) at one end of the resistor network 395—396, it is too late for the advance pulse to act through the diode (terminals 8—3) of unit 393 and a conductor 397 to flip trigger 363 On. Thus, with all four triggers initially Off, the first advance pulse received thereafter turns only trigger 362 On. As trigger 362 flips On, the associated output conductor 370 shifts positive which results in the associated group 252 being actuated, in a manner previously explained, and the CRT beams are accordingly deflected to address 1.

The next advance pulse on conductor 390 is applied to trigger 362, as before, but has no effect thereon since this trigger is already On. With trigger 362 On, however, its plate terminal 7 is at a maximum potential so that the diode plate 3 (unit 393) at the juncture of resistors 395 and 396 is at a sufficiently positive potential that the application of the negative advance pulse to its related cathode terminal 8, through conductor 392, renders the diode conductive. As the diode conducts, its plate terminal 3 shifts negative and through conductor 397 applies this voltage shift to the grid terminal 3 of trigger 363, thus flipping the latter On. With both triggers 362 and 363 On, the associated output conductors 370 and 371 render both groups 252 and 253 of the Horizontal Deflection Control circuit operative so as to shift the CRT beams 8 increments from the reference position to the "1" weighted area position of address 2.

It will be noted in Fig. 58A that the plate terminal 7 of trigger 363 is connected through a 150K resistor 399 to terminal 9 of unit 393, while the plate terminal 7 of trigger 362 is also connected through a 150K resistor 400 to terminal 9 of unit 393. With both triggers 362 and 363 On, the plate terminal 9 (unit 393) of a diode extending between terminals 9 and 8 is at a sufficient positive potential so that the next negative advance pulse on the cathode terminal 8 causes that diode to conduct. The resultant negative shifting of the plate terminal 9 of the diode acts through conductor 402 on the grid terminal 6 of the trigger 363, thus flipping the latter Off. As trigger 363 flips Off, the resultant negative shift of its plate terminal 8 is applied through conductor 412 to the commoned grid terminals 6 and 3 of trigger 364, thus flipping the latter On. With triggers 362 and 364 On, the CRT beams are directed to the "1" weighted area of address 3.

The next advance pulse again flips trigger 363 On and wth triggers 362 and 364 already On, 16 increments of deflection are effective and the CRT beams are directed to the "1" weighted area of address 4.

The next advance pulse on conductor 390 flips trigger 363 Off. The flipping Off of trigger 363 causes trigger 364 to be flipped Off. The flipping Off of trigger 364 causes trigger 362 to be flipped Off via conductor 404. The flipping Off of trigger 364 also results in trigger 365 being flipped On via conductor 405. The flipping On of trigger 365 causes the related output conductor 373 to shift positive. The positive shift of conductor 373 (Figs. 58A and 57B) acts through the left hand triode of a unit 407 of a vertical Increment Gate portion 408 (see Fig. 57B) of the Gate circuit 156 (Fig. 1A) and actuates group 307 (Fig. 56A) of the Vertical Deflection Control circuit 113. As a result, the CRT beams shift downward one line. The next 4 advance pulses continue the accumulating action of the adder 359 (Fig. 58A), as indicated in the previous table so that the CRT beams are stepped to successive address positions of that particular line in the same manner as previously described.

As the adder 359 advances from "eight" to "nine," which advances the CRT beams from address 8 to 9, the flipping On of the trigger 363 with triggers 362, 364 and 365 already On, causes the following action: With trigger 365 On, conductor 410 maintains the cathode (terminal 9) of a corresponding one of the diodes comprising unit 411 (see Fig. 24) at such a positive potential that the diode is cut off. With trigger 364 On, conductor 405 maintains the cathode (terminal 3) of a corresponding one of the diodes comprising unit 411 at such a positive potential that this diode is also cut off. Similarly, with trigger 362 On, conductor 403 maintains the cathode (terminal 5) of a corresponding one of the diodes comprising unit 393 at such a positive potential that this diode is also cut off. As the trigger 363 flips On, a conductor 412 shifts to such a positive potential that a related diode (terminals 7–9) of unit 411 is cut off. After the negative advance pulse which flipped trigger 363 On disappears from the conductor 392, the potential of the conductor maintains the cathode (terminal 4) of a corresponding one of the diodes (terminals 4–7) comprising unit 393 at a suitable positive potential such that this diode is cut Off. The plate terminals 7, 6, 4, and 8 of the previously mentioned 5 diodes of units 393 and 411 are commoned and connected through a 470K resistor 414 to plus 300 volts, thus forming a 5 way "And" circuit. With the 5 diodes cut off, as explained above, a commoned plate conductor of the 5 diodes and an associated output conductor 416 are at the supply potential of plus 300 volts.

The instant that the next negative advance pulse appears on conductor 392, the cathode terminal 4 of the associated diode of unit 393 is driven sufficiently negative so that this diode conducts. As the diode conducts, the commoned plate conductor 415 and output conductor 416 drop to approximately the potential of the conductor 392. This negative shifting of conductor 416 as a result of the "tenth" advance pulse, is applied to the Vertical Increment Adder 360 (Fig. 58B) thus advancing this adder one position. The advance of the Adder 360 one position controls the associated Vertical Deflection Control circuit 113 in a manner similar to that in which the adder 359 controls the Horizontal Deflection Control circuit 115 so that the CRT beams are shifted to the next lower line of addresses. The "tenth" advance pulse on conductor 390 and 392 also, of course, flips trigger 363 Off which in turn flips triggers 364, 362 and 365 Off. The adder 359 thus represents 0 and the CRT beams are accordingly directed to the "1" weighted area of address 10.

The above described action of the Horizontal Increment Adder portion 359 of the Regenerate Counter 117 in controlling the CRT beams may be recapitulated as follows. With the CRT beams in the "1" weighted area of the extreme left address of one of the "odd lines" of the storage roster (address 0 or 10 or 20, etc.), the first four advance pulses on conductor 390 advance the adder so that the CRT beams are advanced successively to the successive addresses on that line. The next or fifth advance pulse turns the "1," "1" and "2" triggers 362, 363 and 364, respectively, of the adder Off and turns the "5" trigger 365 On. With the "1," "1" and "2" triggers Off, the Horizontal Deflection Control circuit is controlled so that the CRT beams are shifted to the extreme left addresses of the roster. At the same time, the On "5" trigger actuates output conductor 373 which causes group 307 (Fig. 57A) of the Vertical Deflection Control circuit 115 to be rendered operative. This latter action shifts the CRT beams to the next lower line of addresses. Thereafter, the next four advance pulses on conductor 390 advance the adder so that the CRT beams are advanced successively to the successive addresses on that line. The tenth advance pulse, resets the triggers of the adder 359 and also generates through the 5 way "and" circuit, an advance pulse on output conductor 416. This latter advance pulse is fed to the Vertical Increment Adder 360 (Fig. 58B). As a result, the latter adder is advanced one position and the CRT beams are directed to the "1" weighted area of the extreme left hand address of the next lower line. The above described action is then repeated. The above sequence of actions continues as long as advance pulses appear on conductor 390.

*The Vertical Increment Adder*

Referring now to Fig. 58B, the Vertical Increment Adder 360 comprises five trigger units 419, 420, 421, 422 and 423 each of which is assigned a particular weighted value 1, 1, 2, 5 and 5, respectively. Each of the triggers when On is representative of its particular weighted value. The plate terminal 7 of the right hand triode of each trigger is connected through an associated cathode follower 425 to a corresponding output conductor 426, 427, 428, 429 and 430. When a trigger 419 to 423 flips On, its corresponding output conductor 426 to 430 shifts positive. Each of the output conductors 426 to 430 (Figs. 58B and 57B) is connected to the grid terminal 4 of the left hand side of a related unit 434 to 438 of the Vertical Increment Gate portion 408 (Fig. 57B) of the Gate circuit 156. The gate portion 408 functions in the same manner as the previously described gate portion 380 (Fig. 57A) in that, during Regenerate time, the conductor 155 is positive and "conditions" the terminals 7 of the left hand triodes of units 434 to 438 so that if a corresponding conductor 426 to 430 from the adder 360 swings positive, the commoned cathodes 6 to 3 of related unit 434 to 438 are shifted positive to actuate the associated group 308 to 312, respectively (Figs. 56A and 56B), of the Vertical Deflection Control circuit 113. As a result of the operation of the groups 308 to 312, a corresponding number of "lines" of deflection of the CRT beams is effected.

During Use time the conductor 155 (Fig. 57B) shifts negative to disable the left hand triodes of 407 and 434 to 438 and disconnect the adder 360 from the Vertical Deflection Control circuit 113. At the same time, the conductor 154 shifts positive and renders effective the output conductors 441 to 445 (Figs. 1A and 57B) from the Address Register 116 so that outputs can be provided to the circuit 113 through the right hand triodes of units 407 and 434 to 437.

As previously explained, every 10th advance pulse fed by conductor 390 to the Horizontal Increment Adder 359 generates a negative pulse on conductor 416 which is fed to the Vertical Increment Adder 360 and advances the latter one position. The adder 360 functions in essentially the same manner as adder 359 so its operation will not be described in detail. The manner in which each advance pulse on conductor 416 advances the status of the adder 360 is indicated in the table below, an X indicating that a trigger is On.

| Advance Pulse on Cond. | 1 Trigger | 1 Trigger | 2 Trigger | 5 Trigger | 5 Trigger |
|---|---|---|---|---|---|
| 1 | X | | | | |
| 2 | X | X | | | |
| 3 | X | | X | | |
| 4 | X | X | X | | |
| 5 | | | | X | |
| 6 | X | | | X | |
| 7 | X | X | | X | |
| 8 | X | | X | X | |
| 9 | X | X | X | X | |
| 10 | | | | X | X |
| 11 | X | | | X | X |
| 12 | X | X | | X | X |
| 13 | X | | X | X | X |
| 14 | X | X | X | X | X |
| 15 | Reset | | | | |

It should be remembered that the "5" trigger 365 of the Horizontal Increment Adder 359 when On actuates the group 307 of the Vertical Deflection Control circuit 113, while the triggers 419, 420, 421, 422 and 423 of the Vertical Increment Adder 360, when On, actuate the groups 308, 309, 310, 311 and 312, respectively, of the Vertical Deflection Control circuit 113. The combined action of these triggers permits the CRT beams to be shifted sequentially from the top line of the rasters to the bottom line thereof.

For example, with triggers 419 to 423 Off (Fig. 58B), and trigger 365 Off (Fig. 58A), the CRT beams are positioned to line 1 (top line) of the 30 line raster. As soon as trigger 365 goes On (Fig. 58A), group 307 (Fig. 56A) is actuated and the CRT beams are shifted to line 2 of the rasters. Thereafter, an advance pulse on conductor 416 turns triggers 419 On (Fig. 58B), and at the same time trigger 365 (Fig. 58A) is turned Off. As a result, group 308 is actuated and the CRT beams are shifted to line 3 of the raster. Thereafter, with trigger 419 On, trigger 420 is flipped On. As a result, groups 308 and 309 are actuated and the CRT beams are shifted to line 4. This sequence of actions continues until all 30 "lines" of storage have been regenerated whereafter the process is repeated.

Referring to Figs. 2A and 2B, it will be noted that during each cycle, ten Regenerate advance pulses are fed to the Horizontal Increment Adder 359 via conductor 390. Consequently, the CRT beams are directed to ten successive addresses, each cycle, so that the information in those addresses is regenerated in a manner to be later explained. Thus, to regenerate all 150 addresses of storage takes approximately 15 cycles. The advance of the Regenerate Counter is not continuous during each cycle, but is interrupted by two Use periods, as indicated. During these Use periods, the gate portions 380 (Fig. 57A) and 408 (Fig. 57B) of the Gate circuit 156 disconnect the regenerate counter output conductors from the Horizontal and Vertical Deflection Control circuits 115 and 113 so the positioning of the CRT beams are no longer under Regenerate Counter control. Also, during Use time, the Use-Regenerate control circuit 132 (Fig. 1B) suspends the emission of advance pulses on conductor 390 (Figs. 1B and 58A) to the Horizontal Increment Adder 359. This action causes the adder to "stop." Since the Vertical Increment Adder 360 (Fig. 58B) is advanced, as a result of pulses on conductor 416 resulting from the cycling of the adder 359, the "stopping" of adder 359 causes adder 360 to "stop" also. The adders 359 and 360 by their position during Use time "remember" the last address to which the CRT beams were directed during the previous Regenerate time. At the end of the Use portion, the gate 156 again connects the regenerate counter to the deflection control circuits 113 and 115. At the same time, an advance pulse on conductor 390 (Fig. 58A) advances the counter one position so the CRT beams are directed to the address immediately following the last address regenerated during the previous regenerate operation. Successive pulses on conductor 390 then cause the CRT beams to be directed to successive address positions until the next Use time arrives. The above action is then repeated. During Use time, the CRT beams may be directed to any one of the addresses 0 to 99 under control of the address register 116. It will be remembered that in this particular storage system, it is necessary to reach only addresses 0 to 99 by means of the address register, the remaining addresses 100 to 149 being reached in another fashion as stated above.

*The Address Register*

Referring now to Figs. 1A and 63, the Address Register 116 comprises a two order, trigger register. The units order of the register comprises four trigger units 454, 453, 452 and 451, which are assigned weighted significance, 1, 1, 2, 5, respectively. Each trigger, when On, is representative of its assigned value. A particular decimal number is entered into the units order of the register by applying a corresponding number of negative pulses thereto through conductor 159, diode element 479 and inverter 483 and input trigger 454, each pulse advancing this order of the register, as indicated below, an X indicating that the trigger is On.

| Pulse | 1 Trig. | 1 Trig. | 2 Trig. | 5 Trig. |
|---|---|---|---|---|
| 1 | X | | | |
| 2 | X | X | | |
| 3 | X | | X | |
| 4 | X | X | X | |
| 5 | | | | X |
| 6 | X | | | X |
| 7 | X | X | | X |
| 8 | X | | X | X |
| 9 | X | X | X | X |
| 10 | Reset | | | |

The tens order of the register comprises four similar trigger units 461, 460, 459 and 458 which are also assigned weighted significance 1, 1, 2, 5, respectively, a number being entered into the tens order of the register by applying a corresponding number of pulses thereto through conductor 158, diode element 479 and inverter 480 to the tens order input trigger 461, each pulse advancing this order of the register in the same manner as indicated above for the units order of the register.

In order to read a value from the Memory Register to a particular address of the CRT or vice versa, it is necessary for the particular address desired to be set up in the Address Register prior to the actual readin or readout operation. Thereafter, during the appropriate Use time (5B through 7A or 21B through 23A), the Address Register 116 through the previously described Gate circuit 156 (Figs. 1A, 57A and 57B) actuates the Vertical Deflection circuit 113 and Horizontal Deflection circuit 115 so as to direct the CRT beams to the desired address. The desired address number is entered into the Address Regiser 116 during so-called digit time (see Figs. 2A and B) under the control of the associated computer or calculator.

For example, assume that it is desired to readout the information in address 37 of the CRT storage to the Memory Register 131. At 2AB time on the cycle, prior to actual readout operation up to 1AB time of the cycle of the readout operation, a reset-add conductor 465 (Figs. 1A and 63) is shifted positive under computer control. Conductor 465 is connected to the cathode (terminal 6) of one of the diodes comprising unit 466 (see also Fig. 25). The associated plate of this diode is connected to terminal 4. The plate of another one of the diodes comprising unit 466 is also connected to terminal 4 while its associated cathode is connected to terminal 7. Consequently, these diodes form an "and" circuit. With terminal 6 positive from 2A to 1AB time, a 3A to 8B positive gate pulse (Figs. 2A and 63) applied to terminal 7 through conductor 467 actuates the "and" circuit, and its terminal 4 and associated conductor 468 shift positive. The positive shift of conductor 468 drives the grid terminal 9 of inverter 469 positive and renders the right hand triode thereof heavily conductive. The resultant negative shift of plate terminal 8 is applied to the grid terminal 3 of the left hand triode of unit 469 thus rendering this triode less conductive. The resultant positive shift of the associated plate terminal 5 is applied through conductor 471 to the grid terminal 7 of cathode follower unit 472. This results in the associated cathode terminal 4 and related reset line 474 shifting positive. This reset line 474 is connected to terminal 4 (see also Figs. 33 and 35) of each of the triggers 451 to 454 (Fig. 63) and 458 to 461, and, as it shifts positive, resets all the triggers Off (conducting on right hand side). Upon removal of the 3-A–8B gate, from conductor 467, the reset line 474 shifts negative to a normal potential, but this does not affect the reset status of the triggers.

The 2AB–1AB reset-add gate applied to terminal 6 of unit 466 is also applied through connecting conductor 475 between units 466 and 467 to grid terminal 7 of cathode follower unit 477, and results in the associated cathode terminal 6 and conductor 478 shifting positive. By the above described action, it is evident that the conductor 478 is positive from 2AB to 1AB time, while the reset action takes place only during the 3A to 8B portion of this period. The gate pulses 2AB to 1AB and 3A to 8B are generated in the computer.

The conductor 478 is connected to the commoned terminals 3 and 6 of unit 479. As stated in the description of Fig. 25, unit 479 comprises 4 diodes properly connected so as to form two separate "and" circuits. Thus, if both terminals 6 and 7 are simultaneously positive, the associated diodes are cut off and terminal 4 shifts positive. Similarly, if both terminals 3 and 9 are positive, terminal 8 is positive. The terminal 9 of one "and" circuit is connected to the computer by the units entry conductor 159, while the terminal 7 of the other "and" circuit is connected to the calculator by the tens entry conductor 158.

To enter 3 into the tens order of the register, the computer directs three successive A pulses, which appear at 17A, 18A, and 19A time in the cycle (Fig. 2A) to the conductor 158. Each time an A pulse swings the conductor 158 positive, the associated "and" circuit of unit 479 is actuated since the conductor 478 is already holding terminal 6 positive. The resultant positive shift of terminal 4 is inverted in the right hand triode of unit 480, thus shifting the conductor 482 negative, and advancing the tens order of the register one position. If the tens order of the register is assumed to have been originally reset to zero, the three A pulses on conductor 482 advance it 3 positions, so that it finally represents the value three by having trigger 459 On and trigger 461 On. It is not believed necessary to review the actual operation of the register in achieving this desired setting since the register functions in essentially the same fashion as the adder 359 (Fig. 58A).

In a similar manner, the value 7 is entered in the units order of the register by the computer feeding 7 successive A pulses to the register through conductor 159, the pulses appearing at 13A, 14A, 15A, 16A, 17A, 18A and 19A time of the cycle (Fig. 2A). Each A pulse on conductor 159 causes terminal 8 of unit 479 to swing positive. The positive shift of terminal 8 is inverted in the right hand triode of unit 483, thus shifting the conductor 484 negative, and advancing the units order of the register. The 7 B pulses on conductor 159 during digit time results in triggers 451, 453, 454 being flipped On, which is the representation of the desired value 7.

With the number 37 now represented in the Address Register, it is necessary for this representation to properly actuate the circuits 113 and 115 (Fig. 1A) so as to direct the CRT beams to address 37 during CRT to MR Use time in the next cycle. This is effected in the following manner: "As each trigger 454 to 451 flips On, its plate terminal 7 shifts negative, and drives the grid terminal 6 of the left hand triode of an associated cathode follower 486 negative. The resultant negative shifting of the cathode terminal 5 of unit 486 drives the cathode terminal 5 of the left hand side of an associated switch unit 487 negative. Similarly, as each trigger 461 to 458 flips On, its plate terminal 7 shifts negative, and drives the grid terminal 8 of the right hand triode of the associated cathode follower unit 486 negative. The resultant negative shifting of the cathode terminal 3 of unit 486 drives the cathode terminal 3 of the right hand side of an associated switch unit 487 negative.

In our particular example, wherein 37 is represented in the register, it is evident, therefore, that the 5 terminals of the unit 486 corresponding to the On triggers 451, 453 and 454 of the units order are shifted negative, while the 3 terminals of the units 486 corresponding to the On trigger 459 and 461 are shifted negative. Each of the units 487 is of a type (see Fig. 37), wherein, if the cathode (5 or 3) is negative, and its associated grid (4 or 9 respectively) is positive, the triode conducts heavily and, as a result, the associated plate (6 or 8 respectively) shifts negative.

It will be noted that the grid terminals 4 of the left hand triode of the switch units 487 are electrically commoned, and connected to a so-called units CRT read-in, readout gate conductor 488. Similarly, the grid terminals 9 of the right hand triodes of the switch units 487 are electrically commoned and connected to a similar conductor 490 called the tens CRT read-in, readout gate conductor. Normally, the conductors 488 and 490 are maintained at a suitable negative potential, under control of the associated computer so that none of the units 487 can conduct. However, during either of the so-called Use periods, 5B through 7A or 21B through 23A of the cycle, the computer may be programmed to shift the conductors 488 and 490 positive, thus producing conduction of these switch units 487 associated with the On triggers of the register. As a switch unit 487 conducts, an associated output conductor 386, 387, 388, 441, 442, 443, 444 and 445 connected to its plate terminal (8 or 6), shifts negative. It will be recalled that the output conductors 386 to 388 and 441 to 445 are connected through the Gate circuit 156 (Fig. 1A) to the Horizontal and Vertical Deflection Control circuits 113 and 115. The negative shifting of an output conductor of the register results, therefore, in the related groups 252 to 254 (Figs. 55A and 55B), or 307 to 311 (Figs. 56A and 56B) of the circuits 115 and 113 being actuated and the CRT beams are deflected accordingly.

Thus, in our particular example wherein 37 has been entered into the Address Register, and wherein it is desired to read from CRT address 37 to the Memory Register, the computer applies a positive read out gate pulse (5B through 7A) to the conductors 488 and 490. As a result, the switch units 487 associated with the On triggers 451, 453 and 454 of the units order of the register conduct, and the conductors 445, 387 and 386, respectively, shift negative. At the same time, the switch units 487 associated with the On triggers 459 and 461 of the tens order of the register conduct and the conductors 443 and 441 shift negative. The negative shifting of conductors 445, 443 and 441 acutate groups 307, 310 and 308, respectively, of the Vertical Deflection Control circuit 113 (Fig. 56A), thus achieving a total downward shift of 1 plus 2 plus 4=7 lines of the CRT beams. Refering to Fig. 3, it will be noted that a shift of 7 lines of the CRT beams displaces them from the first to the eight line, the extreme left hand storage position of the latter line being number 35. The negative shifting of conductors 386 and 387 actuates groups 252 and 253, respectively, of the Horizontal Deflection Control circuit 115 to effect 4 plus 4=8 increments of horizontal deflection of the CRT beams. As a result, the CRT beams are directed to the "1" storage area of address 37. This is the desired result.

If it had been desired to read from the Memory Register to address 37 of the CRT, the computer applies a positive read in gate pulse (21B through 23A) to conductors 488 and 490 following the entry of the value 37 into the Address Register.

Since any value from 0 to 99 may be represented in the 2 order Address Register 116, it is evident that the CRT beams may be selectively directed to any address 0 to 99 during Use time under its control. By adding another order to the Address Register, it is obvious that any one of the addresses 0 to 149 could be reached under Address Register control.

*The Memory Register*

The Memory Register 131 (Figs. 1B and 61) is an eight order storage device and is adapted to store one 7 order number plus a sign indication. During Memory read out times (5B through 7A) the information in any desired storage position may be read out of the CRT and transferred to the Memory Register, the number from the 8th order pair of tubes going to the 8th order of the Memory Register, and so forth. Conversely, during memory read in time (21B through 23A), the number (and its sign) in the Memory Register may be read in to any storage position in the CRT. During so-called digit time (11A through 19B) of the cycle, a number (and its sign) may be read from the Memory Register to the computer or from the computer to the Memory Register. Thus, the Memory Register functions as a buffer or intermediate storage medium between the computer and the CRT storage.

Referring now to Fig. 61, each of the seven numeric orders of the Memory Register 131 comprises four triggers 500, 501, 502 and 503 which are assigned weighted significance 1, 2, 4 and 8, respectively. Each trigger, when On, is representative of its assigned value. It is, therefore, evident that a number is stored in a Memory Register order in the same binary coded form as in the CRT storage. For example, the number 7 is represented in a particular address by a binary one being recorded in the "4," "2" and "1" elemental areas thereof. Similarly, the number 7 is represented in a particular Memory Register order by flipping On the "4," "2" and "1" triggers thereof. As previously explained a number may be entered into a Memory Register order from either the computer or from the corresponding order of any desired address of the CRT storage.

A number is entered into a Memory Register order in the following manner: During digit time of the cycle, the computer applies a train of nine B pulses (11B to 19B) to cathode terminal 3 of a diode switch unit 505 through conductor 506. Unit 505 comprises a two diode "and" circuits (see Fig. 25), terminals 3 and 9 being the input terminals to one of the "and" circuits, and terminal 8 being the corresponding output terminal. The computer through a conductor 507 normally maintains terminal 9 negative so that the positive B pulses on terminal 3 have no effect on that "and" circuit. However, at a particular time, during digit time, as determined by the number to be entered into the Memory Register order, the computer shifts conductor 507 positive, and maintains it positive for the remainder of digit time of that cycle. As a result, each positive B pulse on terminal 506 thereafter produces a corresponding B pulse at terminal 8 which is inverted in unit 508 and applied through conductor 510 to the commoned grid terminals 6 and 3 of the "1" trigger 500. If it is assumed that the triggers 500 to 503 are initially Off, each negative B pulse applied to trigger 500 advances the Register as indicated below, an X indicating that the trigger is On. For example,

| Pulse | 1 Trigg. | 2 Trigg. | 4 Trigg. | 8 Trigg. |
|---|---|---|---|---|
| 1 | X | | | |
| 2 | | X | | |
| 3 | X | X | | |
| 4 | | | X | |
| 5 | X | | X | |
| 6 | | X | X | |
| 7 | X | X | X | |
| 8 | | | | X |
| 9 | X | | | X |

to enter the value 7 into the Memory Register order, the computer shifts the conductor 507 positive at 13A time, and as a result, the remaining seven B pulses on conductor 506 are "passed" through unit 505 to the inverter 508. The resultant 7 negative B pulses applied to trigger 500 results in the register being advanced until triggers 500, 501 and 502 are On. The register thus represents the desired value 7. The triggers 500 to 503 are properly connected so as to achieve the above result and since this type of trigger counter action is well-known, and essentially similar to that described for the adders 359 and 360, it is not believed necessary to describe the counter action in detail. It will be appreciated that all 7 orders of the Memory Register are read in simultaneously from the computer by activating a corresponding conductor 507 at a time dependent upon the related order read-in value.

The transfer of the value in the Memory Register to the corresponding CRT order is effected in the following manner. The plate terminal 5 of the On side of each of the triggers 500 to 503 is connected through an associated cathode follower unit 511 to the cathode terminal 6 or 3 of an associated switch unit 512 or 513. Each of the units 512 or 513 (see Fig. 36) comprises a dual switch device and the one grid terminal 7 of unit 513 is connected through conductor 135 (see also Fig. 1B) to the Use-Regenerate Control 132. The other grid terminal 9 of unit 513 is similarly connected through conductor 136 to the circuit 132. In a similar manner, the grids 7 and 9 of unit 512 are connected through conductors 137 and 138 to the circuit 132. The plate terminals 4 of units 512 and 513 are commoned and connected through conductor 515 to the grid terminal 3 of an inverter unit 516. Inverter unit 516, in turn, feeds conductor 144 through a cathode follower unit 518. Each of the units 512 and 513 is of the type that if its cathode 6 (or 3) is negative, and the related grid terminal 7 (or 9) is simultaneously positive, the associated triode conducts and the plate terminal shifts negative. If a particular trigger 500 to 503 is On, its plate terminal 5 is at a low potential and through the associated cathode follower 511 maintains the cathode 6 (or 3) of the related units 512 and 513 at a low potential. Thus, in a particular example, wherein triggers 500, 501 and 502 are On to represent 7, the cathodes 6 and 3 of unit 513 are shifted negative and the cathode 6 of unit 512 is also shifted negative.

During Use time (21B through 23A), the conductors 135, 136, 137 and 138 are sequentially pulsed positive by the 1, 2, 4, 8 Ring 120 through circuit 132 (Fig. 1B) so as to serially interrogate the switch units 513 and 512 associated with the corresponding 1, 2, 4, 8 triggers 500 to 503. This results in the generation of time sequenced positive pulses on the conductor 144 corresponding to which one or ones of the triggers 500 to 503 are On. Returning again to our example wherein triggers 500, 501 and 502 are On, a "1" pulse on conductor 135 at 21B time causes the left hand triode of unit 513 to conduct and generate a 21B pulse on conductor 144. Similarly, a "2" pulse on conductor 136 at 22A time causes the right hand triode of unit 513 to conduct and generate a 22A pulse on conductor 144. In the same manner, a "3" pulse on conductor 137 at 22B time causes the left hand triode of unit 512 to conduct and generate a 22B pulse on conductor 144. The "8" pulse on conductor 138 at 23A time does not cause the right hand triode of unit 512 to conduct, however, since the "8" trigger 503 is Off, and the cathode terminal 3 of unit 512 is at a corresponding high positive potential.

Each time the conductor 144 is pulsed positive, the CRT beam control circuit 122 (Fig. 1B), in a manner to be later explained, properly activates the control grids of the related CRT order so as to write a binary one in the corresponding elemental area. During the serial interrogation of the "1," "2," "4" and "8" triggers of the Memory Register order, the 1, 2, 4, 8 Ring 120 is also driving the Horizontal Deflection Control circuit 115 so that the CRT beams are deflected serially to the 1, 2, 4 and 8 elemental areas of the desired address. Thus, the reading out of an On 1, 2, 4 or 8 trigger of the Memory Register order causes a binary one to be written in the corresponding 1, 2, 4 or 8 area of the corresponding order of the desired CRT address. Returning to our particular example, the 1, 2 and 4 pulses on corresponding conductor 144 effect the writing of a binary one in the 1, 2 and 4 elemental areas of the corresponding order of the desired address. It will be appreciated that all 7 orders of the Memory Register are read out simultaneously and the numerical information in each order is transferred to the corresponding order of the CRT storage. Referring to Fig. 1B, it is noted that there are seven output conductors 144, one for each of the numeric orders of the Memory Register.

The transfer of the value in a particular CRT order to the related Memory Register order is effected in the same serial fashion as the above described Memory Register to CRT storage transfer. Referring to Fig. 61, it is noted that the plate terminal 5 of the "8" trigger 503 is also connected to the plate terminal 9 of a corresponding switch unit 520. The corresponding grid terminal 4 of unit 520 is connected to the Use-Regenerate circuit 132 through conductor 151. The plate terminal 5 of the "4" trigger 502 is similarly connected to the plate terminal 8 of unit 520, while the corresponding grid 5 is connected to circuit 132 through conductor 150. The unit 520 contains two triode switch units as will be noted in Fig. 40. The cathodes of the two switches comprising unit 520 are commoned (terminal 7) and connected through conductor 145 to the CRT Beam Control circuit 122 (Fig. 1A). A switch unit 523, identical to unit 520, and similarly connected, is provided for the "2" and "1" triggers 501 and 500. The grids 4 and 5 of unit 523 are connected through conductors 149 and 148, respectively, to the Use-Regenerate Control 132. The commoned cathodes of unit 523 are also connected to the conductor 145.

Each unit 520 or 523 is of the type (see Fig. 40) wherein if its cathode 7 is shifted negative at the same time that its grid 4 (or 5) is shifted positive, the associated triode conducts and the plate terminal 9 (or 8) shifts negative. During Use time (5B through 7A), the conductors 148, 149, 150 and 151 are sequentially pulsed positive by the 1, 2, 4, 8 Ring 120 through the Use-Regenerate circuit 132, so as to serially "condition" the grids 4 and 5 of the units 523 and 520 associated with the 1, 2, 4, 8 triggers 500 to 503. At the same time, the 1, 2, 4, 8 Ring 120 is deflecting the CRT beams to read out elemental areas "1," "2," "4" and "8" of a desired address in the CRT. Upon the reading of a binary one in the "1," "2," "4" or "8" area of a particular CRT order of the desired address, the CRT Beam Control 122 shifts negative, the corresponding conductor 145 leading to the related Memory Register order. This action causes the "conditioned" triode of the unit 520 or 523 of the related Memory Register order to conduct, and the resultant negative shift of its plate terminal 9 (or 8) drives the plate terminal 5 of the related trigger 500 to 503 downward thus flipping the trigger On. It is assumed that prior to the above described operation, all of the triggers 500 to 503 were reset Off, in a manner to be explained. By the above action, it is evident, therefore, that if the number 7, for example, was stored in a particular order of a desired address, the read out operation results in the "1," "2," and "4" triggers 500, 501 and 502 of the related Memory Register order being flipped On. This is the desired result. It will be appreciated that all 7 numeric orders of the desired CRT address are read out simultaneously, and the binary coded information in each order is transferred to the corresponding Memory Register order, over-related conductor 145.

A numeric value, represented in a Memory Register order, may be read out to the computer in the following manner: With a Memory Register to computer operation programmed on the computer, the computer via line 524 applies a train of ten A pulses (11A to 20A) to the grid 4 of inverter 508. These pulses are inverted in unit 508, and advance the triggers 500 to 503, position by position, as shown in the previous table. Dependent upon the number represented in the triggers, prior to the application of the pulses to line 524, the A pulses advance the Register from that representation to a zero representation (triggers 500 to 503 Off) after a specific number of A pulses. For example, if the Register represented the value seven prior to the application of the A pulses, it takes 3 pulses ( 11A, 12A and 13A) to advance the register from 7 to 0. As the 13A pulse advances the Register from 9 (triggers 503 and 500 On) to zero (triggers 500 to 503 Off), the flipping Off of the "8" trigger 503 drives the grid 9 of cathode follower 511 positive, which, in turn, shifts the related cathode terminal 3 and associated conductor 525 positive. The positive shifting of conductor 525 shifts grid input terminal 4 of a switch unit 527 positive. Referring now to Fig. 39, unit 527 is a dual switch unit of the type wherein, if terminal 6 (or 3) is positive and associated terminal 5 (or 4) is positive, the triode conducts, and the plate 9 (or 8) shifts negative. During the entire time that A pulses are applied to conductor 524, the calculator maintains conductor 528 and associated terminals 6 and 3 of unit 527 positive. Consequently, as soon as conductor 525 shifts terminal 4 positive, the right hand triode conducts and plate terminal 9 and associated conductor 529 shift negative. As the conductor 529 shifts negative, it activates a circuit in the computer so that the remaining A pulses of the complete train (11A to 20A) are routed to a counter or utilized for other purposes. Thus, in our particular example, wherein 7 was stored in the register, the 13A pulse causes trigger 503 to flip Off, thus driving conductor 525 positive and conductor 529 negative. The negative shifting of conductor 529 activates a circuit in the computer so that the remaining seven A pulses (14A to 20A) are directed to a desired circuit, this latter circuit having been previously predetermined by the computer program. Consequently, as a result of reading out the value 7 in the Register, a corresponding number of A pulses are applied to a predetermined circuit in the computer. This is the desired result.

After the 13A pulse on conductor 524 advances the Register from 9 to zero, in our example, the remaining seven A pulses on conductor 524 continue the advance of the Register so that it finally represents the value 7 again. Thus, the A pulses on conductor 524 actually "roll" the register through 10 positions and back to its original position. It will be appreciated that all 8 numeric orders of the Memory Register are read out simultaneously, and the information in each Memory Register order is transferred to the computer over an associated conductor 529.

To reset the Memory Register 131, a negative 3AB pulse is applied thereto through conductor 241. Conductor 241 feeds the commoned terminals 8, 5 and 4 of diode unit 531. The cathodes of the 4 diodes comprising unit 531 are thus connected to the commoned terminals 8, 5 and 4, while each of the plates of the diodes are connected to individual terminals 9, 3, 7 and 6 (Fig. 23). Each of the terminals 9, 3, 7 and 6, in turn, are connected to the plate terminal 7 of the normally conducting side of one of the triggers 500, 501, 502 and 503, respectively. Normally, the conductor 241 is at a high potential and has no effect on the triggers. However, at 3AB time when conductor 241 shifts negative, the diodes of unit 531 conduct heavily and pull down the plate terminals 7 of the On triggers to thus flip any On triggers Off. The triggers 500 to 503, which are already Off, when the —3AB pulse is applied, are obviously not affected.

*The Memory Register Sign Order*

The first order of the Memory Register (Figs. 1B and 62) is adapted to store the sign of the numeric value stored in the remaining 7 numeric orders of the register. Referring now to Fig. 62, the Memory Register Sign Order comprises a single sign trigger 533 which is representative of a negative sign, when On. The sign trigger is normally reset to its Off position in the following manner: If it is assumed that the trigger 533 is On, its plate terminal 7 is at a high potential and maintains the plate terminal 3 of one of the diodes comprising unit 534 at a corresponding high potential. To reset the trigger 533, a negative 3AB reset pulse is fed from the Primary Timer 133 (Fig. 1B) through conductor 241

(Figs. 1B and 62) to the cathode terminal 8 of the previously mentioned diode of unit 534. This —3AB pulse renders the diode conductive which pulls down the plate terminal 7 of trigger 533 and flips the latter Off. If the trigger 533 was already Off when the —3AB reset pulse was applied, the plate terminal 3 of unit 534 is at a corresponding low potential so that the reset pulse has no effect on the diode (3, 8) of unit 534 and the operatively linked trigger 533.

If a number stored in a particular address of the CRT is a negative number, this is indicated by the decimal value one, being recorded in the first order pair of storage tubes at that particular address. A decimal value one is, of course, represented by a binary one being recorded in the "1" weighted area of the desired address. In transferring a number from the CRT storage to the Memory Register, the first or sign order is, of course, read out at the same time as the remaining numeric orders of the address. If the first order CRT contains a negative sign, the CRT Beam Control circuit 122 (Fig. 1B) shifts conductor 145A negative at 5B time. The shifting of conductor 145A shifts associated cathode terminal 7 of a switch unit 535 (Fig. 62) negative. Simultaneous with the above action, a 5B pulse is applied from the computer, through conductor 536 to the grid terminal 4 of unit 535. With the cathode terminal 7 of unit 535 negative and the associated grid terminal 4 positive, the right hand triode of unit 535 conducts and its associated plate terminal 9 shifts negative. The negative shift of terminal 9 is applied through conductor 538 to the plate terminal 8 of the sign trigger 533 and flips the trigger On. The sign trigger, therefore, indicates that the number transferred from the CRT to the Memory Register (5B through 7A) time is a negative number. This is the desired result.

Read out of the sign trigger 533 to the computer is effected in the following manner. It will be recalled that the seven numeric orders of the Memory Register are read out to the computer during 11A through 19B of the cycle when desired. The sign trigger 533 is read out at 9AB time prior to numeric order read out time. For example, assume that the sign trigger is On, or representative of a negative sign. With the sign trigger On, its plate terminal 7 is at a high potential and maintains the grid terminal 5 of an associated cathode follower 539 at a high potential. This results in the associated cathode terminal 6 of unit 539 being at a high potential which, in turn, maintains the cathode terminal 3 of one of the diodes of a unit 540 at a high potential so that the diode is non-conductive. During the Memory Register to computer transfer operation, the computer, through a conductor 528, maintains the cathode terminal 4 of one of the diodes comprising unit 534 at a positive potential so that this diode is also non-conductive. A second diode (9, 8) of unit 540 has its plate commoned with the previously mentioned diode (3, 8) of unit 540, while the commoned plate terminal 8 of these two diodes is, in turn, connected by conductor 543 to the plate terminal 7 of the previously mentioned diode of unit 534. These three diodes are, as a result, connected as a three way "and" circuit. During 9AB time, the Primary Timer 133 shifts conductor 242 and the associated cathode terminal 9 of the diode (9, 8) of unit 540 positive, and renders it non-conductive. With all three diodes of the 3-way "and" circuit non-conductive, the commoned plate terminals thereof shift positive. The positive shift of the plate terminals is applied through conductor 544 to the grid terminal 8 of a cathode follower unit 545. This results in the cathode terminal 3 of unit 545 and an associated sign conductor 529(*s*) shifting positive. The conductor 547 is connected to the computer and as result of its being shifted positive during 9AB time, a circuit in the computer is actuated which "notifies" the computer that the number, which is to be read from the Memory Register to the computer, during 11A through 19B time, thereafter, is a negative number.

When a number having a negative sign is to be transferred from the computer to the Memory Register, the sign trigger 533 is turned On in the following manner. During 9AB time of the cycle, the computer shifts sign conductor 507(*s*) positive, if a negative number is to be transferred to the Memory Register 131. The positive shifting of conductor 507(*s*) causes the cathode terminal 6 of one of the diodes (6, 4) of unit 540 to shift positive. The computer also shifts conductor 588A and associated cathode terminal 7 of another one of the diodes (7, 4) of unit 540, positive during a programmed computer to Memory Register transfer operation. The two previously mentioned diodes (6, 4 and 7, 4) of unit 540 have their plates commoned and connected to terminal 4 so that they function as an "and" circuit, and, with both their cathodes 6 and 7 shifted positive, through the action described above, the diodes cut off and the plate terminal 4 shifts positive. The positive shift of terminal 4 is applied to the grid terminal 5 of an inverter unit 550. The resultant negative shift of the associated plate terminal 7 is applied through conductor 552 to the plate terminal 8 of sign trigger 533 and flips the latter On. Thereafter, during 11B through 19B, the number in the computer is entered into the numeric orders of the Register in the manner previously explained. The trigger 533, by its On condition, indicates that the number in the Register after the above transfer operation, is a negative number. This is the desired result.

In the transfer of a negative number in the Memory Register, to a desired address of the CRT storage, the negative sign indication of the trigger 533 is transferred to the first order of the desired CRT address as follows: It will be recalled that a Memory Register to CRT transfer takes place during 21B through 23A Use time of a cycle. With the trigger 533 On, since the number in the register is negative, the plate terminal 8 is at a low potential and through conductor 553 maintains the grid terminal 9 of cathode follower 539 at a low potential. As a result, the asociated cathode terminal 8 is at a low potential and maintains the cathode terminal 3 of a unit 554 at a low potential. A positive 21B pulse is applied from the computer through conductors 555 to the grid terminal 9 of unit 554, and with the cathode terminal 3 already negative as a result of trigger 533 being On, the right hand triode of unit 554 conducts. The resultant negative shift of plate terminal 4 is inverted in a unit 557 and applied through cathode follower 558 to conductor 144A, thus shifting the latter positive. Referring to Figs. 2A and B, it is noted that at 21B time, the 1 stage of the 1, 2, 4, 8 Ring 120 is On and, as a result, the CRT beams are directed to the "1" weighted areas of the desired address. Consequently, as conductor 144A shifts positive at 21B time by the action described above, the CRT beam Control circuit is actuated so as to write a binary one in the "1" weighted area of the first order of the desired CRT address. This action, as previously explained, indicates that the number in this address is negative. This is the desired result.

*Use-Regenerate control*

The Use-Regenerate control circuit 132 (Figs. 1B and 64) functions as a program device for the storage system in that it divides the storage cycle into predetermined segments, during each of which a definite operation may be effected. During 5B through 7A time of the cycle, the circuit 132 controls the storage system so that the information in a CRT storage position may be transferred to the Memory Register, if the computer so desires. Similarly, during 21B through 23A time, the Use-Regenerate circuit 132 controls the storage system so that the information in the Memory Register may be transferred to a CRT storage position, if the computer so desires. As previously explained, each of these portions of the cycle is referred to as a Use time since, during these intervals, the CRT storage itself may be used. During the remaining periods of the cycle (5B through 21A and 23B through 5A), the Use-Regenerate circuit 132 under its sole control, controls the storage system so that systematic regeneration of the addresses is effected. These various control actions are effected as hereinafter explained.

At the beginning of a Regenerate portion of the cycle, such as 23B time, for example, an "8" pulse from the 1, 2, 4, 8 Ring 120 is fed through conductor 143 ( Figs. 1A, 1B and 64) to the commoned cathode terminals 3 and 6 of a unit 563. The cathodes of two of the diodes forming unit 563 are connected to terminals 7 and 6, respectively, while their associated plates are commoned and connected to terminal 4, thus forming an "and" circuit. If it is assumed that a conductor 564 is maintaining the terminal 7 of unit 563 positive so that the associated diode (7, 4) is cut off, it is evident that each "8" pulse applied to terminal 6 cuts off the associated diode (6, 4) and the "and" circuit is rendered operative. The resultant "8" pulse generated on terminal 4 of unit 563 is applied to terminal 8 of a unit 565. Unit 565 is of the type (see Fig. 20) wherein if terminals 9 and 8 are simultaneously positive, the related triode conducts and the plate terminal 3 shifts negative. 100 kc. advance pulses are continuously applied from the clock 126 (Fig. 1B) through conductor 213 (Figs. 1B and 64) to the terminal 9. The coincidence of an "8" pulse on terminal 8 and an 100 kc. advance pulse on terminal 9 of unit 565 effects a momentary conduction with consequent generation of a negative pulse on terminal 3. Referring to Figs. 2A and 2B, it is evident that only every fourth 100 kc. advance pulse is coincident with an "8" pulse, and, as a result, only one pulse (25 kc.) is generated at terminal 3 of unit 565 for every 4 pulses applied to its terminal 9. The 25 kc. advance pulses generated on terminal 3 are applied through conductor 390 during Regenerate time, to the Regenerate Counter 117 (Figs. 64, 1A and 1B) for advancing the latter.

Returning again to unit 565 of Fig. 64, the first advance pulse produced on terminal 3 of unit 565 at the start of Regenerate time is also applied through conductor 566 to the grid terminal 6 of a so-called Use-Regenerate Control trigger 568, and flips the latter Off, if it is assumed to have been previously On. The resultant positive shift of its plate terminal 7 is applied to the grid terminal 4 of a cathode follower 569 which results in its related cathode terminal 8 shifting positive. The positive shift of cathode terminal 8 is applied through conductor 155 (Figs. 64, 1B and 1A) to Gate circuit 156. The negative shift of the plate terminal 5 of the trigger 568, as it flips Off, is applied to the grid terminal 4 of cathode follower 570 which results in its related cathode terminal 8 shifting negative. The negative shift of this cathode terminal 8 is also applied through conductor 154 to the Gate circuit 156. With conductor 155 positive, and conductor 154 negative, the Gate circuit 156 is actuated in a manner previously explained so as to disconnect the Horizontal and Vertical Deflection Control circuits 115 and 113, respectively, from the Address Register 116 and connect them to the Regenerate Counter 117. The CRT beams are then deflected to an address as determined by the setting of the counter 117. Each negative advance pulse (25 kc.) generated on the conductor 390 (Fig. 64) advances the Regenerate Counter one position, as previously explained, thus stepping the CRT beams to the next successive address. This action continues until the next Use period.

If the computer desires that a particular address of the CRT storage be read out to the Memory Register, the address number is entered into the Address Register in the manner previously explained. Thereafter, prior to and during 5B through 7B time of the cycle, the computer shifts a conductor 572 (Fig. 64) positive which, in turn, shifts positive the cathode terminal 3 of one of the diodes comprising a unit 573. The plate of this diode is connected to terminal 8 of this unit 573. Another diode of unit 573 also has its plate connected to terminal 8 and its cathode connected to terminal 9, thus forming an "and" circuit. With cathode terminal 3 already positive, the application of a 5AB pulse from the Primary Timer 133 through conductor 245 to the cathode terminal 9 of unit 573 actuates the above described "and" circuit and produces a plus 5AB pulse on terminal 8. This 5AB pulse is applied to the grid terminal 7 of the cathode follower 574. The resultant positive 5AB pulse on commoned cathode terminals 6 and 3 is inverted in unit 576 and applied through a cathode follower 577 to terminal 7 of the unit 563, thus rendering the associated "and" circuit non-operative, so that the "8" pulse on terminal 6 cannot reach unit 565. As a result, there is no advance pulse generated on conductor 390 at this time, and the Regenerate Counter 117 (Fig. 1A) stops (see Regenerate Advance Pulses Fig. 2A).

The plus 5AB pulse generated on terminals 6 and 3 of unit 574 is also applied directly to terminal 9 of a second "and" circuit of unit 563 (see Fig. 25). The coincidence of an "8" pulse on terminal 3 of unit 563, and the plus 5A portion of this 5AB pulse on its terminal 9, renders the second "and" circuit operable during the coincidence period, and a plus 5A pulse is produced on the associated terminal 8. This pulse is applied to terminal 8 of a unit 577, and with associated terminal 9 momentarily positive as a result of a 100 kc. advance pulse applied thereto through conductor 213, power unit 577 conducts momentarily. The resultant negative pulse generated at plate terminal 3 is applied to the terminal 3 of the trigger 568 to flip the latter On. The flipping On of trigger 568 causes conductor 154 to shift positive, and conductor 155 to shift negative, and as a result, the Gate circuit 156 (Fig. 1A) is actuated, so as to disconnect the Regenerate Counter from the Horizontal and Vertical Deflection Control circuits and connect these circuits to Address Register control. The CRT beams are accordingly directed to an address as determined by the setting of the Address Register. This is the desired result. As a result of the suspension of pulses on conductor 390, the Regenerate Counter stops and thus "remembers" the last address that was regenerated.

With the CRT beams directed to the desired address of CRT storage, it is necessary for the 1, 2, 4, 8 Ring 120 to serially "gate" the output of the 1, 2, 4, 8 triggers 503 to 500 (Fig. 61) of the Memory Register orders in coincidence with the deflection of the CRT beams to the 1, 2, 4 and 8 elemental areas of the chosen address. This is effected as follows: Referring to Fig. 64, it is noted that conductor 572, in addition to maintaining terminal 3 of unit 573 positive during 5A through 7A time also, through conductor 578, maintains terminal 9 of a first "and" circuit of a unit 579 at a positive potential. Also during Use time (5B through 7A), the trigger 568 through the cathode follower 569 and conductor 581 maintains commoned terminals 3 and 6 of unit 579 at a positive potential. With both terminals 9 and 3 of unit 579 positive, during 5B through 7A time, the associated "and" circuit is actuated so that terminal 8 and associated conductor 582 are also positive. Conductor 582 feeds terminals 7 and 9 of a pair of units 583 and 584, respectively. The "1" pulse output line 140 of ring 120 feeds terminal 3 of unit 583 and shifts it positive at "1" time (5B) of this Use portion of the cycle. As a result, associated terminal 8 is positive during 5B time through and the left hand side of cathode follower unit 586 maintains conductor 148 positive. It will be recalled that conductor 148, when positive, conditions the switch unit 523 (Fig. 61) of the "1" trigger 500 of each of the numeric memory orders so that, if a binary one is found in the "1" area of the chosen address of the associated CRT order, that trigger is flipped On. In a similar fashion, the 2, 4 and 8 output lines 141, 142 and 143 of the 1, 2, 4, 8 Ring 120, causes the conductors 149, 150 and 151 to be pulsed positive at 6A, 6B and 7A time, respectively, thus serially conditioning the related switch unit 523 (Fig. 61) and 520 of the "2," "4" and "8" triggers 501, 502 and 503, respectively, of the Memory Register. An "8" pulse on conductor 143 at 7B time again initiates the regenerate action by flipping the trigger 568 Off, and by advancing the Regenerate Counter. The regenerate action continues until 21B time.

If the calculator desires that a number in the Memory Register be read into a particular address of the CRT storage, the address number is entered into the Address Register in the manner previously explained. Thereafter, prior to and during 21B through 23A time of the next cycle, the calculator shifts a conductor 588 (Fig. 64) positive which, in turn, shifts positive the cathode terminal 6 of one of the diodes comprising unit 573. The plate of this diode is connected to terminal 4. Another diode of this unit also has its plate connected to terminal 4 and its cathode connected to terminal 7 thus forming an "and" circuit. With cathode terminal 6 already positive, the application of a 21AB pulse to terminal 7, from the Primary Timer 133, through conductor 246, actuates the above described "and" circuit, thus generating a 21AB pulse on terminal 4, which is applied through cathode follower 574 to the grid terminal 5 of inverter 576. The 21AB pulse resulting on terminal 7 of unit 563 has the same result thereon as the 5AB pulse applied thereto during the previously described CRT to MR transfer, in that the trigger 568 flips On to actuate the gate 156 (Fig. 1A) so as to disconnect the Regenerate Counter from the Vertical and Horizontal Deflection Control circuits 113 and 115 and put them under the control of the Address Register 116. Further, there is no advance pulse generated on conductor 390 and the counter 117 "stops." The CRT beams are accordingly directed to an address as determined by the setting of the Address Register.

With the CRT beams directed to the desired address of CRT storage, it is necessary for the 1, 2, 4, 8 Ring 120 to serially gate the output of the 1, 2, 4, and 8 triggers 500 to 503 of the Memory Register orders in coincidence with the deflection of the CRT beams to the 1, 2, 4 and 8 elemental areas of the chosen address. This is effected as follows: During 21B through 23A time, with conductor 588 (Fig. 64) positive, terminal 7 of unit 579 is maintained positive through conductor 589. It will also be recalled that during Use time, the trigger 568, when On, acts via the cathode follower 569, and conductor 581 to maintain terminals 3 and 6 of units 579 at a positive potential. With both these terminals positive, during 21B through 23A time, the associated "and" circuit is actuated so that terminal 4 and conductor 591 are also positive. Conductor 591 feeds terminals 9 and 7 of both units 592 and 593. The "1" pulse output line 140 feeds terminal 3 of unit 592 and shifts it positive at "1" time (21B) of this Use portion of the cycle. As a result, associated terminal 8 is positive during 21B time, and through the left hand side of a cathode follower unit 594 maintains conductor 135 positive. It will be recalled that conductor 135, when positive, conditions the switch unit 513 (Fig. 61) of the "1" trigger 500 of each of the numeric memory orders so that, if the associated trigger is On, the switch is actuated and a binary one is written, via line 144, in the "1" area of the related order of the chosen address of CRT storage. In a similar manner, the 2, 4 and 8 output lines 141, 142 and 143 (Fig. 64) of the Ring 120 cause the conductors 136, 137 and 138 to be pulsed positive at 22A, 22B, 23A time, respectively, to "read-out" the "2," "4" and "8" triggers 501, 502 and 503, respectively (Fig. 61), of the Memory Register. An "8" pulse on conductor 143 (Fig. 64) at 23B time again initiates the Regenerate action as described above by flipping the trigger 568 Off and by advancing the Regenerate Counter. The Regenerate action then continues until the next Use action.

Conductor 591 (Fig. 64) in addition to feeding units 592 and 593 also feeds the grid terminal 5 of an inverter 590. During 21B through 23A time, when conductor 591 is positive, the plate terminal 4 of inverter 590 is thus negative, and, through an associated cathode follower 595 maintains conductor 195 negative. It will be recalled that conductor 195 (Figs. 64, 1B and 51) feeds input terminal 8 of unit 193 of the Clock 126 and must be negative during CRT read in time (21A through 23A) so as to suspend the generation of sample pulses on conductor 198 during this portion of the cycle for the purpose as explained above.

*CRT Beam Control*

Referring now to Figs. 1B and 53, there is shown a single order of the CRT Beam Control circuit. There are 7 similar circuits provided, one for each of the 8 orders of the storage system. The circuit in Fig. 53 performs the following principal functions for its associated order of the Memory Register and the CRT storage.

Each inspect pulse (Figs. 2A, 51 and 53) from the Clock 126 is fed through conductor 191 to the grid terminal 7 of cathode follower unit 597 (Fig. 53) and also to the grid terminal 8 of a cathode follower unit 596. The resultant inspect pulse on the cathode terminals 6 and 3 of unit 597 is fed through conductors 598 and 118 (Fig. 1A) to the control grid 103 of the upper CRT of the related order, and, in a similar manner, the resultant inspect pulse on the cathode terminals 6 and 3 of unit 596 is fed through conductors 599 and 118 (Fig. 1A) to the control grid 103 of the lower CRT of the related order. The inspect pulses on the CRT grids turn on the associated CRT beams for a time period when the voltage impressed on the associated horizontally deflection plates by the Bit Sweep Circuit 123 is such that the beams trace a bar charge pattern on the associated elemental area. This action is referred to as an inspect operation.

As the result of the inspect operation, an output signal is generated on the pick up plates 110 (Fig. 1A) of the CRT and is fed to the associated amplifier 127. If the charge pattern on the inspected area prior to the inspect operation was a binary one representation, that is, a bar pattern on the upper tube and a bar spot on the lower tube, a positive output pulse appears on the amplifier output conductor 146 (Fig. 1B) as previously explained. If the charge pattern on the inspected area prior to the inspect operation was a binary zero representation, a negative output pulse results on the amplifier output conductor 146. The use to which the amplifier output is put depends upon whether the inspect operation takes place during CRT to MR transfer time (5B through 7A), Regenerate time, or MR to CRT transfer time (21B through 23A).

During Regenerate time, the following action takes place. Shortly after the inspect pulse on conductor 191 effects the previously described inspect operation, a sample pulse is applied through conductor 198 to terminal 9 of a unit 601 (Fig. 53). If the inspected area contained a binary one representation, a positive output pulse from the amplifier is applied through conductor 146 (Figs. 1B and 53) to terminal 7 of unit 601 coincident with the sample pulse on terminal 9. With both terminals 7 and 9 of unit 601 positive, the unit 601 conducts momentarily and associated plate terminal 4 shifts negative momentarily. The negative shift of terminal 4 is applied to the plate terminal 8 of a so-called "write 1" trigger 602. As a result, the trigger 602 flips On, if it is assumed to have been previously Off. With trigger 602 On, its plate terminal 7 is at a high potential and through a conductor 604 maintains grid terminal 8 of a cathode follower unit 605 at a high potential. This results in associated cathode terminal 3 being at a high (positive) potential and through line 606 maintaining terminal 6 of a unit 607 at a positive potential. Approximately 10 microseconds later (see Fig. 2A) a wire pulse from the Clock 126 is applied through conductor 203 to the commoned terminals 9 and 7 of unit 607. With both terminals 7 and 6 now positive, the associated "and" circuit of unit 607 (see Fig. 26) is actuated, and terminal 4 shifts positive. This action, through the left hand side of cathode follower unit 596, shifts conductors 599 and 118 (Fig. 1A) and the grid of the associated lower CRT positive for the duration of the write pulse. As a result, the CRT beam of that tube is turned On. At the time that the write pulse turns on the CRT beam of the lower tube, the bit sweep voltage is not impressed on the horizontal deflection plates and as a result, a spot is written at the beam rest position of that elemental area. By the above action, it is evident that as a result of reading out a binary one in the particular elemental area, the same charge pattern has been rewritten therein. This is the desired result during a regenerate operation.

If a binary zero rather than a binary one has been recorded in a particular elemental area, the inspect operation generates a negative pulse on related conductor 146 (Figs. 1B and 53). As a result, the unit 601 is not operated and the trigger 602 remains Off. With trigger 602 Off, its plate terminal 8 is at a high potential and through the left hand side of cathode follower 605, and a conductor 609 maintains terminal 3 of unit 607 at a high potential. With terminal 3 positive, the application of a write pulse to associated terminal 9 causes terminal 8 to shift positive. This action, through the right hand side of cathode follower unit 597, shifts conductors 598 and 118 (Fig. 1A), and the grid of the associated upper CRT positive for the duration of the write pulse. As a result, the CRT beam of that tube is turned On. This results in a spot being written on the bar pattern of the elemental area in question. By the above action, it is evident that as a result of reading out a binary zero in the particular area, the same change pattern has been written therein. This is the desired result during a regenerate operation.

The following action takes place in each order of the CRT beam control circuit during a CRT to MR transfer operation (5A through 7A Use time). The application of an inspect pulse to conductor 191 turns On the CRT beams, as before, so that a bar pattern is traced in the elemental area (upper and lower tubes) in question. If a binary one is found in that area, a positive pulse is applied through related conductor 146 to terminal 7 of unit 601 coincident with the application of a sample pulse to its terminal 9. The resultant operation of unit 601 flips trigger 602 On as before. With trigger 602 On, not only does it act via the cathode follower 605 to condition terminal 6 of unit 607 positive so that the following write pulse restores the binary one representation to this elemental area, but the now positive terminal 7 of the trigger acts via a cathode follower 610 to maintain positive conductor 145 (Figs. 53 and 1A) leading to the associated Memory Register order. With related conductor 145 positive (conductor 145A is provided for the first or sign order beam control circuit), the associated "1," "2," "4" or "8" trigger of the associated Memory Register order is actuated in a manner previously explained. As a result of the above operation, not only is the original charge pattern restored in the elemental area in question, but the corresponding 1, 2, 4 or 8 trigger of the associated Memory Register order is flipped On, or representative of a binary one. This is the desired result.

If a binary zero is found in the area in question during the inspect operation, the Write One trigger 602 remains Off. This results in the binary zero representation being restored to the elemental area in the same manner as described for the regenerate operation. With trigger 602 Off, conductor 145 (145A) remains at a low potential and the associated 1, 2, 4 or 8 trigger in the related Memory Register order also remains Off, which is representative of a binary zero. This is the desired result. It is evident from the above description that during a CRT to MR transfer operation, not only is the binary coded information in the chosen address transferred to the corresponding Memory Register order, but the binary coded information in the chosen address is also regenerated.

The following action takes place in each order of the CRT Beam Control circuit during a MR to CRT storage transfer operation (21B through 23A Use time). It will be recalled that during 21B through 23A time, the conductor 195 of the clock circuit 126 (Fig. 51) is negative so that sample pulses are not present on conductor 198 (Fig. 52) of the CRT Beam Control circuit. As a result, even though an inspect pulse on conductor 191 causes a bar charge pattern to be traced in the elemental areas as before, the related amplifier output on conductor 146 cannot flip the trigger 602 On, since the unit 601 remains inoperative. Consequently, during 21B through 23A time, trigger 602 is controlled solely by the related order of the Memory Register. For example, assume that the 1, 2, 4 or 8 trigger 500 to 503 (Fig. 61) of the corresponding Memory Register order is On so that a binary one is to be read into the elemental area in question. Shortly after the inspect pulse causes a bar pattern to be traced in the particular "1," "2," "4" or "8" weighted area of the chosen address, the corresponding conductor 135 to 138 (Figs. 1B and 64) is shifted positive by the Ring 120 so as to interrogate the related "1," "2," "4" or "8" trigger of the Memory Register order. If that particular interrogated trigger is On, the output conductor 144 (Fig. 53) (or conductor 144A for the sign order) shifts positive as previously explained in the detailed description of the Memory Register. This positive shift of conductor 144 (or 144A) is inverted in an inverter unit 613 and applied through a conductor 614 to the terminal 8 of the Write One trigger 602, thus flipping the latter On. With trigger 602 On, a spot is written on the bar pattern of the lower CRT in the manner previously explained. As a result, the binary one representation of a particular one of the triggers 500 to 503 (Fig. 61) of the Memory Register order has been transferred to the corresponding weighted area of the chosen CRT address. This is the desired result.

If a particular one of the 1, 2, 4, 8 triggers 500 to 503 of a Memory Register order is Off (representative of a binary zero), the conductor 144 remains negative after the inspect pulse causes the bar pattern to be traced in the corresponding elemental area (two tubes) of the chosen address. As a result, the Write One trigger 602 remains in its Off position. With trigger 602 off, the write pulse causes a spot to be written on the bar pattern of the upper tube in the manner previously explained. In this manner, the binary zero in the corresponding trigger 500 to 503 of the Memory order has been transferred to the corresponding elemental area of the desired address. This is the desired result during a MR to CRT transfer operation.

If the Write One trigger 602 is flipped On as a result of the reading out of a binary one from an elemental area of CRT storage, or as the result of reading out a binary one from one of the triggers 500 to 503 of a Memory Register order, it is reset to its Off position prior to the next read in or read out operation by a 100 kc. advance pulse. A positive advance pulse is applied from the clock 126 (Fig. 1B) through conductor 212 (Figs. 1B and 53) to the right hand triode of the inverter unit 613. The resultant negative advance pulse generated on its plate terminal 8 is applied through conductor 604 to the plate terminal 7 of the Write One trigger 602 thus flipping the latter Off.

*Bit Sweep circuit*

Referring now to Fig. 59, there is shown the detailed construction of the Bit Sweep circuit 123. This circuit is adapted to generate the previously mentioned bit sweep voltage wave form which is applied to the horizontal deflection plates of the CRT every 10 microseconds. By turning the CRT beams on at an appropriate time, during the application of the Bit Sweep voltage, the CRT beams are deflected so as to trace a bar charge pattern in the particular elemental area to which the beams are directed at that time. The tracing of the bar charge pattern was referred to above.

Figures 60A, 60B, 60C, 60D:
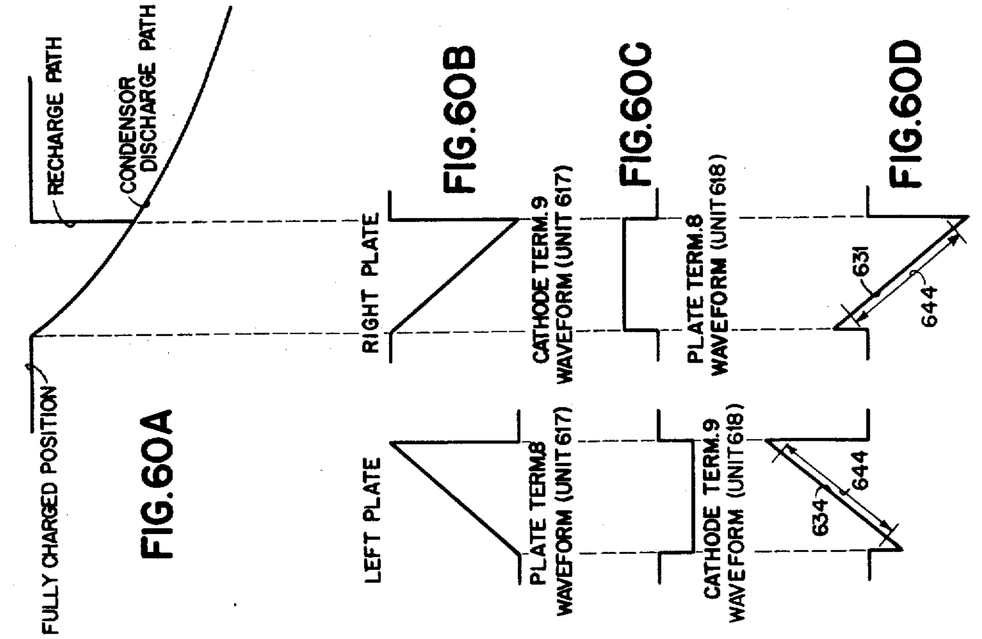

The Bit Sweep waveform is generated in the following manner. Every 10 microseconds, an inspect pulse is fed from the clock circuit 126 (Fig. 1A) through conductor 185 (Figs. 1A and 59) to the grid terminal 9 of power inverter unit 616. The resultant negative inspect pulse on plate terminal 4 is fed to the grid terminals 3 of both units 617 and 618. Referring now to both Figs. 46 and 59, it is noted that terminal 3 of inverter 617 is capacity coupled to the grid of the left-hand triode of that unit, while the grid itself is directly coupled through terminal 4 and conductor 619 (Fig. 69) to the plate terminal 9 of one of the diodes comprising a unit 621 (see Fig. 23). The grid of the left hand triode of unit 617 (Fig. 46) is also connected to a plus 300 volt supply potential through a resistor. The cathode terminal 8 of the previously mentioned diode of unit 621 (Figs. 23 and 59) is connected to a regulated plus 90 volt supply. With no inspect signal impressed via line 185 on the terminal 9 of unit 616, the diode (9, 8) of unit 621 is conductive and its plate terminal 9 is at approximately plus 90 volts. As a result, the grid terminal 4 of the left hand triode of unit 617 is "clamped" to plus 90 volts. Upon the application of a negative inspect pulse via line 185 and unit 616 to terminal 3 of unit 617, the grid shifts downward from plus 90 volts and cuts off diodes (9, 8) of unit 621, and also cuts off the left hand triode of unit 617. With the left hand triode of unit 617 Off, capacitor 621 (see Fig. 46) starts to discharge following the path as indicated in Fig. 60A. The condenser 621 discharges only slightly, however, before the inspect pulse disappears from the capacity input terminal 3 (Figs. 46 and 59) of unit 617. With terminal 3 at a normal potential, the grid of the left hand triode restores to the plus 90 volt "clamp" potential, and the left hand triode of unit 617 again conducts and almost immediately recharges the condenser 621, also as indicated in Fig. 60A. By this action, the saw tooth waveform of Fig. 60A is generated on the cathode of the left hand triode of unit 617 (Figs. 48 and 59). This saw tooth waveform is attenuated in a condenser network (see Fig. 46) and applied to the grid of the right hand triode of the same unit. This results in a positive saw tooth waveform on plate terminal 8, and a negative saw tooth waveform on cathode terminal 9 of the right hand triode of unit 617. These waveforms are indicated in Fig. 60B.

The inverter unit 618 (Fig. 47) is essentially the same as unit 617 except that it has no condenser corresponding to condenser 621 of unit 617. As a result, the inverted inspect pulse applied to its terminal 3 results in an essentially square positive waveform on plate terminal 8 (Fig. 60C), and a corresponding square negative waveform on cathode terminal 9.

The positive saw tooth waveform generated on plate terminal 8 of unit 617 is applied through a conductor 623 to the grid terminal 2 of the left hand triode of a unit 625. A saw tooth current waveform inverted from the shape of the applied saw tooth voltage waveform results on the corresponding plate terminal 1 of this unit 625. In a similar manner, the negative saw tooth voltage waveform on cathode terminal 9 of unit 617 is applied through a conductor 626 to grid terminal 7 of the unit 625, and results in a positive sawtooth current waveform on related plate terminal 6. In a similar fashion, the positive and negative square waves on terminals 8 and 9 of unit 618 are applied to the grid terminals 7 and 2, respectively, of a unit 627, resulting in inverted negative and positive current square waves on plate terminals 6 and 1, respectively, of unit 627. It will be noted that a conductor 629 interconnects plate terminals 1 of units 627 and 625, while a conductor 630 interconnects plate terminals 6 of units 625 and 627. As a result, the positive square waveform on terminal 1 of unit 627 and the negative sawtooth waveform on terminal 1 of unit 625 give a compositive current waveform 631, as shown in Fig. 60D, which is applied through a conductor 632 to the cathode terminal 3 of the left triode of a unit 633. In a similar manner, the negative square waveform terminal 6 of unit 627 and the positive sawtooth waveform on terminal 6 of unit 625 give a composite current waveform 634, as shown in Fig. 60D, which is applied through a conductor 635 to the cathode terminal 8 of the right triode of unit 633.

It will be noted in Fig. 59 that grid terminal 2 of unit 627 is also connected to the cathode terminal 4 of one of the diodes (7, 4) comprising unit 621, while grid terminal 7 of unit 627 is connected to the plate terminal 7 of the same diode (7, 4) of unit 621. The terminal 4 of this latter diode of unit 621 is also connected through a 3.9K resistor and a .470 resistor to a plus 90 volt regulated supply, while its cathode terminal 5 is similarly connected through a 3.9K resistor and a .470 resistor to the plus 90 volt supply. As a result, the grid terminals 2 and 7 of unit 627 are "clamped" or stabilized at approximately plus 90 volts at all times except when output signals from unit 618 are applied thereto. The grid terminals 2 and 7 of unit 625 are similarly clamped to plus 90 volts through another diode (terminals 6, 5) of unit 621.

Returning now to unit 633 (Fig. 59), it is noted that the grid terminals 2 and 7 of the left and right hand triodes of the unit are commoned, and connected to the midpoint of a divider network, comprising resistors 638 and 639. This resistor network is connected between a plus 300 volt supply and ground and, as a result, the grid terminals 2 and 7 of unit 633 are maintained at a potential of plus 150 volts. The plate terminal 1 of the left hand triode of unit 633 is connected through a conductor 641 (Figs. 59 and 1A) to the conductor 272 of the Horizontal Deflection Control circuit 115 (see Fig. 56A). Similarly, the plate terminal 6 of unit 633 is connected through a conductor 642 (Figs. 59 and 1A) to the conductor 277 of the Horizontal Deflection Control circuit. It will be recalled that the potential of conductors 272 and 277 is not constant but is variable, dependent upon which of the groups 250 to 254 of the Horizontal Deflection Control circuit 115 are actuated. It will also be recalled that dependent upon the potential of conductors 272 and 277 the CRT beams may be deflected to any one of the 20 elemental areas in a "line" of the CRT storage. Since the cathode terminals 3 and 8 of unit 633 (Fig. 59) are in effect "tied" to the plus 150 volt potential of their commoned grids 2 and 7, the cathode terminals 3 and 8 are essentially isolated from the variable potentials possible on the plate terminals 1 and 6. As a result, the current waveforms applied to the cathodes 3 and 8 of unit 633 generate corresponding Bit Sweep waveforms on the related plate terminals 1 and 6, these waveforms having a substantially constant effect on the conductors 641 and 642 regardless of their potential. Consequently, the magnitude of deflection of the CRT beams as a result of the Bit Sweep waveforms applied to the associated Horizontal Deflection plates is identical, regardless of which elemental area in a "line" the beams are directed to.

Even though an inspect pulse initiates the generation of the Bit Sweep waveforms and, also through units 596 and 597 (Fig. 53) of the Beam Control circuit turns on the CRT beams, the timing of the actual functions is such that the CRT beams are turned On only during the portion 644 (see Fig. 60D) of the Bit Sweep waveforms. As a result, the bar charge pattern is generated in one sweep of the beams from left to right in Fig. 3, there being no retracing of the bar pattern. After the Bit Sweep waveforms passes from the horizontal deflection plates, it will be appreciated that the CRT beams (not On) are again at the beam rest position (slightly to the right of extreme left hand end of bar charge pattern of the elemental area being operated upon). By again turning on the CRT beam, a spot charge pattern is generated on the bar charge pattern at the beam rest position, if required.

*Push pull-differential amplifier*

Referring now to Fig. 65, there is shown the detailed circuitry of one of the 8 push-pull amplifiers 127 (Fig. 1A) utilized in the storage system, there being one of the amplifiers for each order (pair) of cathode ray tubes. The pick up plate 110 (Fig. 1A) of each upper CRT tube of a particular order is connected through a related conductor 130 (Figs. 1A and 65) to the grid terminal 1 of input tube 647 of the related amplifier. In a similar manner, the pick up plate 110 of the corresponding lower CRT tube of that order is connected through a related conductor 128 to the grid terminal 1 of another input tube 648 of that amplifier. The amplifier functions in an essentially conventional manner, as hereinafter explained, to shift associated output conductor 146 positive as a result of an inspect operation in an elemental area (two tubes) in which a binary one was previously represented, or to shift output conductor 146 negative if the inspected area contained a binary zero representation. As stated above, a binary one is represented in an elemental area (two tubes) of the desired order by a bar charge pattern on the upper tube, and a bar spot charge pattern on the lower tube. Conversely, a binary zero is represented by a bar spot charge pattern in the upper tube, and a bar charge pattern on the lower tube. The vacuum tubes utilized in the push-pull differential amplifier 127 are all types 6AK5, except for the dual triode which is a type 5844.

It will be recalled that an elemental area is read out (inspected) when desired by retracing a bar charge pattern therein. During the inspect operation of an area which contained a binary one representation, the pick up plate 110 of the upper CRT tube shifts negative, while the pick up plate 110 of the corresponding lower tube shifts positive. As a result, the grid terminal 1 of tube 648 of the amplifier shifts slightly positive, and renders that tube more conductive, which shifts its plate terminal 5 negative. By cathode follower action, the positive shifting of grid terminal 1 of tube 648 shifts its associated cathode 2 positive, and in turn, shifts the commoned cathode 2 of tube 647 positive. Substantially, simultaneous with the positive shifting of cathode terminal 2 of tube 647, its associated grid terminal 1 shifts negative as a result of the signal on the associated upper pick up plate 110. The cumulative effect of the positive shifting of cathode 2 and the negative shifting of grid 1 of tube 647 renders the tube less conductive than if the grid 1 alone had been shifted. As the tube 647 conducts less, its associated plate terminal 5 shifts positive. The difference between the read out signals generated on the pick up plates is thus accentuated by the action of tubes 647 and 648.

The positive shift of plate terminal 5 of tube 647 is applied through condenser 657 to the grid terminal 1 of a tube 652 and renders it more conductive, which shifts its related plate terminal 5 negative. By cathode follower action, the positive shifting of grid terminal 1 of tube 652 shifts its associated cathode 2 positive and, in turn, shifts the commoned cathode 2 of a tube 653 positive. Substantially, simultaneous with the positive shifting of cathode terminal 2 of tube 653, the negative shift of plate terminal 5 of tube 648 through a condenser 655 shifts the grid 1 of tube 653 negative. Tube 653 is, therefore, rendered less conductive, and its plate terminal 5 shifts more positive. Consequently, the tubes 652 and 653 have further magnified the difference potentials generated on the pick up plate 110 by the inspect operation.

The positive shift of the plate terminal 5 of tube 653 is applied to the grid 1 of a tube 656. It is noted that the plate terminal 5 of tube 656 is connected to ground through a large capacitor 657. The time constant of the capacitor 657 and the resistor network of tube 656 is long in comparison to the duration of the positive signal applied to the associated grid terminal 1 by tube 653. As a result, the plate potential remains substantially constant, and the full effect of the positive shift of grid terminal 1 is felt on the cathode terminal 3, thus shifting it positive. The positive shifting of cathode terminal 2 of tube 656 shifts the commoned cathode 2 of a tube 657 positive at the same time as tube 652 is shifting the grid 1 of tube 657 negative. As a result, the tube 657 is rendered sharply less conductive and its plate terminal 5 shifts positive. The positive shift of plate terminal 5 is applied to the grid terminal 1 of a tube 659 which is connected as a Class A amplifier. The resultant negative shift of plate terminal 5 of tube 659 is applied to the grid terminal 1 of a tube 660 which is connected as a Class C amplifier. The resultant positive shift of plate terminal 5 of tube 660 is applied to the grids 1 and 4 of cathode follower 661 which results in a positive shifting of its associated commoned cathodes 3 and 6. The positive shifting of the cathodes 3 and 6 is applied through the conductor 146 (Figs. 65 and 1B) to the corresponding order of the CRT Beam Control circuit 122. Thus, the inspect operation in an elemental storage area which contained a binary one representation results in the conductor 146 shifting positive momentarily. This is the desired result.

If an elemental area having a binary zero is "inspected," the grid terminal 1 of tube 647 is shifted positive, while the grid terminal 1 of tube 648 is shifted negative. As a result, the related push pull differential amplifier 127 functions in just the reverse manner from the operation previously explained, and the corresponding conductor 146 is shifted momentarily negative. This is the desired result.

It will be appreciated that the present invention is not limited to the bar-spot charge and bar charge pattern combination by which the two elements of information are represented, but would function equally well with other forms of charge patterns. In the system shown, the beams of both tubes are turned On and deflected by a modulating signal so that bar charge patterns are traced in both tubes. Thereafter, dependent upon which element of information (binary one or zero) is to be represented in the chosen areas, the beam of one of the tubes is again turned on so as to re-irradiate a portion of the corresponding previously recorded bar charge pattern, thus achieving a bar-spot or "modified" bar charge pattern. Readout of the information is effected by again tracing a bar charge pattern in both tubes.

One of the possible alternate methods of representing the binary one and binary zero information in a chosen pair of areas could be as follows: First, the electron beams of both tubes are turned On, thus generating a spot or dot charge pattern in both tubes. Thereafter, dependent upon the element of information to be recorded, a modulating signal is applied to a selected one of the tubes thus causing the associated beam to trace a dash charge pattern. The tracing of the dash charge pattern "modifies" the previously recorded dot charge pattern associated therewith. To effect readout, dot charge patterns are again effected in both tubes.

Another alternate method would be to initially trace dot charge patterns in both tubes. Thereafter, a modulating signal is applied to both the horizontal and vertical deflection plates of a selected one of the tubes so that the associated beam traces a circle charge pattern around the previously recorded dot charge pattern. The tracing of the circle charge pattern "modifies" the associated dot charge pattern. Read-out is effected by simultaneously reirradiating the dot charge areas of both tubes.

Still another alternate method would be to initially trace circle charge patterns in both tubes. Thereafter, a spot charge pattern is "written" within a selected one of the previously recorded "circles" thus "modifying" the latter. Readout is effected by simultaneously re-irradiating the circle pattern of both tubes.

Still another alternate method would be to simultaneously record "dot" charge patterns in both tubes. Thereafter, dependent upon the element of information to be stored, the electron beam of a selected one of the tubes is defocused. This defocusing of the beam "modifies" the corresponding previously recorded dot charge pattern. Readout is effected by simultaneously re-irradiating the dot charge area of both tubes.

In all of the above suggested alternate charge patterns, cathode ray tubes are the storage medium. However, it will be appreciated that other mediums may be used as the actual storage medium. For example, equivalent results could be effected by storing a binary one representation as two dissimilar signals on a pair of magnetic drums or tape storage devices, or in separate "tracks" of a single magnetic drum. The binary zero representation would comprise the same dissimilar signals except arranged conversely in the drum or tape storage positions. To effect readout, the two dissimilar signals are read out and applied to a difference signal amplifier, thus generating an output signal representative of the manner in which the dissimilar signals were arranged in the storage position.

While there have been shown and described and pointed out the fundamental novel features of the invention as applied to a preferred embodiment, it will be understood that various omissions and substitutions and changes in the form and details of the apparatus illustrated and its operation may be made by those skilled in the art, without departing from the spirit of the invention. It is the intention, therefore, to be limited only as indicated by the scope of the following claims.

What is claimed is:

1. Electrical information storage apparatus comprising, in combination, a pair of signal storage devices, means for selectively recording either a first or a second kind of element of information in said devices, said first kind of element of information comprising two dissimilar signal representations, each recorded in a different one of said devices, and said second kind of element of information also comprising two dissimilar signal representations identical to said first element representation, but recorded conversely in said respective storage devices, a difference signal amplifier, signal readout means associated with each of said devices and operatively linked to said difference amplifier, means for actuating said signal readout means whereby the dissimilarity between the signals generated by each of said readout means is amplified by said difference amplifier to give a first output indication of one type if said storage devices contained said first kind of element of information, and a second output indication of another type if said storage devices contained said second kind of element of information.

2. Electrical information storage apparatus according to claim 1, and including means controlled by said amplifier in accordance with the type of output indication produced thereby, for causing said recording means to be reoperated selectively, in accordance with the type of output, so as to restore the corresponding element of information in said storage devices.

3. Electrical information storage apparatus according to claim 2, and including means for selectively suspending the operation of said recording means by said amplifier controlled means so as to permit new information to be stored in said storage devices.

4. Electrical information storage apparatus comprising, in combination, a pair of signal storage devices, each having a plurality of respectively corresponding pairs of signal storage addresses, means for selecting corresponding pairs of storage addresses in said storage devices, means for selectively recording either a first or a second kind of element of information in a selected pair of storage positions, said first kind of element of information comprising two dissimilar signals, each recorded respectively in one of the addresses of each tube comprising a kind of address pair, and said second element of information comprising two dissimilar signals identical to said first element representation, except recorded conversely, in said selected address pair, a difference signal amplifier, signal readout means associated with each of said storage devices and operatively linked to said difference amplifier, means for actuating said signal readout means whereby the dissimilarity between the signals generated by each of said readout means is amplified by said amplifer to give a first type of output indication if said storage devices contained said first kind of element of information, and a second type of output indication if said storage devices contained said second kind of element of information.

5. Electrical information storage apparatus according to claim 4, and including means controlled by said amplifier in accordance with the output indication produced thereby, for causing said recording means to be reoperated selectively in accordance with the type of output so as to restore the corresponding element of information in said selected pair of storage addresses, and means for selectively suspending the operation of said recording means by said amplifier controlled means, so as to permit new information to be stored in said selected pair of storage addresses.

6. Electrical information storage apparatus according to claim 5, in which said signal storage addresses of said pair of storage devices are arranged in groups, means for controlling said storage address selecting means so as to select a first pair of storage addresses in a selected group of said storage addresses, and automatic sequencing means for subsequently controlling said storage address selecting means so as to select sequentially the remaining pairs of storage addresses in said selected group.

7. Electrical information storage apparatus comprising, in combination, a pair of dielectric recording surfaces, each containing in a separate evacuated envelope and including means for producing an electron beam at a velocity such that, when the beam strikes the surface, the number of secondary electrons liberated therefrom, is greater than the number of primary or beam electrons arriving; means for causing the beams of both tubes to simultaneously irradiate a discrete area of said related surfaces so as to cause said areas of both surfaces to assume the same state of charge, means for selectively causing one only of said beams to subsequently irradiate an area of its related surface, so as to render dissimilar the charge of its related discrete area in comparison with said discrete area of the other surface, wherein, dependent upon which of said charge areas is rendered dissimilar, the combination of the charge patterns of both surfaces taken together represent either a first or a second type of element of information, individual signal pickup means associated with each of said surfaces, means for extracting from said signal pickup means dissimilar signals generated thereon at a subsequent and similar irradiation of both said discrete areas, and difference amplifier means for amplifying the difference between said dissimilar readout signals, wherein a kind of signal representative of said first type of element of information results at the amplifier output, if said discrete areas prior to said subsequent irradiation, represented said first type of element of information, and another kind of signal, representative of said second element of information, results at the amplifier output if said discrete areas, prior to said subsequent irradiation, represented said second type of element of information.

8. Electrical information storage apparatus according to claim 7, and including beam deflecting means adapted to simultaneously direct both said beams progressively over their related recording surfaces, from discrete area to discrete area, and means connecting said amplifier and said beam selection means to control said selection means so as to modify the charge pattern of the appropriate discrete area of each pair of said areas in accordance with the kind of output signal therefrom.

9. Electrical information storage apparatus comprising, in combination, a pair of dielectric, recording surfaces, each contained in a separate evacuated envelope and including means for producing an electron beam at a velocity such that when the beam strikes a surface, the number of secondary electrons liberated therefrom is greater than the number of primary or beams electrons arriving; beam deflecting means, a modulating signal source, means for causing said beams of electrons to be produced concurrently with the application of a modulating signal to said beam deflecting means whereby each of said beams simultaneously irradiating a discrete area of said related surface causes said areas to both assume the same state of charge, beam control means for selectively causing one only of said beams to again irradiate a portion only of said discrete area, so as to render dissimilar the charge of said related discrete area in comparison with said discrete area of the other surface, wherein, dependent upon which one of said charge areas is rendered dissimilar, the combination of the charge patterns of both said discrete areas taken together represent either a first or a second type of element of information, a difference signal amplifier, individual signal pickup means associated with each said surfaces and operatively linked to said amplifier, wherein at a subsequent simultaneous and similar irradiation of both said discrete areas, the resultant difference between signals generated on said signal pickup means is amplified by said difference amplifier to give either a first kind or a second kind of output indication, dependent upon whether a first or a second type of element of information was represented in said discrete areas prior to said subsequent irradiation.

10. Electrical information storage apparatus comprising, in combination, a pair of insulating, recording surfaces, each contained in a separate evacuated envelope and including means for producing an electron beam at a velocity such that, when the beam strikes the surface, the number of secondary electrons liberated therefrom is greater than the number of primary or beams electrons arriving; beam deflecting means, a modulating signal source, means for causing said beams of electrons to be produced concurrently with the application of a modulating signal to said beam deflecting means, whereby each of said beams simultaneously irradiating a discrete area of said related surface causes said areas to both assume the same state of charge, selective beam control means for causing one only of said beams to irradiate a portion only of said discrete area so as to render dissimilar the charge of said related discrete area in comparison with said discrete area of the other surface, wherein, dependent upon which one of said charge areas is rendered dissimilar, the combination of the charge patterns of both said discrete areas taken together, represent either a first or a second type of element of information, a difference signal amplifier, individual signal pickup means associated with each said surfaces and operatively linked to said amplifier, wherein at a subsequent simultaneous and similar irradiation of both said discrete areas, the resultant difference between signals generated on said signal pickup means is amplified by said difference amplifier to give either a first kind or a second kind output indication, dependent upon whether a first type or a second type element of information was represented on said discrete areas, prior to said subsequent irradiation, means controlled by said amplifier in accordance with the kind of output indication produced thereby, for causing the selective operation of one only of said electron beams so as to restore the corresponding kind of element of information on said discrete areas, means for selectively suspending the control of said beams by said amplifier controlled means, so as to permit a new type of element of information to be stored in said discrete areas, and means for controlling said beam deflecting means so as to direct said beams simultaneously to any one of the plurality of pairs of discrete areas of each said surfaces.

11. Electrical information storage apparatus comprising, in combination, a pair of dielectric recording surfaces, each contained in a separate evacuated envelope and including means for producing an electron beam at a velocity such that, when the beam strikes the surface, the number of secondary electrons liberated therefrom, is greater than the number of primary electrons arriving; modulating means for causing each of said beams of electrons to simultaneously and repetitively irradiate a related discrete area of said corresponding surface so as to cause said areas to assume the same state of charge, selective beam control means, adapted when operated to enable either but not both of said beams to again irradiate a part only of said discrete area so as to modify the state of charge of said discrete area, wherein, dependent upon which one of said discrete areas is rendered modified, the combination of the charge patterns of both areas, taken together, represent either a first type or a second type element of information, a difference signal amplifier, individual signal pickup means associated with each said surfaces and operatively linked to said amplifier, wherein at a subsequent simultaneous and similar irradiation of both said discrete areas, a signal representative of the previous state of charge of each said areas is generated in said related pickup means and applied to said amplifier, the difference between said signals being amplified by said difference amplifier to give either a first kind or second kind output indication, dependent upon whether a first type or second type of element of information was represented in said discrete areas prior to said subsequent irradiation.

12. Electrical information storage apparatus according to claim 11, and including means controlled by said amplifier in accordance with the kind of output indication produced thereby, for causing said selective beam control means to be appropriately reoperated so as to restore the corresponding element of information in said discrete areas.

13. Electrical information storage apparatus according to claim 12, and including means for selectively suspending the operation of said selective beam control means by said amplifier output so as to permit a new element of information to be stored in said discrete areas.

14. Electrical information storage apparatus comprising, in combination, a pair of cathode ray tubes, electron beam control means for individually turning on the electron beams of each of said tubes so as to irradiate the corresponding screen thereof, modulating means adapted when operated to deflect said beams over a predetermined area of said related screens, means for causing said modulating means and said electron beam control means of both said tubes to be simultaneously actuated, whereby said beams irradiate said predetermined area in said related tubes, thus forming a corresponding charge pattern, means for selectively operating one only of said beam control means when said modulating means are inoperative, wherein said related beam reirradiates a portion only of said predetermined area and thus modifies the charge pattern thereof, wherein, dependent upon the tube in which said original area is modified, said combined charge patterns of both tubes represent a first type or a second type of element of information, individual signal pickup means associated with each of said tubes, a difference amplifier, means operatively linking each of said signal pickup means and a related input of said amplifier, whereby during said simultaneous operation of said modulating means and beam control means, difference signals are generated on said related signal pickup means as determined by the charge pattern previously recorded in the related tubes, said difference signals being amplified by said amplifier to give an output signal of a first polarity if said screen areas, prior to said irradiation, represented said first type of element of information, or an output signal of an opposed polarity if said screen areas prior to said irradiation, represented said second type of element of information.

15. Electrical information storage apparatus comprising, in combination, a pair of cathode ray tubes, means for causing the electron beams of said tubes to simultaneously irradiate a discrete area of a related screen thereof, wherein said areas assume a state of charge, means for selectively causing the electron beams of one of said tubes to reirradiate a portion only of said related discrete area so that the charge of said original area is modified, wherein dependent upon which one of the tubes in which said original area charge is modified, said combined charge patterns of both tubes represent a first type or a second type element of information, individual signal pickup means associated with each of said tubes, a differential amplifier, means operatively linking each of said tube pickup means and a related input of said amplifier, means for causing the electron beams of said tubes to simultaneously reirradiate said discrete areas of said related screens in a similar manner whereby difference signals are generated on said related signal pickup means as determined by the charge pattern previously recorded thereon, and wherein the difference between said signals on said pickup plates is amplified by said amplifier to give an output signal of a first polarity if said storage areas prior to said reirradiation represented said first type of element of information, or an output signal of an opposed polarity if said storage area, prior to said reirradiation, represented said second type of element of information.

16. Electrical information storage apparatus comprising, in combination, a pair of cathode ray tubes, each said tubes having a screen and means for producing therefrom a secondary emission ratio greater than unity, means for producing an electron beam, control grid means for turning said electron beam On or Off, wherein said beam is accordingly permitted or prevented from irradiating an area of said screen, beam deflecting means operable to deflect said beam to any part of said screen, and a conductive signal pickup device adjacent said screen; a source of incremental beam deflection voltages operatively linked to both said tube beam deflecting means, means for operating said beam deflection voltage source so as to apply appropriate voltages to said tube deflection means whereby said related beams, when On, are deflected to corresponding desired discrete areas of said respective screens, means for simultaneously actuating the control grids of both said tubes for a predetermined period so as to turn On the related beams, means for concurrently impressing a modulating signal on said beam deflection means, whereby said beams trace identical charge patterns on the chosen discrete areas of said screens, means for subsequently and selectively actuating the beam of one only of said tubes, for a predetermined period, whereby said related beam reirradiates a portion only of said chosen discrete area to modify the charge pattern thereof, wherein, dependent upon the particular tube in which said discrete area charge pattern is modified, said combined charge patterns of both tubes represent a first type or a second type of element of information, a difference signal amplifier, circuit means operatively linking each of said conductive signal pickup devices and a related input of said amplifier, whereby during a subsequent simultaneous and similar irradiation of said discrete areas, difference signals are generated on said related signal pickup means as determined by the previous charge of each of said discrete areas, said difference signals being amplified by said amplifier to give an output signal of a first polarity if said screen areas, prior to said irradiation, represented said first type of element of information, or an output signal of an opposed polarity, if said areas prior to said irradiation, represented said second type of element of information.

17. Electrical information storage apparatus according to claim 16, and including a sampling device interposed between the output of said amplifier and said selectively actuating beam means, means for actuating said sampling device at a time shortly after said simultaneous and similar irradiation of a chosen pair of discrete areas so as to sample the resultant output of said amplifier, and whereby, dependent upon the polarity of said output, said beam actuating means are subsequently controlled thereby so as to restore the same kind of element of information in said discrete areas.

18. Electrical information storage apparatus according to claim 17, and including means for selectively preventing the operation of said sampling device so that said selectively actuating beam means may be independently operated and a new element of information may be recorded in said chosen discrete areas.

19. Electrical information storage apparatus according to claim 16, and including means for causing said amplifier output signal to determine the operation of said selectively actuating selectable beam means in correspondence with the type of element of information previously represented in said chosen discrete areas.

20. Electrical information storage apparatus according to claim 16, and including means for automatically operating said selectively actuating beam means so as to cause said second type of element of information to be normally recorded in said chosen pair of discrete areas, and means controlled by that kind of amplifier output representative of said first type of element of information for suspending said automatic operation of said selectively actuating beam means and effecting an operation thereof so as to restore said first type of element of information in said chosen pair of discrete areas.

21. Electrical information storage apparatus according to claim 20, and including means for preventing the operation of said selectively actuating beam means by said amplifier output controlled means when new information is to be recorded in said chosen discrete areas, and means for suspending said automatic operation of said selectively actuating beam means, if said new information is to be of said first type of element and effecting an operation thereof so as to record said first type of element in said chosen discrete areas.

22. Electrical information storage apparatus according to claim 16, and including a device having two stable conditions for controlling said selectively actuating beam means and adapted, when in a first stable state, to actuate said beam means so as to cause said first type of element of information to be recorded in said chosen discrete areas, and when in a second stable state, to actuate said beam means so as to cause said second type of element of information to be recorded in said chosen discrete areas; means normally resetting said bistable device to said second stable state so as to cause said second type of element of information to be recorded on said chosen discrete areas, a coincidence device adapted when operated to flip said bistable device from said second to said first stable state so as to cause said first type of element of information to be recorded in said chosen discrete area, said coincidence device being rendered operable by the coincidence of a first output indication from said amplifier on one input of said device, and a simultaneous conditioning of another input of said coincidence device, means for conditioning said input of said coincidence device at a time when an amplifier output is produced by said simultaneous irradiation of the chosen pair of discrete areas, separate means, in addition to said coincidence device, for flipping said bistable device from said second to first stable state when new information is to be recorded in said selected discrete areas, and means for suspending the operation of said conditioning means when new information is to be read into said chosen discrete areas.

23. Electrical information storage apparatus comprising, in combination, a pair of cathode ray tubes, each of said tubes including, a screen and means for producing therefrom a secondary emission ratio greater than unity, means for producing an electron beam, control grid means for turning said electron beam On or Off, whereby said beam is accordingly permitted or prevented from irradiating an area of said screen, beam deflecting means operable to deflect said beam to any part of said screen, and a signal pickup device adjacent said screen; a deflection control device for controlling, in unison, the beam deflection means of both said tubes so as to cause said associated electron beams to be directed to corresponding discrete areas of said related screens, each said screen having a plurality of such areas, said areas being arranged in groups; means for controlling said deflection control device so as to direct said beams, when On, to the first discrete area of a chosen group of such areas, means for simultaneously actuating the control grids of both said tubes for a predetermined period, so that said beams irradiate the discrete areas selected by said deflection control device, means for concurrently impressing a modulating signal on said beam deflection means of both tubes so that said beams trace identical charge patterns in said chosen discrete areas, means for subsequently and selectively actuating the control grid of one only of said tubes for a predetermined period, whereby said related beam reirradiates a portion only of said chosen discrete area to modify the charge pattern thereof, whereby dependent upon the particular tube in which said discrete area charge pattern is modified, said combined charge patterns of both tubes represent a first type or a second type of element of information, a difference signal amplifier, circuit means operatively linking each of said signal pickup devices and a related input of said amplifier, whereby during said simultaneous irradiation of said selected areas, difference signals are generated on said related signal pickup means as determined by the previous charge pattern of each of said discrete areas, said difference signals being amplified by said amplifier to give an output signal of one kind representative of the particular type of element of information previously recorded in said chosen areas; and automatic sequencing means for subsequently controlling said deflection control device so as to select sequentially the remaining discrete areas in said selected group.

24. Electrical information storage apparatus according to claim 23, and including means controlled by said amplifier and dependent upon its kind of output signal representation for appropriately operating said selective control grid actuating means so as to regenerate the same kind of element of information in the selected pair of discrete areas, and means for suppressing the operation of said amplifier controlled means, when new information is to be recorded in said chosen group of areas.

25. Electrical information storage apparatus comprising, in combination, a pair of cathode ray tubes, each said tubes including, a fluorescent screen, means for producing an electron beam, control grid means for turning said electron beam On or Off, whereby said beam is accordingly permitted or prevented from irradiating an area of said screen, beam deflecting means operable to deflect said beam to any part of said screen, and a signal pickup device adjacent said screen; a deflection control device for controlling, in unison, the beam deflection means of both said tubes, means for controlling said deflection control device so as to direct said beams, when On, to a first pair of discrete areas of a chosen group of areas, means for simultaneously actuating the control grids of both tubes for a predetermined period so that said beams irradiate the selected areas, means for concurrently applying a modulating signal to said beam deflection means of both tubes so that said beams trace identical charge patterns in the selected pair of areas, means for subsequently and selectively actuating the control grid of one only of said tubes for a predetermined period, whereby said related beam reirradiates a portion only of said chosen discrete area of said pair of areas so as to modify the charge pattern thereof, whereby, dependent upon the tube in which said discrete area charge pattern is modified, said combined charge patterns of both tubes represent a first type or a second type of element of information, each pair of discrete areas in a group being assigned a particular weighted decimal value and being representative of that value, when said first type element of information is represented therein, a difference signal amplifier, circuit means operatively linking each of said signal pickup devices and a related input of said amplifier, whereby, during said simultaneous irradiation of the selected pair, difference signals are generated on said related signal pickup device as determined by the charge pattern previously recorded in each said areas, said difference signals being amplified by said amplifier to give a particular kind of output signal, representative of the type element of information previously recorded in said areas, a plurality of bistable devices, one for each said pair of areas in a group, each of said devices being assigned a corresponding, weighted decimal value, and representative thereof, when in a first stable state, means for resetting all said devices to a second stable state, a coincidence device associated with each of said bistable devices and adapted, when operated, to change said related device from said second to said first stable state, said coincidence device being rendered operable by the coincidence of a first type of element output indication from said amplifier on one input, and a simultaneous conditioning of another input of said coincidence device, and automatic stepping means also controlling said deflection control device so as to cause said beams to select successive pairs of areas of said group on each step thereof, and also to simultaneously condition the said one input of the coincidence device of the corresponding bistable device.

26. Electrical information storage apparatus as in claim 25, and including means controlled by said amplifier, dependent upon its kind of output signal representation for appropriately operating said selective control grid actuating means so as to regenerate the same type of element of information in the selected pair of discrete areas, and means for suppressing the operation of said amplifier controlled means when new information is to be recorded in said chosen group of areas.

27. Electrical information storage apparatus comprising, in combination, a pair of cathode ray tubes, each said tubes including, a fluorescent screen, means for producing an electron beam, control grid means for turning said electron beam On or Off, wherein said beam is accordingly permitted or prevented from irradiating an area of said screen, beam deflecting means operable to deflect said beam to any part of said screen, and a signal pickup device adjacent said screen; a deflection control device for controlling, in unison, the beam deflection means of both said tubes, means for controlling said deflection control device so as to direct said beams, when On, to a first pair of discrete areas of a chosen group of such areas, means for simultaneously actuating the control grids of both tubes for a predetermined period so that said beams irradiate the selected areas, means for concurrently applying a modulating signal to said beam deflection means of both tubes so that said beams trace identical charge patterns in the selected pair of areas, means for subsequently and selectively actuating the control grid of one only of said tubes for a predetermined period, whereby said related beam reirradiates a portion only of said chosen discrete area of said pair of areas so as to modify the charge pattern thereof, whereby, dependent upon the particular tube in which said discrete area charge pattern is modified, said combined charge patterns of both tubes represent a first type or a second type of element of information, each pair of discrete areas in a group being assigned a particular weighted decimal value, and being representative of that value when said first type of element of information is represented therein, means normally controlling said selective grid actuating means so as to cause said second type of element of information to be recorded, a difference signal amplifier, means operatively linking each of said signal pickup devices and a related input of said amplifier, whereby, during said simultaneous irradiation of the selected pair, difference signals are generated on said related signal pickup devices as determined by the charge pattern previously recorded in each said areas, said difference signals being amplified by said amplifier to give a certain kind of output signal, representative of the particular type of elements of information previously recorded in said areas, a plurality of bistable devices, one for each said pair of areas in a group, each of said devices being assigned a corresponding weighted decimal value, and representative thereof when in a first stable state, means for resetting all said devices to a second stable state, means for transferring said bistable devices, singly or in combination, prior to the selection of said first pair of storage areas in a selected group from said second to said first stable state to represent a desired value therein, a coincidence device associated with each of said bistable devices, said coincidence device being rendered operable by the coincidence of said related bistable device being in said first stable state and a simultaneous conditioning of an input thereof, each said coincidence devices, when operable, adapted to control said selectable grid actuating means so as to record a first type of element of information on a pair of discrete areas, and automatic stepping means also controlling said deflection control device so as to cause said beams to select successive pairs of areas of said group on each step thereof, and also simultaneously condition the said input of the coincidence device of the corresponding bistable device.

28. Electrical information storage apparatus, comprising, in combination, a pair of cathode ray tubes, each of said tubes including a fluorescent screen, means for producing an electron beam, control grid means for turning said electron beam On or Off, wherein said beam is accordingly permitted or prevented from irradiating an area of said screen, beam deflecting means operable to deflect said beam to any part of said screen, and a signal pickup device adjacent said screen; a deflection control device for controlling in unison the beam deflection means of both said tubes, means for controlling said deflection control device so as to direct said beams, when On, to a first pair of discrete areas of a chosen group of such areas, means for simultaneously actuating the control grids of both tubes for a predetermined period so that said beams irradiate the selected areas, means for concurrently applying a modulating signal to said beam deflection means of both tubes so that said beams trace identical charge patterns in the selected pair of areas, means for subsequently and selectively actuating the control grid of either of said tubes for a predetermined period, whereby said related beam reirradiates a portion only of said chosen discrete area of said pair of areas so as to modify the charge pattern thereof, whereby dependent upon the particular tube in which said discrete area charge pattern is modified, said combined charge patterns of both tubes represent a first or a second element of information, each pair of discrete areas in a group being assigned a particular weighted decimal value, and being representative of that value when said first type of element of information is represented therein, a difference signal amplifier, circuit means operatively linking each of said signal pickup devices and a related input of said amplifier, whereby, during said simultaneous irradiation of the selected pair, difference signals are generated on said related signal pickup device as determined by the charge pattern previously recorded in each said areas, said difference signals being amplified by said amplifier to give a particular kind of signal representative of the particular type of element of information previously recorded in said areas; a plurality of registering devices, one for each said pair of areas in a group, each of said devices being adapted to assume either a first or a second condition, each of said devices being assigned a corresponding weighted decimal value and being representative thereof when in a first condition and automatic stepping means also controlling said deflection control device so as to cause said beams to select successive pairs of areas of said group on each step thereof, and also simultaneously connect the output of said amplifier to said corresponding registering device whereby, dependent upon the kind of amplifier output, said device is actuated to assume a condition corresponding to the type of element of information previously recorded in said selected area pair.

29. Electrical information storage apparatus comprising, in combination, a pair of cathode ray tubes, each of said tubes including a fluorescent screen, means for producing an electron beam, control grid means for turning said electron beam On or Off, whereby said beam is accordingly permitted or prevented from irradiating an area of said screen, beam deflecting means operable to deflect said beam to any part of said screen, and a signal pickup device adjacent said screen, a deflection control device for controlling, in unison, the beam deflection means of both said tubes, means for controlling said deflection control device so as to direct said beams, when On, to a first pair of discrete areas of a chosen group of such areas, means for simultaneously actuating the control grids of both tubes for a predetermined period so that said beams irradiate the selected areas, means for concurrently applying a modulating signal to said beam deflection means of both tubes so that said beams trace identical charge patterns in the selected pair of areas, means for subsequently and selectively actuating the control grid of one only of said tubes, for a predetermined period, whereby said related beam reirradiates a portion only of said chosen area of said pair of areas, so as to modify the charge pattern thereof, whereby dependent upon the particular tube in which said discrete area charge pattern is modified, said combined charge patterns of both tubes represent a first type or a second type of element of information, each pair of discrete areas in a group being assigned a particular weighted decimal value and being representative of that value when said first type of element of information is represented therein, means normally controlling said selective grid actuating means so as to cause said second type of element of information to be recorded, a difference signal amplifier, means operatively linking each of said signal pickup devices and a related input of said amplifier, whereby, during said simultaneous irradiation of the selected pair, difference signals are generated on said related signal pickup devices as determined by the charge pattern previously recorded in each said areas, said difference signals being amplified by said amplifier to give a particular kind of output signal representative of the particular type of element of information previously recorded in said areas, a plurality of registering devices, one for each said pair of areas in a group, each of said devices being adapted to assume either a first or a second condition, each of said devices being assigned a corresponding weighted decimal value and being representative thereof when in a first condition; means for positioning said registering devices, singly or in combination, prior to the selection of said first pair of storage areas in a selected group, in said first condition to represent a desired value therein; automatic stepping means also controlling said deflection control device so as to cause said beams to select successive pairs of said group on each step thereof, and also to simultaneously select the corresponding registering device, and means whereby each of said registering devices if in said first condition when selected, controls said selective beam actuating means so as to cause said first type of element of information to be recorded in the corresponding pair of discrete areas..

30. Electrical information storage apparatus comprising, in combination, a pair of cathode ray tubes, each of said tubes including a fluorescent screen, means for producing an electron beam, control grid means for turning said electron beam On or Off, wherein said beam is accordingly permitted or prevented from irradiating an area of said screen, beam deflecting means operable to deflect said beam to any part of said screen, and a signal pickup device adjacent said screen; a deflection control device for controlling, in unison, the beam deflection means of both said tubes, means for controlling said deflection control device so as to direct said beams, when On, to a first pair of discrete areas of a chosen group of such areas, means for simultaneously actuating the control grids of both tubes for a predetermined period so that said beams irradiate the selected areas, means for concurrently applying a modulating signal to said beam deflection means of both tubes so that said beams trace identical charge patterns in the selected pairs of areas, means for subsequently and selectively actuating the control grid of either of said tubes for a predetermined period, whereby said related beam reirradiates a portion only of said chosen discrete area of said pair of areas so as to modify the charge pattern thereof, whereby, dependent upon the tube in which said discrete area charge pattern is modified, said combined charge patterns of both tubes represent a first type or a second type of element of information, each pair of discrete areas in a group being assigned a particular weighted decimal value, and being representative of that value when said first type of element of information is represented therein, a difference signal amplifier, circuit means operatively linking each of said signal pickup devices and a related input of said amplifier, whereby during said simultaneous irradiation of the selected pair, difference signals are generated on said related signal pickup device, as determined by the charge pattern previously recorded in each said areas, said difference signals being amplified by said amplifier to give a particular kind of output signal representative of the particular type of element of information previously recorded in said areas, a plurality of bistable devices, one for each said pair of areas in a group, each of said devices being assigned a corresponding weighted decimal value, and representative thereof when in a first stable state, means for resetting all said devices to a second stable state, a first coincidence device associated with each said bistable devices and adapted, when operated, to change said related device from said second to said first stable state, said coincidence device being rendered operable by the coincidence of a first type of element output indication from said amplifier on one input, and a simultaneous conditioning of another input of said coincidence device, a second coincidence device associated with each said bistable devices, said coincidence device being rendered operable by the coincidence of said first stable state, and a simultaneous conditioning of an input thereof, each said coincidence devices, when operable, being adapted to control said selectable grid actuating means so as to record a first type of element of information in a pair of discrete areas, a switching device operable to connect a set of input lines, one for each of said pairs of discrete areas of a group, to either a first or second set of output conductors, each of said output conductors of the first set being connected to the said one input of the first coincidence device of a corresponding bistable device, and each of said output conductors of the second set being connected to the said one input of the second coincidence device of a corresponding bistable device, stepping means, also controlling said deflection control device so as to cause said beams to select successive pairs of areas of said selected group on each step thereof, and also to simultaneously condition the related input conductor of said switch device, a cyclically operable timing device, common means continuously driving said timing device and said stepping means, means controlled by said timing means and selectably operable during a first predetermined portion of the cycle thereof for actuating said switch device so as to connect said input lines to said first set of output lines, and selectably operable during a second predetermined portion of the cycle thereof for actuating said switch device so as to connect said input lines to said second set of output lines; means actuating said bistable device resetting means at the beginning of each cycle of said timing means, means for reading in a desired value into said bistable devices during a predetermined portion of said cycle, by transferring the devices, singly or in combination, from said reset position, said latter predetermined portion of the cycle being interposed between said first and second portions of the cycle; means for reading a value out of said bistable devices during said interposed portion of a cycle, and means rendering said selectable timing controlled means operable during said first portion of a cycle during which a readout of the bistable devices is effected, and also operable during said second portion of a cycle during which a reading of the bistable devices is effected.

31. Electrical information storage apparatus according to claim 29, and including means also controllable by said amplifier, dependent upon its kind of output signal representation, for appropriately operating said selective control grid actuating means so as to regenerate the same type of element of information in the selected pair of discrete areas, said amplifier controlled means being rendered operable by said switch mechanism, when connecting said input lines to said first set of output lines.

32. Electrical information storage apparatus according to claim 29, and including means, also controllable by said amplifier, dependent upon its kind of output signal representation, for appropriately operating said selective control grid actuating means so as to regenerate the same type of element of information in the selected pair of discrete areas, said amplifier controlled means being rendered operable by said timing device during the entire cycle thereof, except during said second predetermined portion.

References Cited in the file of this patent

UNITED STATES PATENTS

| | | |
|---|---|---|
| 1,946,223 | Mason | Feb. 6, 1934 |
| 2,024,979 | Metcalf | Dec. 17, 1935 |
| 2,459,724 | Selgin | Jan. 18, 1949 |
| 2,512,038 | Potts | June 20, 1950 |
| 2,609,143 | Stibitz | Sept. 2, 1952 |
| 2,639,859 | Serrell | May 26, 1953 |
| 2,701,095 | Stibitz | Feb. 1, 1955 |
| 2,750,532 | Samuel | June 12, 1956 |
| 2,755,994 | Williams | July 24, 1956 |
| 2,767,908 | Thomas | Oct. 23, 1956 |

OTHER REFERENCES

Mutter: Improved C-R Tube for Application in Williams Memory System, Electrical Engineering, April 1952, pp. 352 to 356.

Chu: The Oak Ridge Automatic Computer, Proceedings Association for Computing Machinery, September 1952.

Julian et al.: Coordinate Tubes for Use With Electrostatic Storage Tubes, Proceedings of the National Electronics Conference, vol. 5, pp. 107 to 122.

Williams et al.: A Storage System for Use With Binary-Digital Computing Machines, Proceedings of the Institution of Electrical Engineers, Part III, March 1949.

Eckert, Jr. et al.: A Dynamically Regenerated Electrostatic Memory System.

UNITED STATES PATENT OFFICE
CERTIFICATE OF CORRECTION

Patent No. 2,884,619

April 28, 1959

William W. Woodbury et al

It is hereby certified that error appears in the printed specification of the above numbered patent requiring correction and that the said Letters Patent should read as corrected below.

Column 7, line 54, for "a R stage" read -- a 4 stage --; column 13, line 72, and column 14, line 2, for "470K", each occurrence, read -- .470K --; column 14, line 59, for "position" read -- potential --; column 28, line 72, after "supply" and before the period, insert -- , while the conductor 341 is at approximately the plus 300 volt supply --; column 29, line 40, for "operate" read -- operated --; column 31, line 36, after "Deflection" insert -- Control --; column 48, line 71, for "wire" read -- write --; column 56, line 40, for "containing" read -- contained --.

Signed and sealed this 5th day of April 1960.

(SEAL)

Attest:

KARL H. AXLINE
Attesting Officer

ROBERT C. WATSON
Commissioner of Patents